US012610926B2

(12) United States Patent
Perslow et al.

(10) Patent No.: US 12,610,926 B2
(45) Date of Patent: *Apr. 28, 2026

(54) AQUACULTURE SYSTEMS AND METHODS

(71) Applicant: Grand Shrimp, LLC, Fountain Valley, CA (US)

(72) Inventors: Johan Perslow, Carlsbad, CA (US); Andrew Komor, Costa Mesa, CA (US); Michael Morrow, Burlington (CA)

(73) Assignee: Grand Shrimp, LLC, Fountain Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,364

(22) Filed: Nov. 22, 2023

(65) Prior Publication Data

US 2025/0064030 A1 Feb. 27, 2025

Related U.S. Application Data

(63) Continuation of application No. 16/924,064, filed on Jul. 8, 2020, now Pat. No. 11,864,539, which is a
(Continued)

(51) Int. Cl.
*A01K 63/04* (2006.01)
*A01K 61/59* (2017.01)
*A01K 63/06* (2006.01)

(52) U.S. Cl.
CPC ............ *A01K 63/042* (2013.01); *A01K 61/59* (2017.01); *A01K 63/04* (2013.01); *A01K 63/045* (2013.01);
(Continued)

(58) Field of Classification Search
CPC .... A01K 63/042; A01K 63/045; A01K 61/59; A01K 63/065; A01K 63/047;
(Continued)

(56) References Cited

U.S. PATENT DOCUMENTS

| 178,916 | A | 6/1876 | Dunbar |
| 2,039,281 | A | 5/1936 | Bryan et al. |

(Continued)

FOREIGN PATENT DOCUMENTS

WO WO 2019/040787 2/2019

OTHER PUBLICATIONS

International Search Report for PCT/US2018/026915, dated Jul. 13, 2018.
(Continued)

*Primary Examiner* — Trinh T Nguyen
(74) *Attorney, Agent, or Firm* — Knobbe, Martens, Olson & Bear, LLP

(57) ABSTRACT

An aquaculture system can include stacked growth trays. Animals, such as shrimp, can be transferred between the growth trays for different stages of growth. Waste water can be removed from the growth trays and can be processed by a water treatment system. Treated water can be returned to the growth trays. A valve in a first configuration can permit water to circulate through the growth tray, while impeding the animals from exiting the growth tray. In a second configuration, the valve can permit the animals to exit the growth tray, such as for transition to a subsequent growth tray. A sweeper system can be used for cleaning and/or mixing the water in the growth tray, and/or for pushing the animals out of the growth tray during a transition.

12 Claims, 49 Drawing Sheets

100

First Growth Tray
Second Growth Tray
Third Growth Tray
Fourth Growth Tray
Fifth Growth Tray
Sixth Growth Tray
Seventh Growth Tray 101 102 103

Waste and/or Harvesting Tank

Related U.S. Application Data continuation of application No. 16/246,293, filed on Jan. 11, 2019, now Pat. No. 10,709,117, which is a continuation-in-part of application No. PCT/US2018/026915, filed on Apr. 10, 2018.

(60) Provisional application No. 62/580,971, filed on Nov. 2, 2017, provisional application No. 62/484,295, filed on Apr. 11, 2017.

(52) U.S. Cl.
CPC ............ *A01K 63/047* (2013.01); *A01K 63/06* (2013.01); *A01K 63/065* (2013.01); *Y02A 40/81* (2018.01)

(58) Field of Classification Search
CPC ...... A01K 63/04; A01K 63/006; A01K 61/00; A01K 61/50; A01K 61/54; Y02A 40/81
See application file for complete search history.

(56) References Cited

U.S. PATENT DOCUMENTS

| | | | |
|---|---|---|---|
| 3,766,888 | A | 10/1973 | Wiegardt, Jr. |
| 3,886,902 | A | 6/1975 | Haynes |
| 4,064,836 | A | 12/1977 | Taborsky |
| 4,211,183 | A | 7/1980 | Hoult |
| 4,221,187 | A | 9/1980 | Casey |
| 4,368,691 | A | 1/1983 | Brune |
| 4,688,519 | A | 8/1987 | Fischer |
| 4,749,485 | A | 6/1988 | DeGraffenreid |
| 5,961,831 | A | 10/1999 | Lee et al. |
| 6,192,833 | B1 | 2/2001 | Brune et al. |
| 6,602,408 | B1 | 8/2003 | Berkey |
| 6,712,967 | B2 | 3/2004 | Gershenson |
| 6,878,266 | B2 | 4/2005 | Leaverton |
| 6,932,025 | B2 | 8/2005 | Massingill et al. |
| 7,069,875 | B2 | 7/2006 | Warecki |
| 7,174,850 | B2 | 2/2007 | Hsiao |
| 7,258,790 | B2 | 8/2007 | Brune et al. |
| 8,336,498 | B2 | 12/2012 | Lawrence |
| 8,905,385 | B2 | 12/2014 | Burns et al. |
| 8,967,597 | B2 | 3/2015 | Burns et al. |
| 8,985,055 | B2 | 3/2015 | Lawrence |
| 9,374,986 | B2 | 6/2016 | Sheriff |
| 9,604,160 | B2 | 3/2017 | Kent |
| 10,709,117 | B2 | 7/2020 | Perslow et al. |
| 11,864,539 | B2 | 1/2024 | Perslow et al. |
| 2001/0045189 | A1 | 11/2001 | McNeil |
| 2009/0218265 | A1 | 9/2009 | Dor |
| 2011/0024361 | A1 | 2/2011 | Schwartzel et al. |
| 2011/0187011 | A1 | 8/2011 | Burns et al. |
| 2012/0204801 | A1 | 8/2012 | Lawrence et al. |
| 2013/0068170 | A1 | 3/2013 | Lawrence |
| 2013/0255585 | A1 | 10/2013 | Hamman |
| 2015/0342156 | A1 | 12/2015 | Sheriff |
| 2016/0095301 | A1 | 4/2016 | Carman |
| 2017/0215391 | A1 | 8/2017 | Gervais et al. |
| 2017/0354128 | A1 | 12/2017 | Budd et al. |
| 2018/0092337 | A1 | 4/2018 | Hori |
| 2018/0110208 | A1 | 4/2018 | Lawrence et al. |
| 2018/0116184 | A1 | 5/2018 | Kemp et al. |
| 2019/0373843 | A1 | 12/2019 | Gervais |

OTHER PUBLICATIONS

Written Opinion for PCT/US2018/026915, dated Jul. 13, 2018.
Website Archive dated Jan. 25, 2015 for http://www.royalcaridea.com/sirsft-integrated-performance/.

100

First Growth Tray

Second Growth Tray

Third Growth Tray

Fourth Growth Tray

Fifth Growth Tray

Sixth Growth Tray

Seventh Growth Tray

Waste and/or Harvesting Tank

100

101

102

103

ISO - PERSPECTIVE
SCALE: N.T.S.

To Head of Plant

Chlorine Generator

Cartridge Filter

Chlorine Generator

TO Sewer

From Waste tank

Oxygenation

Cartridge Filter

Oxygen Generator/
Air Compressor Pump

Air Compressor Tank

300

337

336

337

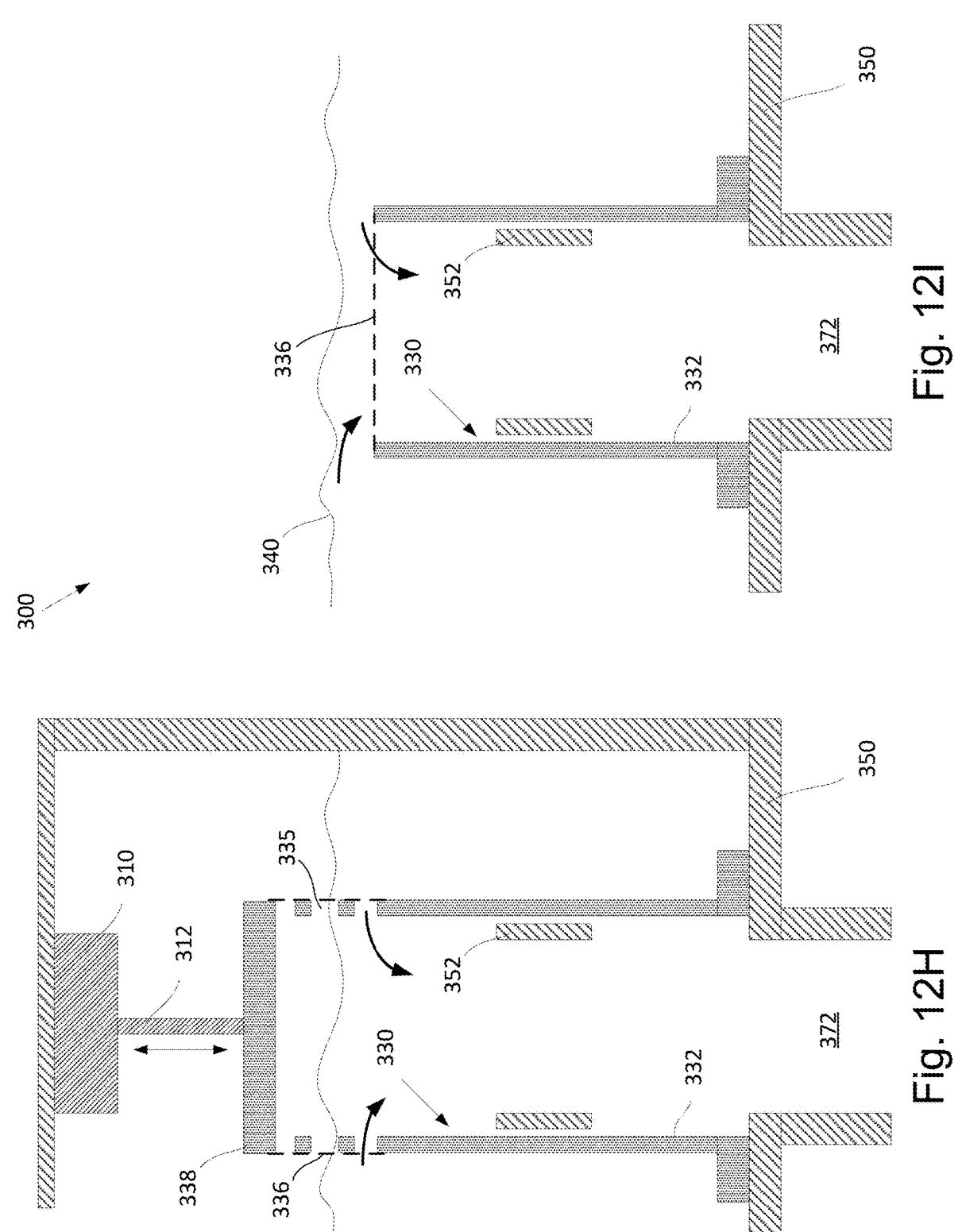

AQUACULTURE SYSTEMS AND METHODS

CROSS-REFERENCE TO RELATED APPLICATIONS

This application is a continuation of U.S. patent application Ser. No. 16/924,064, filed Jul. 8, 2020, and entitled AQUACULTURE SYSTEMS AND METHODS, which is a continuation of U.S. patent application Ser. No. 16/246,293, filed on Jan. 11, 2019, and titled AQUACULTURE SYS-TEMS AND METHODS, which is a continuation-in-part of PCT Patent Application No. PCT/US2018/026915, filed on Apr. 10, 2018, and titled AQUACULTURE SYSTEMS AND METHODS, which designates the United States, and which claims the benefit under 35 U.S.C. § 119(e) of U.S. Provisional Patent Application No. 62/484,295, filed Apr. 11, 2017, and titled AQUACULTURE SYSTEMS AND METHODS, and U.S. Provisional Patent Application No. 62/580,971, filed Nov. 2, 2017, and titled AQUACULTURE SYSTEMS AND METHODS. The entirety contents of each of the above-identified applications are hereby incorporated by reference herein and made part of this specification for all that they disclose.

BACKGROUND

Field of the Disclosure

Some embodiments disclosed herein relate to aquaculture, such as systems and methods for growing shrimp or other water animals.

Description of the Related Art

Although various aquaculture systems and methods for shrimp and other water animals are known, there remains a need for improved aquaculture systems and methods.

SUMMARY

Certain example embodiments are summarized below for illustrative purposes. The embodiments are not limited to the specific implementations recited herein. Embodiments may include several novel features, no single one of which is solely responsible for its desirable attributes or which is essential to the embodiments.

Various embodiments disclosed herein relate to an aqua-culture system (e.g., for shrimp), which can include a plurality of growth trays in a stacked configuration. The growth trays can output soiled water. The system can include a water treatment system configured to treat the soiled water and deliver treated water to the plurality of growth trays. The water treatment system can include one or more pumps to move water through the water treatment system, a particu-late filter configured to receive soiled water containing aquaculture waste, filter particulate matter from the water by impeding particles larger than a threshold size from passing through the particulate filter, and output filtered water. The system can include an oxygenator configured to receive the filtered water, oxygenate the water to increase a level of dissolved oxygen in the water, and output oxygenated water. The system can include a nitrification stage configured to receive the oxygenated water, nitrify the water by oxidizing ammonia and/or ammonium to reduce the concentration of total ammonia nitrogen (TAN) in the water, and output nitrified water. The system can include a sanitization stage configured to receive the nitrified water, sanitize the water to reduce bacteria in the water, and output sanitized water.

The plurality of growth trays can include a first growth tray, a second growth tray, a third growth tray, a fourth growth tray, a fifth growth tray, a sixth growth tray, and a seventh growth tray. The first growth tray can have a first configuration to drain water out of the first growth tray, a second configuration to transfer water and animals (e.g., shrimp) from the first growth tray to the second growth tray, and a third configuration to transfer water and animals (e.g., shrimp) from the first growth tray to the third growth tray. The second growth tray can have a first configuration to drain water out of the second growth tray, a second con-figuration to transfer water and animals (e.g., shrimp) from the second growth tray to the fourth growth tray, and a third configuration to transfer water and animals (e.g., shrimp) from the second growth tray to the third fifth tray. The third growth tray can have a first configuration to drain water out of the third growth tray, a second configuration to transfer water and animals (e.g., shrimp) from the third growth tray to the sixth growth tray, and a third configuration to transfer water and animals (e.g., shrimp) from the second growth tray to the third seventh tray. The aquaculture system can have a drainage tray positioned below the plurality of growth trays. Water can drain out of the plurality of growth trays and into the drainage tray. The drainage tray can include a denitrifier for converting nitrates in the water in the drainage tray into nitrogen.

The water can be pressurized when the oxygenator oxy-genates the water. The oxygenator can be configured to increase the dissolved oxygen in the water such that the dissolved oxygen in the treated water delivered to the plurality of growth trays is higher than a level of solubility of oxygen in the water at atmospheric pressure, such that bubbles are formed in the water in the plurality of growth trays. The nitrification stage can include three nitrification biological filters having an operating configuration in which water is directed through the three nitrification biological filters in parallel, and a backflush configuration in which the three nitrification biological filters are interconnected such that water output from two of the nitrification biological filters can be used to backflush a third of the nitrification biological filters, wherein the water treatment system com-prises piping to send water used to backflush the third of the nitrification biological filters to the particulate filter, which can avoid (e.g., reduce) discharging water from the water treatment system. The plurality of growth trays can include shrimp. The water can be salt water. The sanitization stage can include an electrochlorinator, which can be configured to use electrolysis to convert salt to chlorine. The water treatment system can include a dechlorination stage that converts chlorine in the water to salt. One or more first filters in the water treatment system can be disposed over one or more second filters such that the footprint(s) of the one or more first filters at least partially overlap the footprint(s) of the one or more second filters.

The aquaculture system can include a monitoring system, which can have a fluid analyzer configured to measure one or more characteristics of a water sample delivered to the fluid analyzer, and a plurality of tubes for delivering samples of water to the fluid analyzer from a plurality of locations in the system. A controller can be configured to transport water from a first location in the water treatment system to the monitoring system during a first time to flush out water from a prior sample, deliver a first water sample from the first location in the water treatment system to the fluid analyzer, perform one or more measurements on the first water sample, transport water from a second location in the water treatment system to the monitoring system during a second time to flush out water from the first water sample, deliver a second water sample from the second location in the water treatment system to the fluid analyzer, and perform one or more measurements on the second water sample. The plurality of tubes can be configured to deliver to the fluid analyzer water samples from each of the plurality of growth trays, the oxygenated water after the oxygenator, the nitrified water after the nitrification stage, the sanitized water after the sanitization stage, and the treated water output from the water treatment system to the plurality of the growth trays. The plurality of growth trays can output soiled water to a drainage tray. The water treatment system can receive soiled water from the drainage tray. The monitoring system can output the water samples to the drainage tray after measurement.

Various embodiments disclosed herein can relate to an aquaculture system (e.g., for growing shrimp), which can include a plurality of growth trays in a stacked configuration. The plurality of growth trays can include a first growth tray, a second growth tray, a third growth tray, a fourth growth tray, a fifth growth tray, a sixth growth tray, and a seventh growth tray. A drainage tray can be positioned below the plurality of growth trays. Water can drain out of the plurality of growth trays and into the drainage tray. The system can include a water treatment system configured to treat the water received from the drainage tray and to deliver treated water to the plurality of growth trays. The first growth tray can have a first configuration to drain water out of the first growth tray and into the drainage tray while impeding animals (e.g., shrimp) from exiting the first growth tray, a second configuration to transfer water and animals (e.g., shrimp) from the first growth tray to the second growth tray, and a third configuration to transfer water and animals (e.g., shrimp) from the first growth tray to the third growth tray. The second growth tray can have a first configuration to drain water out of the second growth tray and into the drainage tray while impeding animals (e.g., shrimp) from exiting the second growth tray, a second configuration to transfer water and animals (e.g., shrimp) from the second growth tray to the fourth growth tray, and a third configuration to transfer water and animals (e.g., shrimp) from the second growth tray to the third fifth growth tray. The third growth tray can have a first configuration to drain water out of the third growth tray and into the drainage tray while impeding animals (e.g., shrimp) from exiting the third growth tray, a second configuration to transfer water and animals (e.g., shrimp) from the third growth tray to the sixth growth tray, and a third configuration to transfer water and animals (e.g., shrimp) from the second growth tray to the third seventh tray.

The water treatment system can include one or more pumps to move water through the water treatment system, a particulate filter, an oxygenator, a nitrification stage, and/or a sanitizing stage. The first growth tray can be positioned above the second growth tray. The second growth tray can be positioned above the third growth tray. The third growth tray can be positioned above the fourth growth tray. The fourth growth tray can be positioned above the fifth growth tray. The fifth growth tray can be positioned above the sixth growth tray. The sixth growth tray can be positioned above the seventh growth tray. The plurality of growth trays can have substantially the same size. The aquaculture system can include one or more preliminary growth trays positioned above the first growth tray. The system can have a first preliminary growth tray and a second preliminary growth tray. The second preliminary growth tray can be smaller than the first growth tray. The first preliminary growth tray can be smaller than the second preliminary growth tray. The first preliminary growth tray can be positioned alongside the second preliminary growth tray. A fluid pathway can connect a first preliminary growth tray to a second preliminary growth tray. The fluid pathway can have a closed configuration to isolate the first preliminary growth tray from the second preliminary growth tray, and an open configuration to permit water and animals (e.g., shrimp) to move from the first preliminary growth tray, through the fluid pathway, to the second preliminary growth tray. At least one preliminary growth tray can have a first configuration to drain water into the first growth tray while impeding animals (e.g., shrimp) from exiting the at least one preliminary growth tray, and a second configuration to transfer water and animals (e.g., shrimp) from the at least one preliminary growth tray to the first growth tray. The system can include a water level adjuster that comprises a movable pipe that provides a water exit pathway, wherein a water level in a corresponding growth tray (e.g., a preliminary growth tray) is determined based at least in part on the height of the movable pipe. The aquaculture system can include a first stack of growth trays configured to drain water into the drainage tray, and a second stack of growth trays separate from the first stack and configured to drain water into the same drainage tray.

The aquaculture system can include lights positioned to illuminate the plurality of growth trays, and a controller configured to mimic a day to night cycle by gradually brightening and gradually dimming the lights. The controller can be configured to implement a day to night cycle that is faster than a natural day to night cycle. The controller can be configured to distribute feed to the plurality of growth trays according to a schedule that is synchronized with the implemented day to night cycle. The aquaculture system can include a barrier extending at least partially across a gap between a lower growth tray and an upper growth tray. The barrier can be configured to impede animals (e.g., shrimp) from exiting through the gap. The barrier can include a one-way vision element configured to permit visibility from outside into the lower growth tray, and to impede visibility from inside the lower growth tray to the outside environment.

The aquaculture system can include a track positioned above a growth tray, and a sweeper, which can include a sweeper frame. In some embodiments, one or more rollers can be configured to facilitate movement of the sweeper frame along the track. An arm can be rotatably coupled to the sweeper frame. The arm can be rotatable between a deployed position and a retracted position. A sweeping member can be coupled to a distal end of the arm. The sweeping member can be configured to promote movement of animals (e.g., shrimp) or particulate matter in the growth tray. A biasing member can be configured to bias the arm towards the deployed position for a first range of arm positions and to bias the arm toward the retracted position for a second range of arm positions. The aquaculture system can include a retracting feature configured to push the arm towards the retracted position as the sweeper moves in a first direction along the track, and a deploying feature configured to push the arm towards the deployed position as the sweeper moves in a second direction along the track. One or more water outlets can be movable between a lowered position and a raised position. The raised position can place the water outlets above the sweeping member.

The aquaculture system can include a valve system for a growth tray configured to hold water and animals (e.g., shrimp). The valve system can include an outlet configured to drain the water and animals (e.g., shrimp) out of the growth tray when exposed, a valve guide extending upward from the outlet, and a drain valve movable between a closed position and an open position. The drain valve can include an inner valve sheath having an open top side, an open bottom side, and closed side walls. The inner valve sheath can slidably fit over the valve guide. A height of the inner valve sheath can at least partially define a water level in the growth tray when the drain valve is in the closed position. An outer valve sheath can have side walls surrounding the side walls of the inner valve sheath. The side walls of the outer valve sheath can have openings configured to allow water to pass through and to impede the animals (e.g., shrimp) from passing through. The inner valve sheath and the outer valve sheath can be coupled to move together between the closed position and the open position. When the drain valve is in the closed position, the drain valve can be configured to permit water that is above the open top side of the inner valve sheath to pass through the open top side, through the inner valve sheath, through the open bottom side, and out the outlet, while water that is below the open top side of the inner valve sheath is impeded from flowing to the outlet by the closed side walls. The drain valve can be configured to slide upward away from the outlet to transition from the closed position to the open position. When the drain valve is in the open position, the drain valve can be configured to permit the water and the animals (e.g., shrimp) to flow under the drain valve and out the outlet. The outer sheath can include a rigid portion having a plurality of openings and a liner positioned over the openings. The liner can have apertures to permit water to pass through the liner while impeding the animals (e.g., shrimp) from passing through the liner.

Various embodiments disclosed herein can relate to a method of operating an aquaculture system. The method can include growing animals (e.g., shrimp) in a plurality of growth trays in a stacked configuration. The plurality of growth trays can include a first growth tray, a second growth tray, a third growth tray, a fourth growth tray, a fifth growth tray, a sixth growth tray, and a seventh growth tray. The method can include circulating water through the plurality of growth trays to a drainage tray, from the drainage tray through a water treatment system, and from the water treatment system to the plurality of growth trays. The method can include harvesting animals (e.g., shrimp) from the fourth, fifth, sixth, and seventh growth trays, transferring animals (e.g., shrimp) from the third growth tray into the sixth and seventh growth trays, transferring animals (e.g., shrimp) from the second growth tray into the fourth and fifth growth trays, transferring animals (e.g., shrimp) from the first growth tray into the second and third growth trays, and introducing animals (e.g., shrimp) into the first growth tray. Introducing the animals can include transferring animals (e.g., shrimp) from a second preliminary growth tray into the first growth tray. The method can include transferring animals (e.g., shrimp) from a first preliminary growth tray to the second preliminary growth tray, and introducing animals (e.g., shrimp) into the first preliminary growth tray.

Various embodiments disclosed herein can relate to a water treatment system, such as for treating water for use in aquaculture. The system can include one or more pumps to move water through the water treatment system. The system can include a particulate filter configured to receive soiled water containing aquaculture waste, filter particulate matter from the water by impeding particles larger than a threshold size from passing through the particulate filter, and output filtered water. The system can include an oxygenator configured to receive the filtered water, oxygenate the water to increase a level of dissolved oxygen in the water, and output oxygenated water. The system can include a nitrification stage configured to receive the oxygenated water, nitrify the water by oxidizing ammonia and/or ammonium to reduce the concentration of total ammonia nitrogen (TAN) in the water, and output nitrified water. The system can include a chlorination stage configured to receive the nitrified water, chlorinate the water by increasing a concentration of chlorine in the water, such that the increased concentration of chlorine is sufficient to at least partially neutralize bacteria in the water, and output chlorinated water. The system can include a dechlorination stage configured to receive the chlorinated water, reduce the concentration of chlorine in the water, and output dechlorinated water.

The system can include a receptacle for holding the soiled water. The receptacle can include a denitrifier for converting nitrates in the soiled water into nitrogen. The denitrifier can be a denitrifying bacteria. The particulate filter can be configured to impede particles larger than the threshold size of between 2 m and 30 m from passing through the particulate filter. The particulate filter can be configured to impede particles larger than the threshold size of between 5 m and 10 m from passing through the particulate filter. The particulate filter can include a cartridge filter.

The system can be configured to pressurize the water when the oxygenator oxygenates the water. The water can be pressurized to between 15 psi and 60 psi. The oxygenator can be configured to increase the dissolved oxygen in the water to between 10 mg per liter and 30 mg per liter. The oxygenator can be configured to increase the dissolved oxygen in the water to between 15 mg per liter and 25 mg per liter. The oxygenator can be configured to increase the dissolved oxygen in the water such that after the nitrification stage nitrifies the water, the dissolved oxygen in the water is higher than a level of solubility of oxygen in the water at atmospheric pressure. The system can include a water delivery system for delivering the water to one or more aquaculture receptacles containing aquatic animals. The dissolved oxygen in the water output from the water delivery system into the one or more aquaculture receptacles can have dissolved oxygen that is higher than a level of solubility of oxygen in the water at atmospheric pressure, such that bubbles are formed in the water in the one or more aquaculture receptacles. The oxygenator can include a venturi injector.

The nitrification stage can include a biological filter having nitrifying bacteria. The nitrification stage can include three nitrification biological filters that are interconnected such that water output from two of the nitrification biological filters can be used to backflush a third of the nitrification biological filters. The system can include piping to send water used to backflush the nitrification biological filter(s) to the particulate filter. The nitrification stage can be configured to reduce the concentration of total ammonia nitrogen (TAN). The water can be salt water. The chlorination stage can include an electrochlorinator, which can be configured to use electrolysis to convert salt to chlorine. The dechlorination stage can convert chlorine in the water to salt. The dechlorination stage can include an activated carbon filter. The dechlorination stage can include three filters that are interconnected such that water output from two of the filters can be used to backflush a third of the filters. The system can include piping to send water used to backflush the filter(s) to the particulate filter. The system can include a temperature regulation system configured to change a temperature of the water output by the water treatment system. The temperature regulation system can be configured to regulate the temperature of the water output by the water treatment system to between 25 degrees Celsius and 30 degrees Celsius.

The system can include a water delivery system for delivering the treated water to a plurality of aquaculture receptacles containing aquatic animals (e.g., shrimp). The water delivery system can include a plurality of water outlets for each of the plurality of aquaculture receptacles. The water delivery system can be configured to output water from each of the plurality of water outlets for each of the plurality of aquaculture receptacles with flow rates that vary by no more than 20%. The system can include a water delivery system for delivering water to one or more aquaculture receptacles containing aquatic animals (e.g., shrimp). The water delivery system can include a plurality of water outlets oriented to output water into the one or more aquaculture receptacles to produce circulating water flow within the one or more aquaculture receptacles.

The system can include a monitoring system, which can have a fluid analyzer configured to measure one or more characteristics of a water sample delivered to the fluid analyzer, and a plurality of tubes for delivering samples of water to the fluid analyzer from a plurality of locations in the water treatment system. The fluid analyzer can be configured to measure one or more of total ammonia nitrogen (TAN), unionized ammonia, nitrite, nitrate, free chlorine, total chlorine, oxygen, pH, salinity, and total suspended solids (TSS) in the water samples, oxidation reduction potential (ORP), or other analytes. The plurality of tubes can be coupled to deliver to the fluid analyzer water samples of one or more of the soiled water before the particulate filter, the filtered water after the particulate filter, the oxygenated water after the oxygenator, the nitrified water after the nitrification stage, the chlorinated water after the chlorination stage, the dechlorinated water after the dechlorination stage, and water output from the water treatment system to one or more aquaculture receptacles. The water treatment system can output water to a plurality of aquaculture receptacles, and each of the plurality of aquaculture receptacles can be coupled to the fluid analyzer by tubes for delivering water samples from each of the plurality of aquaculture receptacles to the fluid analyzer. The plurality of aquaculture receptacles can output soiled water to a soiled water receptacle. The water treatment system can receives soiled water from the soiled water receptacle. The monitoring system can output water samples to the soiled water receptacle after measurement. The monitoring system can include a controller, which can be configured to transport water from a first location in the water treatment system to the monitoring system during a first time to flush out water from a prior sample, deliver a first water sample from the first location in the water treatment system to the fluid analyzer, perform one or more measurements on the first water sample, transport water from a second location in the water treatment system to the monitoring system during a second time to flush out water from the first water sample, deliver a second water sample from the second location in the water treatment system to the fluid analyzer, and perform one or more measurements on the second water sample. The monitoring system can include memory for storing the one or more measurements performed for the water samples. The monitoring system can include a user interface for outputting information relating to a plurality of measurements taken for water from the first location over time and to a plurality of measurements taken for water from the second location over time. A controller can be configured to execute an alert when a measured characteristic of a water sample is outside a threshold range. The water treatment system can include a controller configured to adjust one or more parameters automatically in response to one or more measurements from the monitoring system.

The water treatment system can have a footprint between 5 m² and 100 m². One or more first filters in the water treatment system can be disposed over one or more second filters such that the footprint(s) of the one or more first filters at least partially overlap the footprint(s) of the one or more second filters. The system can have or more first stage biofilters, and one or more second stage biofilters. One of the first or second stage biofilters can be positioned above the other of the first or second stage biofilters. In some embodiments, the oxygenator can be configured to input air into the water to oxygenate the water.

Various embodiments disclosed herein can relate to a method for treating water, such as for use in aquaculture. The method can include accessing water containing aquaculture waste, filtering particulate matter out of the water using the particulate filter, oxygenating the water to raise a level of dissolved oxygen (DO) in the water, nitrifying the water to reduce a concentration of total ammonia nitrogen (TAN) in the water, and sanitizing the water. The method can include any of the features, such as relating to water treatment, disclosed herein.

Various embodiments disclosed herein can relate to an aquaculture system, which can have a plurality of growth trays in a stacked configuration, and a waste water tray positioned below the plurality of growth trays. Waste water can flow out of the plurality of growth trays and into the waste water tray. The system can have a water treatment system configured to treat the waste water and deliver treated water to the plurality of growth trays. The system can include any of the features disclosed herein.

Various embodiments disclosed herein can relate to a valve system, such as for use with an aquaculture system. The valve system can include an aquaculture container configured to hold water and aquatic animals, an outlet configured to drain the water and aquatic animals out of the aquaculture container when exposed, a valve guide extending upward from the outlet, and a drain valve movable between a closed position and an open position. The drain valve can include an inner valve sheath having an open top side, an open bottom side, and closed side walls. The inner valve sheath can slidably fit over the valve guide. An outer valve sheath can have side walls surrounding the side walls of the inner valve sheath. The side walls of the outer valve sheath can have openings configured to allow water to pass through and to impede the aquatic animals from passing through. The inner valve sheath and the outer valve sheath can be coupled to move together between the closed position and the open position. When the drain valve is in the closed position, the drain valve can be configured to permit water that is above the open top side of the inner valve sheath to pass through the open top side, through the inner valve sheath, through the open bottom side, and out the outlet, while water that is below the open top side of the inner valve sheath can be impeded from flowing to the outlet by the closed side walls. The drain valve can be configured to slide upward away from the outlet to transition from the closed position to the open position. When the drain valve is in the open position, the drain valve can be configured to permit the water and the aquatic animals to flow under the drain valve and out the outlet.

The valve system can include an actuator coupled to the outer sheath. The actuator can be configured to pull the drain valve up to the open position and to move the drain valve down to the closed position. The outer sheath can include a rigid portion having a plurality of openings and a liner positioned over the openings. The liner can have apertures to permit water to pass through the liner while impeding the aquaculture animals from passing through the liner. The outlet, valve guide, inner sheath, and outer sheath can be concentric and can share a common axis. The outlet, valve guide, inner sheath, and outer sheath can be circular in cross-sectional shape. The drain valve can include a support foot configured to seal against a surface outside the outlet. The height of the inner sheath can at least partially define a water level in the aquaculture container when the drain valve is in the closed position.

Various embodiments disclosed herein can relate to a valve, which can include an outlet, and a drain valve movable between a closed position and an open position. The drain valve can have a bottom end configured to cover the outlet when in the close position, closed side walls extending from the bottom end, and at least one opening above the closed side walls. The drain valve in the closed position can be configured to permit fluid to flow through the at least one opening, through an inside of the closed side walls of the drain valve, and through the outlet. The drain valve in the closed position can be configured to impede objects over a threshold size from flowing to the outlet. The drain valve can be configured to move away from the outlet to transition from the closed position to the open position. The drain valve in the open position can be configured to permit fluid and objects over the threshold size to pass under the drain valve and through the outlet.

The drain valve can include an inner sheath and an outer sheath that surrounds the inner sheath. The valve can include a valve guide positioned inside the drain valve. The valve guide can be configured to permit movement of the drain valve in an axial direction and to impede movement of the drain valve in a non-axial direction. The drain valve can include one or more openings in a rigid support material and a flexible liner disposed over the one or more openings. The liner can have apertures configured to permit fluid to flow therethrough while impeding the objects over the threshold size from flowing therethrough.

Various embodiments disclosed herein can relate to a drain valve system, such as for use with an aquaculture system. The drain valve system can include a valve support, and a guide. The guide can be configured to allow the fluid and aquatic animals to pass therethrough to an outlet. A rigid valve sheath can be sized to fit around the guide structure and can be configured to cover the outlet in a closed configuration such that fluid can flow through the rigid valve sheath to the outlet and such that the aquatic animals are impeded from flowing to the outlet. A mechanical actuator can be attached to the rigid sheath, and the mechanical actuator can be configured to translate the rigid sheath between the close configuration and the open configuration. The open configuration can be configured to expose the outlet to permit fluid and the aquatic animals to flow out the outlet.

Various embodiments disclosed herein can relate to a method of acclimating aquatic animals to an aquaculture system. The method can include accessing a plurality of aquatic animals in a first body of water. The first body of water can have a first set of one or more water parameters. The method can include depositing the plurality of aquatic animals and the first body of water into a first area of the aquaculture system, and circulating a second body of water through a second area. The second body of water can have a second set of one or more water parameters different than the first set of one or more water parameters of the first body of water. The method can include isolating the first area from the second area such that water is impeded from flowing from the first area to the second area. The plurality of aquatic animals can be impeded from flowing from the first area to the second area. The method can include changing the first set of one or more water parameters of the first body of water to become closer to the second set of one or more water parameters of the second body of water gradually over a period of time. The method can include joining the first area to the second area such that water is permitted to flow from the first area to the second area, while the plurality of aquatic animals are impeded from flowing from the first area to the second area. The method can include circulating water through both the first area and the second area while the plurality of aquatic animals are contained in the first area.

Changing the first set of one or more water parameters of the first body of water can include adding water from the second body of water to the first area to increase the amount of water in the first area. Joining the first area to the second area can include collapsing a first collapsible weir. Joining the first area to the second area can include opening a valve. The method can include growing the plurality of aquatic animals in the first area for a growth period of time, and transferring the plurality of aquatic animals to the second area. Transferring the plurality of aquatic animals to the second area can include collapsing a second collapsible weir, or opening a valve. Changing the first set of one or more water parameters of the first body of water can include changing at least one of a pH, a salinity, and/or a temperature of the first body of water. The period of time can be at least about 1 day. The period of time can be at least about 2 days. The period of time can be at least about 3 days. Joining the first area to the second area can include removing a first divider between the first area and an intermediate area positioned between the first area and the second area. A second divider can separate the intermediate area from the second area. The second divider can be configured to permit water to pass through the second divider while impeding the plurality of aquatic animals from passing through the second divider.

Various embodiments disclosed herein can relate to an aquaculture system, which can include an aquaculture growth tray configured to hold water and a plurality of aquatic animals. One or more dividers can separate the aquaculture growth tray into at least first and second areas. The one or more dividers can have a first configuration that is configured to isolate the first area from the second area such that water and the plurality of aquatic animals are not transferred from the first area to the second area. The one or more dividers can have a second configuration that is configured to permit water to flow from the first area to the second area in the growth tray while impeding the plurality of aquatic animals from moving from the first area to the second area. The one or more dividers can have a third configuration that is configured to permit water and the plurality of aquatic animals to move from the first area to the second area in the growth tray.

The growth tray can include an intermediate area between the first area and the second area. The plurality of aquatic animals can be impeded from entering the intermediate area in the first configuration. The plurality of aquatic animals can be permitted to enter the intermediate area in the second configuration. The one or more dividers can include two dividers, separating the growth tray into three areas. The one or more dividers can include one or more collapsible weirs. The one or more dividers can include one or more removable walls. The one or more dividers can include a divider having a first state that is watertight, a second state that is water permeable, and a third state that is collapsed.

Various embodiments disclosed herein can relate to an aquaculture system, which can include a growth tray, first divider isolating a first area in the growth tray so that water and a first plurality of aquatic animals are contained therein, and a second divider defining an intermediate area between the first and second dividers, and defining a second area on an opposite side of the second divider from the intermediate area. A second plurality of aquatic animals can be contained in the second area. The second divider can be configured to permit water to flow between the second area and the intermediate area while impeding the second plurality of aquatic animals from passing through the second divider.

The intermediate container does not contain aquatic animals in some configurations. The first divider can be removable to combine the first area with the intermediate area. The first divider and the second divider can be removable to combine the first area, the intermediate area, and the second area. The first divider can be a collapsible weir. The second divider can be a collapsible weir.

Various embodiments disclosed herein can relate to an aquaculture system, which can include a growth tray, a track positioned above the growth tray, and a sweeper. The sweeper can include a sweeper frame, one or more rollers configured facilitate movement of the sweeper frame along the track, and an arm rotatably coupled to the sweeper frame. The arm can be rotatable between a deployed position and a retracted position. A sweeping member can be coupled to a distal end of the arm. The sweeping member can be configured to promote movement of aquatic animals and/or particulate matter in the growth tray. A biasing member can be configured to bias the arm towards the deployed position for a first range of arm positions and to bias the arm toward the retracted position for a second range of arm positions.

The system can include a frame structure supporting a plurality of growth trays. The track can be attached to the frame structure. The system can include a retracting feature configured to push the arm towards the retracted position as the sweeper moves forward relative to the growth tray. The system can include a deploying feature configured to push the arm towards the deployed position as the sweeper moves rearward relative to the growth tray.

BRIEF DESCRIPTION OF THE DRAWINGS

Certain embodiments will be discussed in detail with reference to the following figures, wherein like reference numerals refer to similar features throughout. These figures are provided for illustrative purposes and the embodiments are not limited to the specific implementations illustrated in the figures.

FIGS. 12A-I show example embodiments of a valve.

DETAILED DESCRIPTION OF CERTAIN EMBODIMENTS

Figure 1:
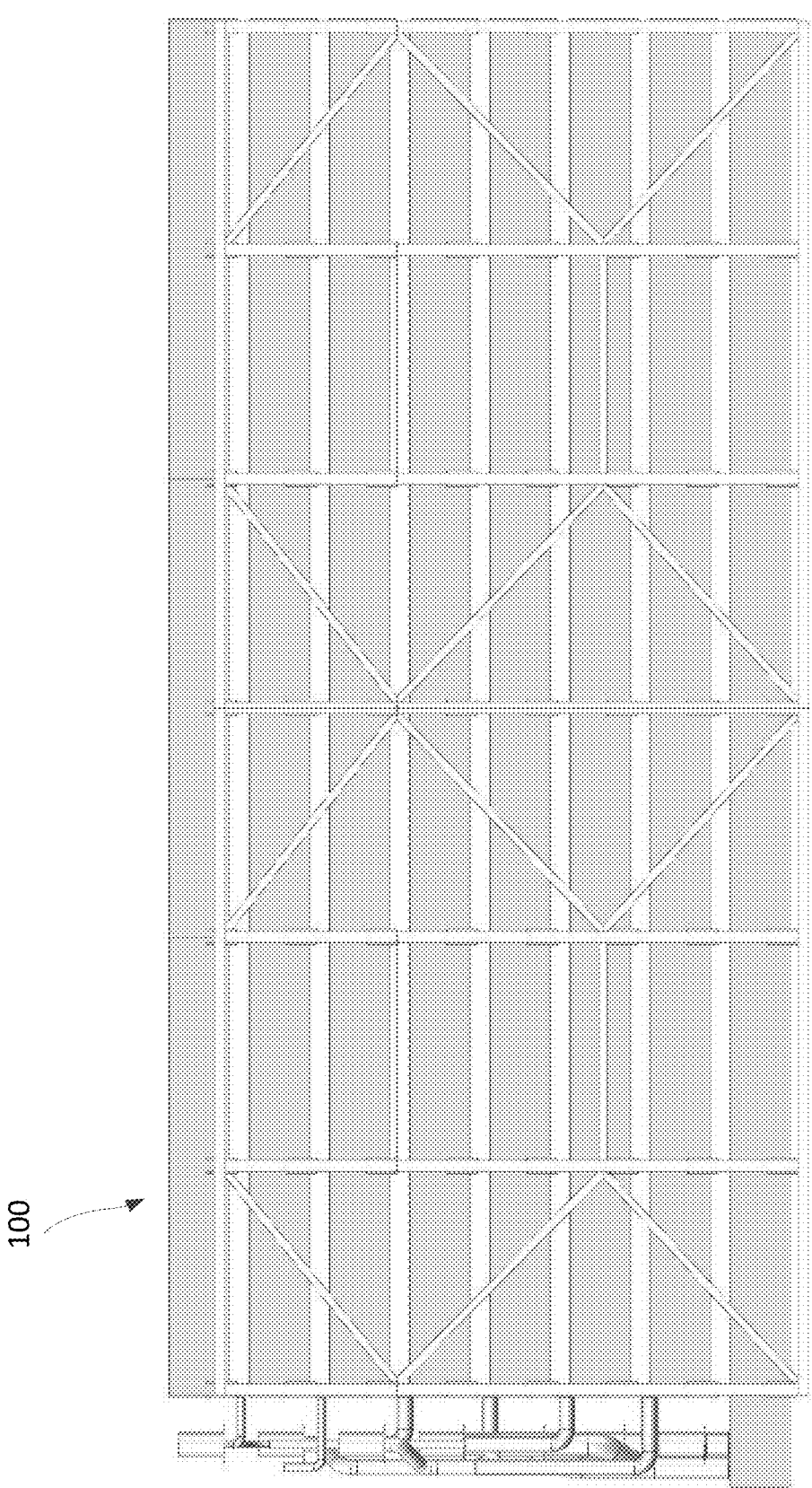
FIG. 1 is a side view of an example embodiment of an aquaculture system.

Some embodiments can relate to transportable aquaculture systems, including but not limited to shrimp farms, which can be delivered to a place of operation, for example to be assembled and initial operation by trained personnel. As shown in the figures and discussed herein, the farm can be modular and can be designed to be straightforward and inexpensive to assemble, test, disassemble, transport in components to the place of operation, and/or reassemble for operation. Multiple sets (e.g., pairs and quads, etc.) of each farm may be combined to duplicate or otherwise increase capacity. The farm structure components can be sized for simple roadway and offshore transport to the place of operation in standard ISO shipping containers. The corresponding water treatment skid system can be sized to fit within an ISO shipping container, such as without disassembly.

Some embodiments can relate to aquaculture systems that are configured for high density (e.g., 6-10 percent biomass to water) aquaculture, including shrimp, production with adjustable volume, production, and/or density. Due to the extensive control of the water characteristics, continuous or periodic disinfection and oxidation of ammonia and other reduced contaminants, food to aquaculture ratio, and/or reduced use of excrement biofloc as a food source, a high density of aquaculture can be achieved, such as on the order of 6-10% biomass and 90-94% water, to maximize production of biomass.

Some embodiments can use multiple (e.g., seven, eight, or more) independent and isolated areas for distinct aquaculture biomass development stages. As shown in FIGS. 1, 2A, 4, and 5, each farm can contain seven independent growth trays. In some embodiments, a first growth tray (e.g., the highest growth tray) can contain the youngest and/or smallest of the aquatic animals. The first growth tray can have multiple sections (e.g., defined by dividers in the first growth tray), and the different sections can contain different sizes and/or ages of the aquatic animals. In some embodiments, the different sections of the first growth tray can be used for different stages of larvae growth, or for separating post-larval animals (e.g., shrimp) from juvenile animals (e.g., shrimp). The first growth tray can be used for one or more first growth stages for the aquatic animals. Second and third growth trays (e.g., the second highest and third highest trays, respectively) can be used for a second growth stage of the aquatic animals, which can be larger in size and/or older than in the one or more first growth stages. The second and third growth trays can contain juvenile aquaculture ages. Fourth through seventh growth trays (e.g., the bottom four growth trays) be used for a third growth stage of the aquatic animals, which can be larger in size and/or older than in the second growth stage. The fourth through seventh growth trays can contain adult aquaculture ages. The water quality, water composition, velocity of water, and/or air in the growth trays, food addition, food type, food amount, and/or biofloc collection can vary in each growth environment, such as to maximize health (e.g., minimize growth inhibition including disease) and/or biomass production.

Figure 2A:
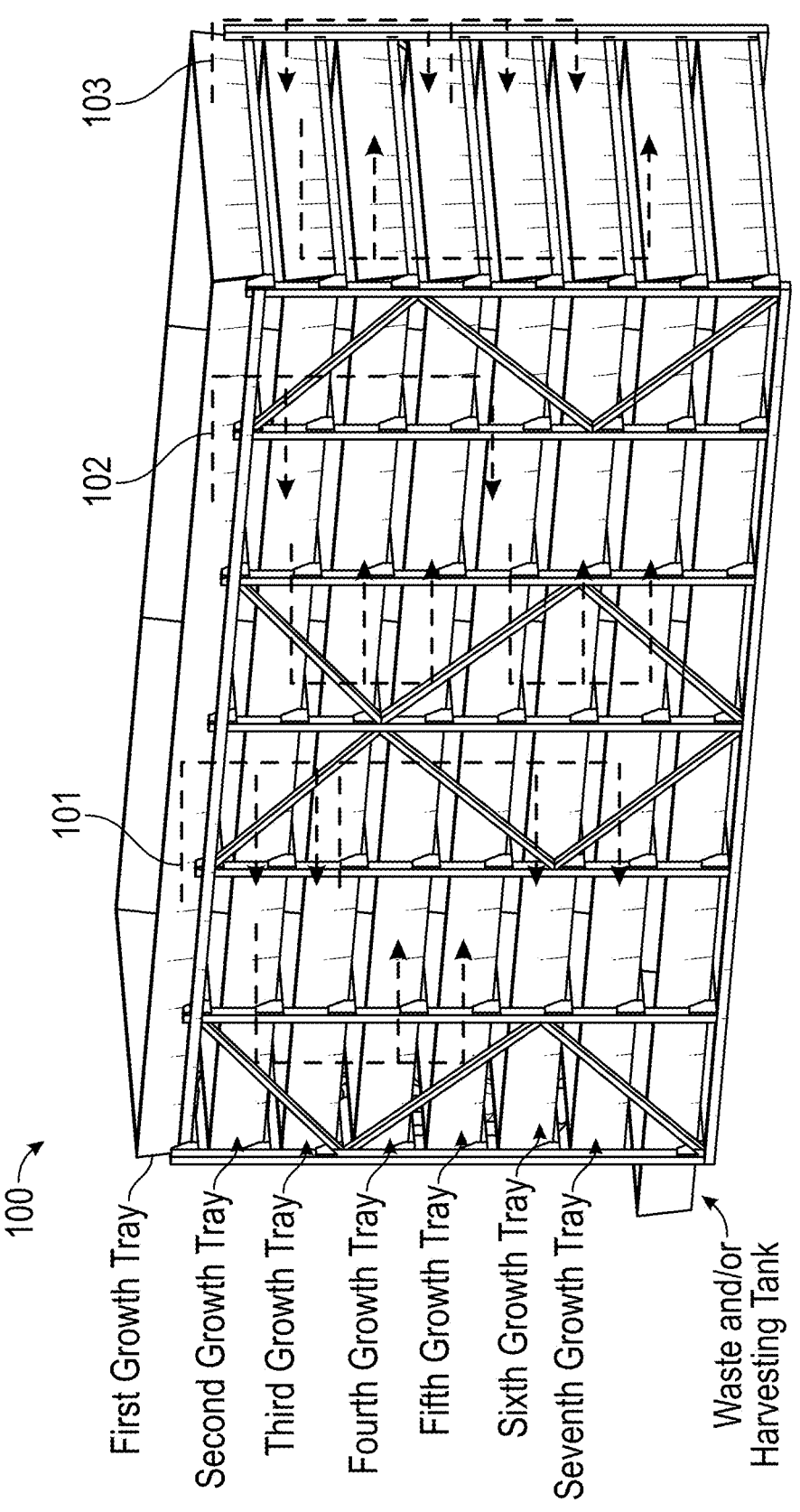
FIG. 2A is a perspective view of example embodiment of an aquaculture system.
Figure 2B:
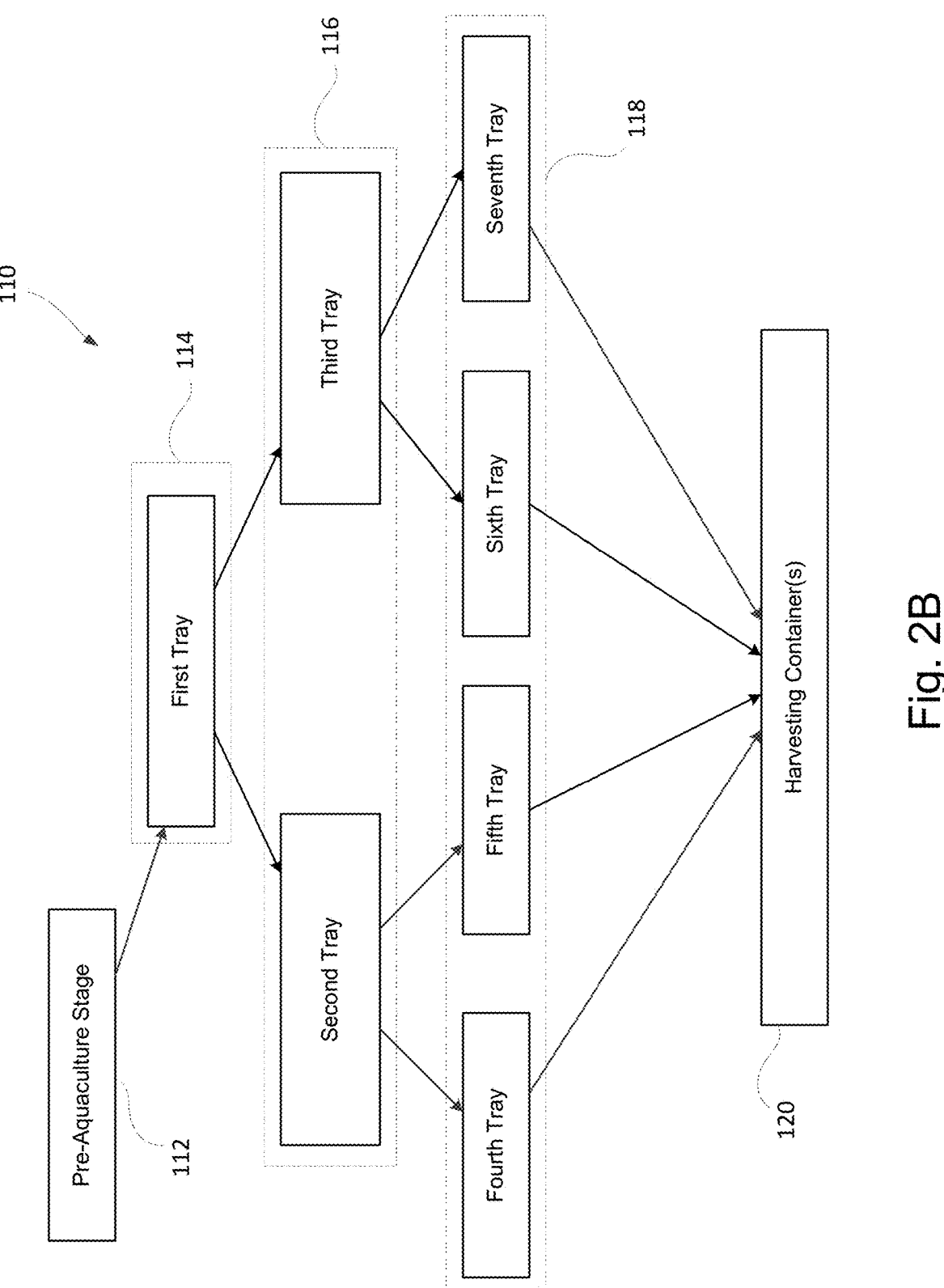
FIG. 2B is a flow chart of an example embodiment of an aquaculture growth cycle.

FIG. 2B shows an aquaculture flow system 110. The aquaculture flow system 110 can be described using various stages. The stages may be related to the growth stages. The aquaculture flow system 110 may optionally begin with a pre-aquaculture stage 112. For example, the aquatic animals can progress through one or more stages of life before being introduced into the aquaculture system (e.g., into the growth trays). For example, shrimp can be introduced to the first aquaculture stage 114 as post-larval shrimp. During the pre-aquaculture stage, the shrimp can progress through one or more larval stages, and in some embodiments can become post-larval shrimp. In some cases, post-larval shrimp can be supplied by a vendor. The pre-aquaculture stage 112 may include a post-larval shrimp container (e.g., a retainer or tray). Many alternatives are possible. For example, the aquaculture system can have additional aquaculture stages (e.g., for one or more larval stages), which can be in additional growth trays, or in divided sections of a growth tray.

The first aquaculture stage 114 may include part or all of a first tray. In a stacked configuration, the first tray may be the highest tray in the stack. The first aquaculture stage 114 may include aquatic animals during a post-larval stage. Once the aquatic animals have completed the first aquaculture growth stage (e.g., grown to a first size or for a first amount of time, such as to or nearly to a juvenile age), they may be transferred from the first aquaculture stage 114 (e.g., the first tray) to a second aquaculture stage 116. The second aquaculture stage 116 can contain second and third trays. In a first stacked configuration of the aquaculture flow system 110, the second and third trays may be the second and third trays from the top of the stack. In some designs, the second aquaculture stage 116 may include trays that are the second and fifth highest trays from the top.

The aquaculture flow system 110 can include a third aquaculture stage 118. The third aquaculture stage 118 may include fourth, fifth, sixth, and seventh trays. The third aquaculture stage 118 can be the receiving stage for aquatic animals that have completed the second aquaculture growth stage (e.g., grown to a second size or for a second amount of time, such as to reach or nearly reach an adult stage of life). As shown in FIG. 2B, in some designs, the fourth and fifth trays receive the aquatic animals from the second tray, and the sixth and seventh trays receive the aquatic animals from the third tray. Other combinations are possible. Animals from the second tray can be transferred to any two of the fourth, fifth, sixth, and seventh trays, and animals from the third tray can transferred to any other two of the fourth, fifth, sixth, and seventh trays. In some designs of a stacked configuration, the fourth, fifth, sixth, and seventh trays are the fourth, fifth, sixth, and seventh highest trays from the top, respectively (e.g., see the animal transfer lines 101 in FIG. 2A). In other designs, the fourth, fifth, sixth, and seventh trays are the third, fourth, sixth, and seventh trays from the top, respectively (e.g., see the animal transfer lines 102 in FIG. 2A). Many different combinations of transfers between growth trays can be used (e.g., see the animal transfer lines 103 of FIG. 2A as one additional example), where for each transfer the animals are divided from a source tray into two or more destination trays, and where the two or more destination trays are lower than the source tray, for example, so that gravity can facilitate the transfer of the animals. Each of the following are possible transfer patterns for 3 growth cycles using 7 growth trays.

Tray 1→trays 2 and 3; tray 2→trays 4 and 5; tray 3→trays 6 and 7.

Tray 1→trays 2 and 3; tray 2→trays 4 and 6; tray 3→trays 5 and 7.

Tray 1→trays 2 and 3; tray 2→trays 4 and 7; tray 3→trays 6 and 5.

Tray 1→trays 2 and 3; tray 2→trays 6 and 7; tray 3→trays 4 and 5.

Tray 1→trays 2 and 4; tray 2→trays 3 and 5; tray 4→trays 6 and 7.

Tray 1→trays 2 and 4; tray 2→trays 3 and 6; tray 4→trays 5 and 7.

Tray 1→trays 2 and 4; tray 2→trays 3 and 7; tray 4→trays 5 and 6.

Tray 1→trays 2 and 5; tray 2→trays 3 and 4; tray 5→trays 6 and 7.

The aquatic animals may be harvested after the third aquaculture stage 118. For example, the aquatic animals may be transferred to one or more harvesting containers 120. In some designs, the aquaculture system may include a soiled or waste water tray, which can receive soiled water from some or all of the trays in the aquaculture stages 114, 116, 118. The aquaculture system can have a waste and/or harvesting tank, as shown in FIG. 2B. In some embodiments, soiled water can be circulated from some or all of the growth trays to the waste tray via one or more pipes, and that water can be directed to a water treatment system, as discussed herein. In some cases, the same one or more pipes can output the animals (e.g., shrimp) during harvesting. One or more harvesting containers can be positioned in the waste container so that the animals (e.g., shrimp) can be transferred into the one or more harvesting containers. The one or more harvesting containers can be configured to allow the soiled water to pass through the one or more harvesting containers into the waste container, while capturing the animals (e.g., shrimp). For the example, the one or more harvesting containers can be sieves and can have holes to let the water pass through while impeding the animals from passing therethrough. In some cases, animals (e.g., shrimp) can be harvested from any of the growth trays, at any stage of growth. For example, when transferring animals from tray 2 to trays 4 and 5, so of the animals from tray 2 can be sent to a harvesting container. In some cases, animals can be harvested during a growth stage, rather than during a transfer between trays. For example, part-way through a growth stage, a valve can be opened on one or more of the growth trays, in any combination, to remove a subset of the animals from the one or more growth trays, to perform a partial harvest.

Figure 2C:
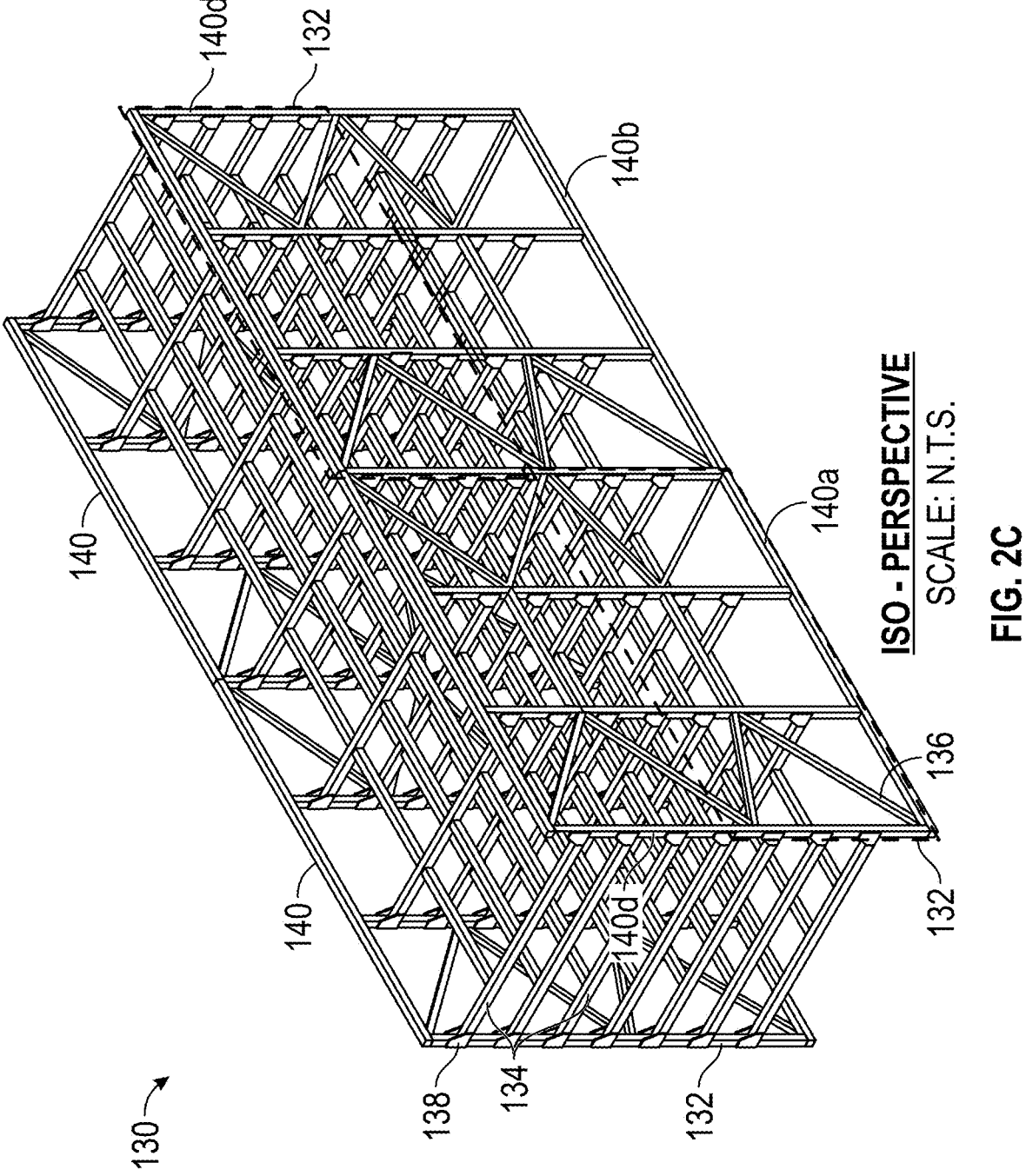
FIG. 2C is a perspective view of an example embodiment of a support structure.
Figure 2D:
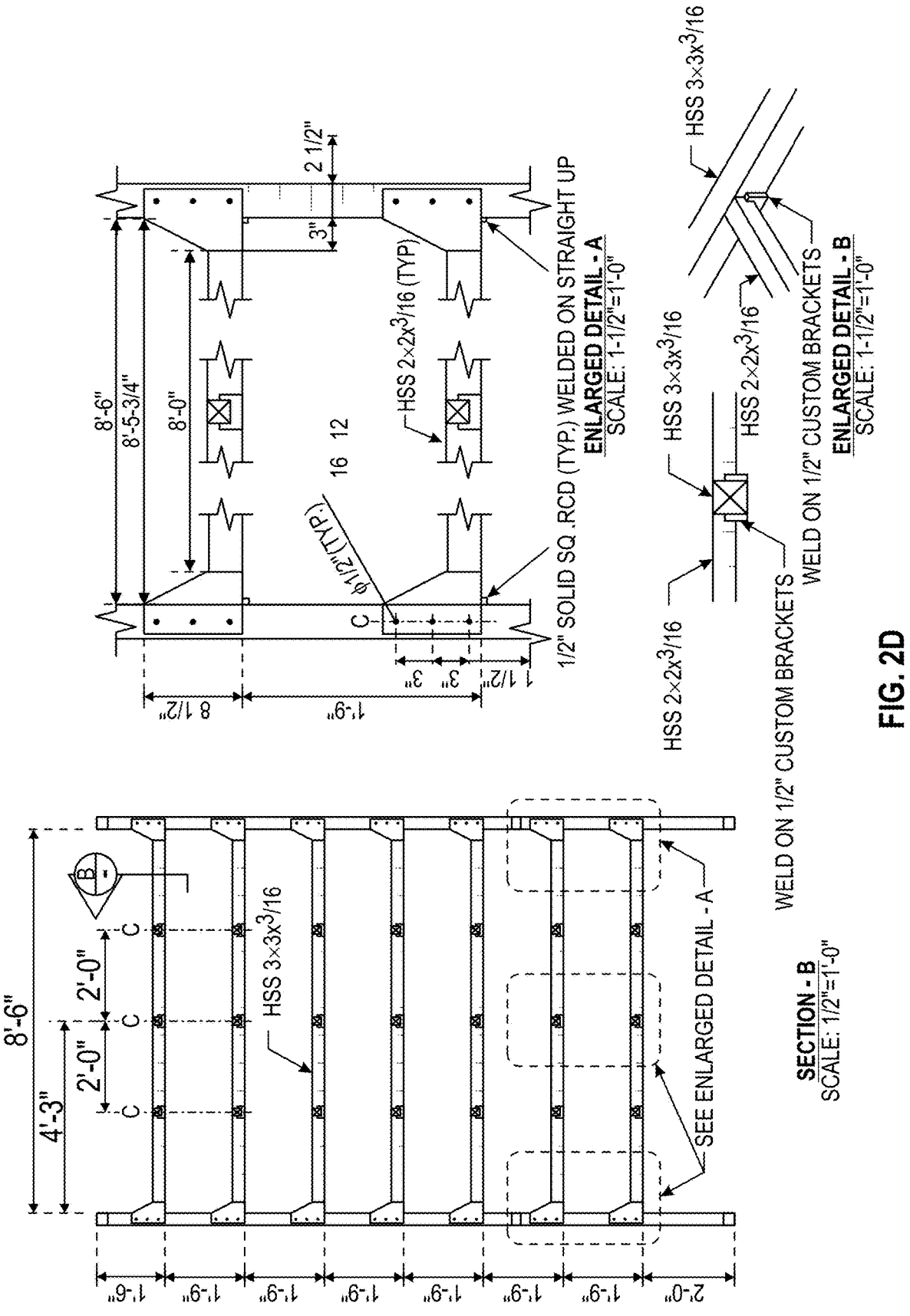
FIG. 2D shows an example embodiment of a support structure.

FIG. 2C illustrates a multilayer aquaculture support structure 130 for use, for example, in an aquaculture growth system 100. The multilayer aquaculture support structure 130 may include one or more sidewall frame segments 140. Each sidewall frame segment 140 may define a plane. Defining a plane may mean that each element of the sidewall frame segment 140 is coplanar. In some designs, each side of the multilayer aquaculture support structure 130 includes two sidewall frame segments 140 (e.g., four total sidewall frame segments 140 in the multilayer aquaculture support structure 130). In some designs, as shown in FIG. 2C, each side of the multilayer aquaculture support structure 130 includes four sidewall frame segments 140 (e.g., eight total sidewall frame segments 140 in the multilayer aquaculture support structure 130).

Each sidewall frame segment 140 may include one or more pillars 132. Each pillar 132 in the corresponding sidewall frame segment 140 may be parallel to one or more other pillars 132. Each sidewall frame segment 140 may further include one or more support beams 136. In some designs, some of the support beams 136 may be transverse with the ground. One or more support beams 136 of the sidewall frame segments 140 may be parallel to the ground. Each sidewall may include two or more sidewall frame segments 140 stacked on one another and/or two or more sidewall frame segments 140 adjacent one another. This can produce a sidewall that includes a two-by-two configuration of sidewall frame segments 140. Other configurations are possible. For example, two-by-three (e.g., two high, three wide), three-by-two (e.g., three high, two wide), three-by-three, and three-by-four configurations of sidewall frame segments 140 are also possible.

A sidewall frame segment 140 may be connected to a parallel sidewall frame segment 140 by way of one or more cross beams 134. The one or more cross beams 134 may be attached perpendicular to an pillar 132 of the corresponding sidewall frame segment 140. The cross beams 134 may be disposed parallel to the ground. The one or more cross beams 134 may be attached using one or more attachment devices 138. The attachment device 138 may include a bracket, a weld, a nail, and/or a bolt, or any other suitable fastener. A length of each of the pillars 132 can be sized to fit within a width of a standard intermodal freight container. The length of each pillar 132 can be greater than 5 feet. This can allow a multilayer aquaculture support structure 130 to be tall enough to support seven layers of trays. In some embodiments, the aquaculture system can fit into a space of 8 feet, by 9 feet, by 40 feet, when at least partially disassembled, including the growth trays, the support frame, the water treatment system, the feed system, etc.

A kit that is compact and easily transportable (e.g., internationally) using standard shipping and freight containers may be assembled. The kit may include a water treatment system 200 as described herein. A kit may include a first sidewall frame segment 140a that includes first and second end pillars parallel to and spaced from one another. The kit may include a second sidewall frame segment 140b comprising third and fourth end pillars parallel to and spaced from one another. The third end pillar of the second sidewall frame segment may be configured to be attached to the second end pillar of the first sidewall segment. The second sidewall frame segment 140b may be configured to be attached in a coplanar manner with the first sidewall frame segment 140a. The kit may further include a third sidewall frame segment 140c comprising fifth and sixth end pillars parallel to and spaced from one another. third sidewall frame segment 140c can be configured to stack on top of the first sidewall frame segment 140a. The fifth and sixth end pillars may be configured to stack on top of the first and second end pillars, respectively (e.g., one of the end pillars can be configured for insertion into a cavity of the other end pillars). The kit may include a fourth sidewall frame segment 140d comprising seventh and eighth pillars parallel to and spaced from one another. The fourth sidewall frame segment 140d can be configured to stack on top of the second sidewall frame segment 140b in like manner. The kit may include a plurality of beam segments 134, each of which can be configured for attachment to one of the sidewall frame segments perpendicular to corresponding pillars. A length of each of the pillars may be sized to fit within a width of a standard intermodal freight container.

Figure 3:
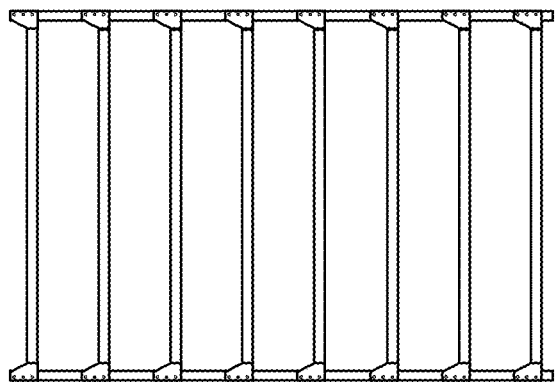
FIG. 3 shows an example embodiment of a support structure.
Figure 3:
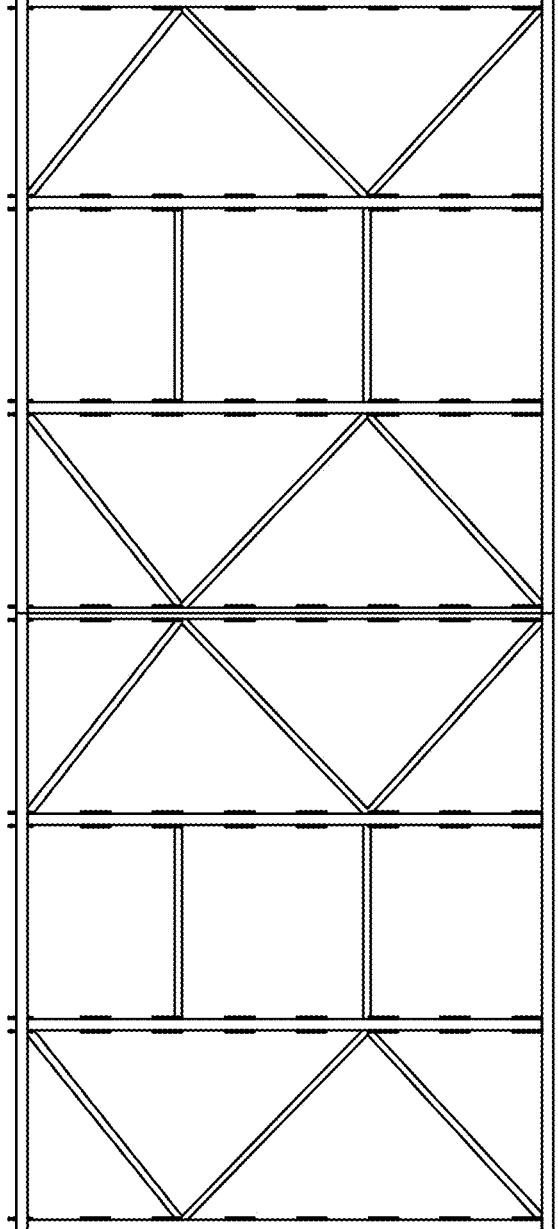
Figure 3:
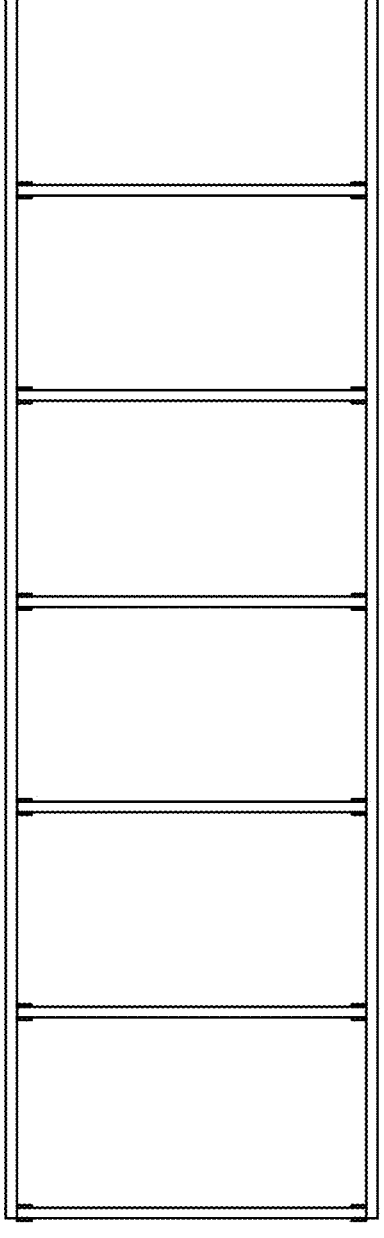

Various embodiments can relate to an integrated system support structure with removable growth trays. As shown at least in FIG. 3, a light weight lattice structure support design can be used to carry the weight of each growth trays, which can be installed vertically, one tray on top of the other, such as for a total of seven growth trays. A water treatment and/or harvesting tank can be situated below the seven growth trays (e.g., for receiving soiled water from the growth trays. The trays can be removable for replacement or mechanical cleaning.

Figure 4:
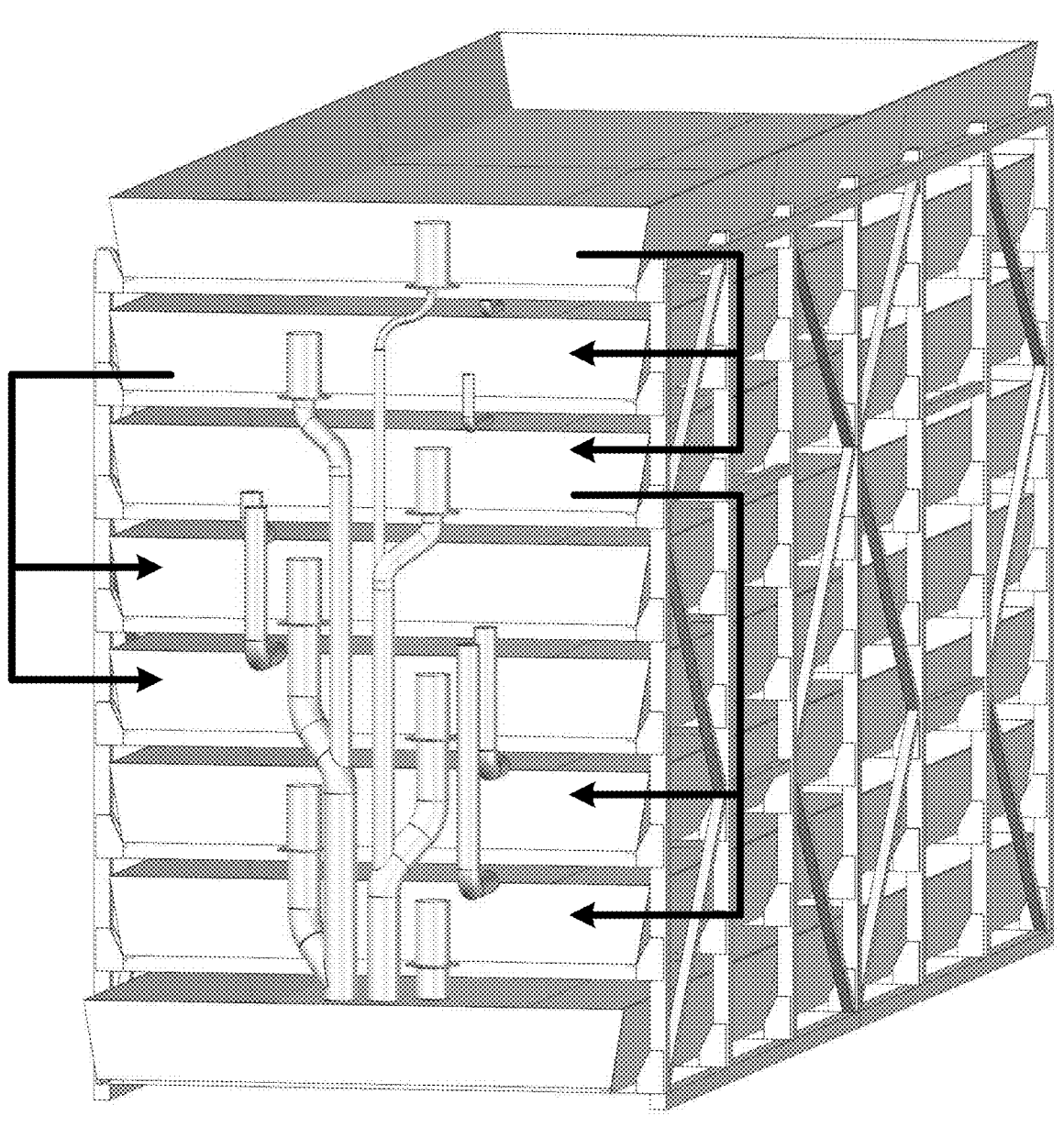
FIG. 4 is a perspective view of an example embodiment of an aquaculture system.
Figure 5:
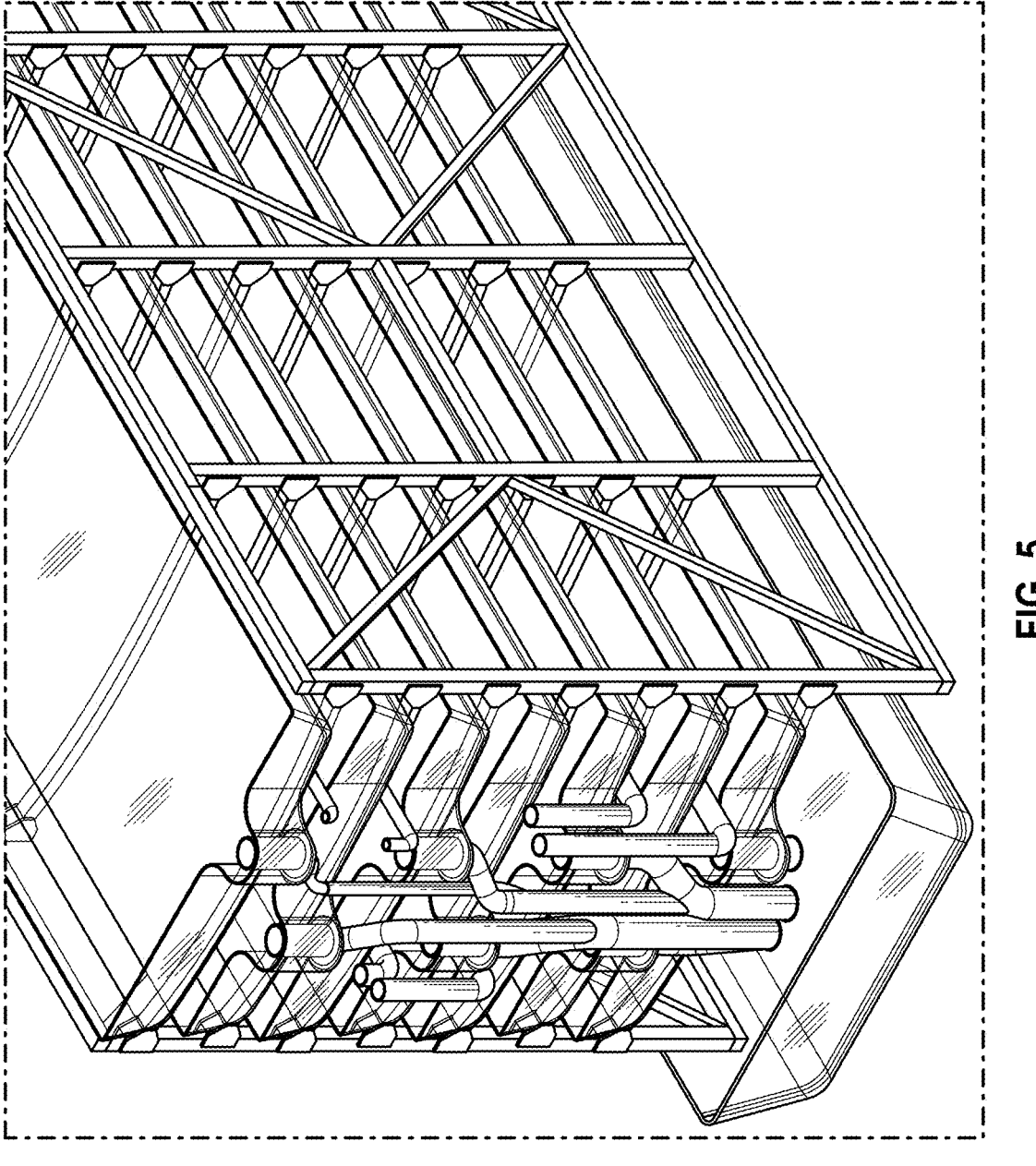
FIG. 5 is a perspective view of an example embodiment of an aquaculture system.
Figure 6:
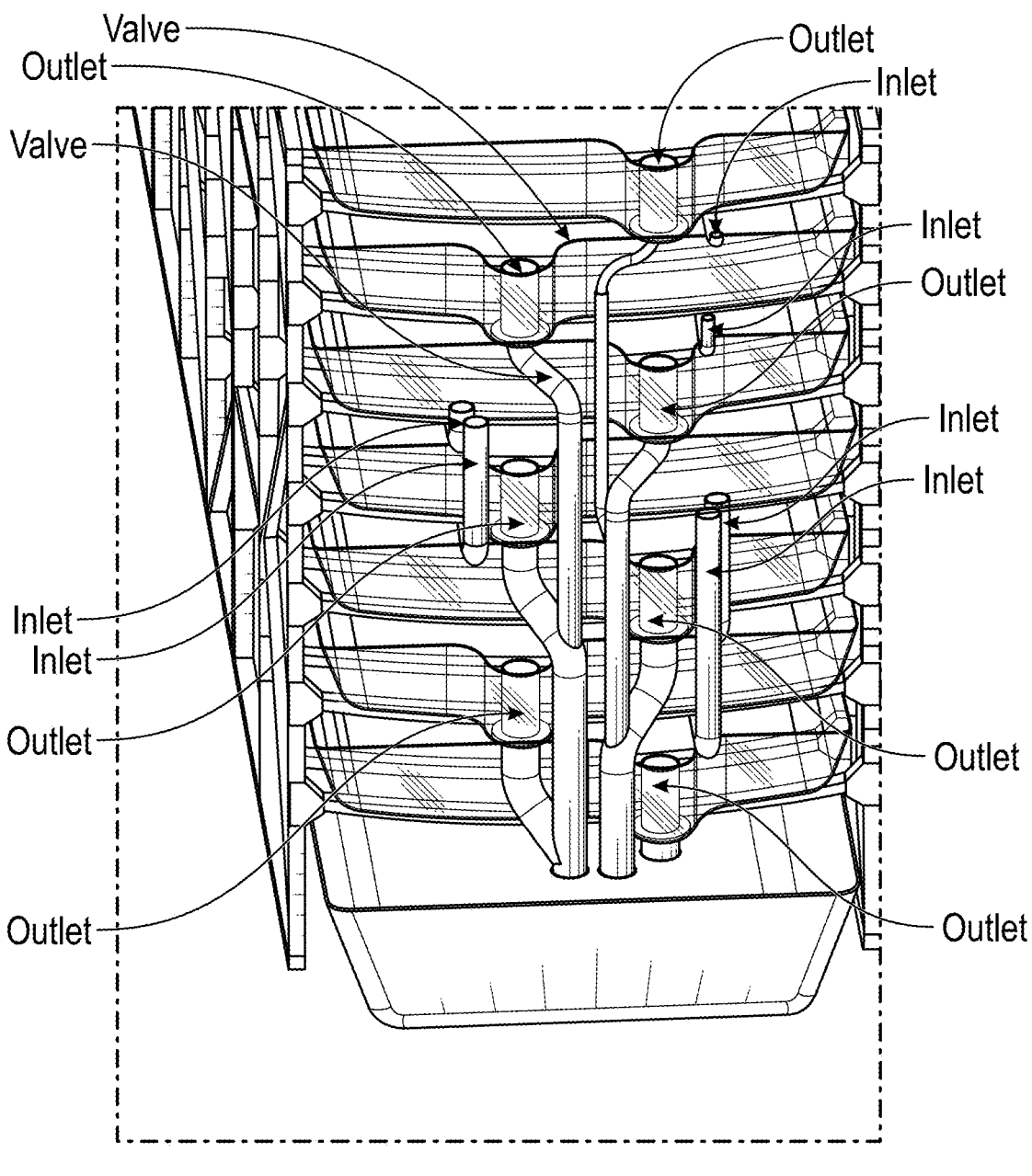
FIG. 6 is a perspective view of an example embodiment of an aquaculture system.

Various embodiments can relate to water and/or biomass overflow and/or transfer systems between the growth trays. As shown in FIGS. 4, 5, and 6, a series of generally vertical transfer drains and valves can be included at the end of each growth tray to enable water exit from each tray for recirculation and treatment, and/or transfer of aquaculture from tray to tray, and/or ultimately harvesting of adult aquaculture ages (e.g., from the bottom four trays to the underlying tank). The transfer drain valves can have stem extensions for operator access from the top of the farm. Hundreds of combinations of transfers can be possible using the integrated series of drain pipes and valves.

With reference to FIG. 6, each of the growth trays can include an outlet. The outlet can toggle between a fluid drain configuration and an aquaculture (e.g., shrimp) transfer configuration. In the fluid drain configuration the outlet can be configured to permit water to drain out of the tray, while impeding the aquaculture (e.g., shrimp) from exiting the tray. For example, in the drain configuration, a grating, screen, sieve, etc. can have openings that are sized to facilitate draining of the water (e.g., and biofloc) from the tray while impeding the aquaculture (e.g., shrimp) from passing through the openings. When in the transfer configuration, the outlet can be configured to permit the aquaculture (e.g., shrimp) to exit the tray through the outlet. For example, the grating, screen, sieve, etc. can be moved, or the openings can be increased in size, to enable the aquaculture (e.g., shrimp) to exit the outlet along with the water.

At least some of the growth trays can include an inlet (e.g., growth trays two through seven). The inlet for a growth tray can receive aquaculture (e.g., shrimp) and/or water from another growth tray (e.g., from a growth tray positioned higher in the stack). The system can include one or more valves that can be toggled between drain positions and transfer positions. A valve for the first growth tray can have a drain position (e.g., shown in FIG. 6) that couples the outlet of the first growth tray to a drain tray or otherwise provides drained water to a water treatment system. The valve for the first growth tray can have a first transfer position (e.g., not shown in FIG. 6) where the outlet of the first growth tray is coupled to the inlet of the second growth tray. The valve for the first growth tray can have a second transfer position (e.g., not shown in FIG. 6) where the outlet of the first growth tray is coupled to the inlet of the third growth tray. A valve for the second growth tray can have a drain position (e.g., shown in FIG. 6) that couples the outlet of the second growth tray to a drain tray or otherwise provides drained water to a water treatment system. The valve for the second growth tray can have first and second transfer positions (e.g., not shown in FIG. 6) where the outlet of the second growth tray is coupled to the inlets to any two of the fourth through seventh growth trays (e.g., coupled to the fourth growth tray in the first transfer position and to the fifth growth tray in the second transfer position). A valve for the third growth tray can have a drain position (e.g., shown in FIG. 6) that couples the outlet of the third growth tray to a drain tray or otherwise provides drained water to a water treatment system. The valve for the third growth tray can have first and second transfer positions (e.g., not shown in FIG. 6) where the outlet of the third growth tray is coupled to the inlets to any two of the fourth through seventh growth trays (e.g., coupled to the sixth growth tray in the first transfer position and to the seventh growth tray in the second transfer position). Various different transfer combinations between the growth trays can be used, as discussed herein.

In some embodiments, valves and outlets can toggle together between the drain and transfer configurations. For example, toggling the valve from the drain position to either of the transfer positions can actuate the outlet to cause the outlet to toggle from the drain configuration to the transfer configuration, and vice versa. In some embodiments, the outlets can have a closed configuration that impedes fluid and aquaculture (e.g., shrimp) from exiting the tray through the outlet. For example, when the valve is between the drain and transfer positions, the outlet can be in a closed configuration. The valves can comprise flexible tubing, in some embodiments. Flexible tubing can couple the outlet of one growth tray to an inlet of another growth tray (e.g., that is positioned lower in the stack, so that gravity can be used to transfer the aquatic animals and/or water between the growth trays). The flexible tubing can be coupled to an outlet of a growth tray at an upper end, and a lower end can be configured to selectively engage or align with a drain pipe, which can lead to the waste tank, and two inlets for two other growth tanks. The inlets can be inlet pipes. One or more of the lower end of the flexible tubing and the inlets can have a coupling mechanism so that the lower end of the flexible tubing can engage the drain pipe or the inlet pipes. In some embodiments, a rigid pipe can be used instead of flexible tubing, and the flexible pipe can pivot between positions.

Figure 7:
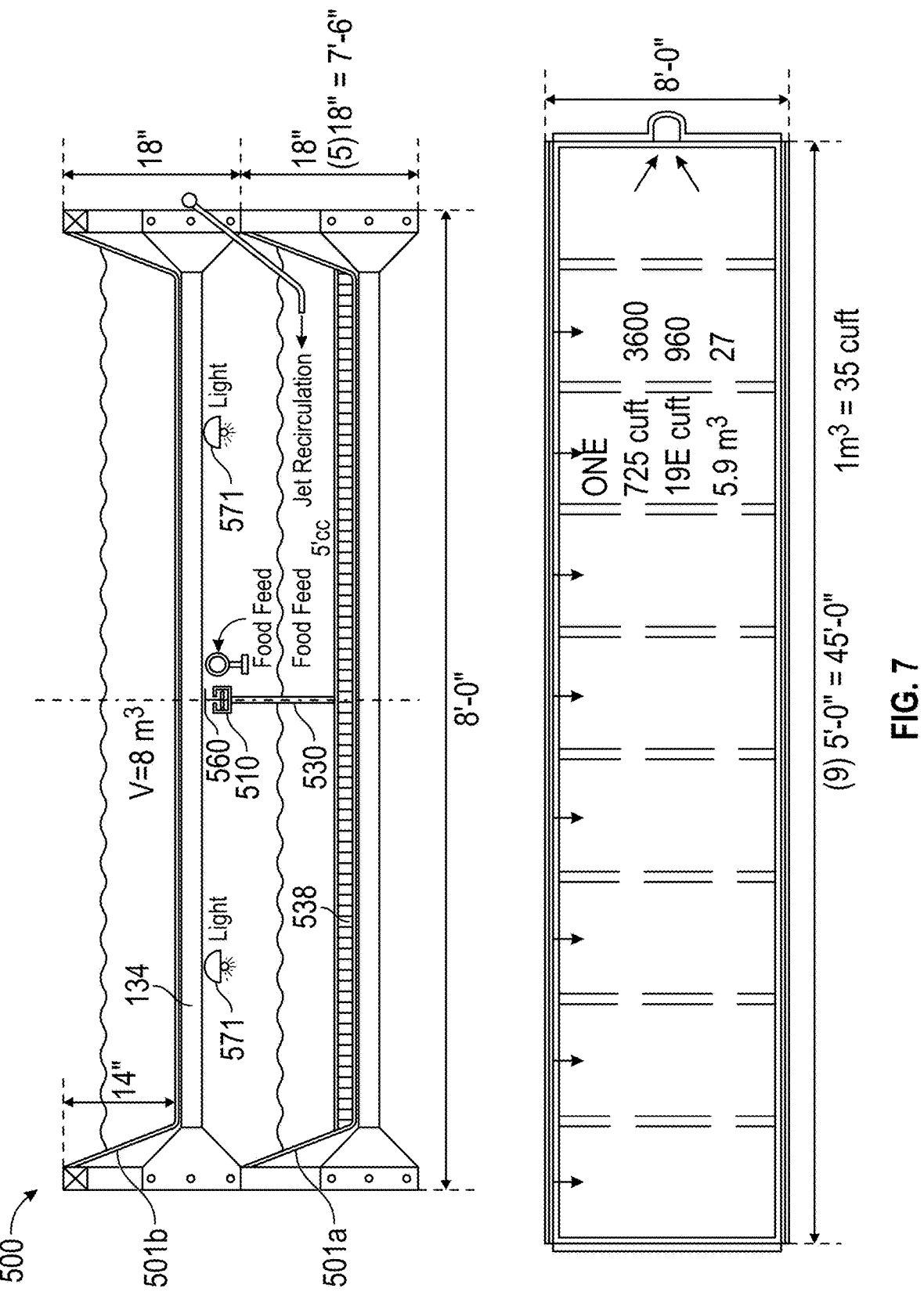
FIG. 7 shows partial cross-sectional and top-down views of an example embodiment of an aquaculture system.

Some embodiments can relate to tray rake systems, screens, manifolds, and/or food dispensaries. As shown in FIG. 7, each tray can have sludge and biomass rake systems, such as with chain and flights, downstream adjustable sieve screens (e.g., which can enter the transfer drain systems), treated water distribution manifold and jets piping, and/or food dispensaries to control and automate the biomass density, biofloc concentration, water quality, and/or food to biomass ratio to optimize biomass production.

In some embodiments high dissolved oxygen fog can provide an aerobic environment, can impede aquaculture predation, and/or can reduce competition for food access. The water treatment system can utilize dissolved air mechanisms to concentrate and dissolve approximately two to five times (e.g., three times) the atmospheric saturation of dissolved oxygen in the water. When treated water is released into the growth trays, the water can be super saturated with oxygen to optimize the heterotrophic respiration efficiency of the aquaculture, and/or provide a fog blanket to improve homogeneity of the biomass production, and/or to reduce predation.

Figure 8A:
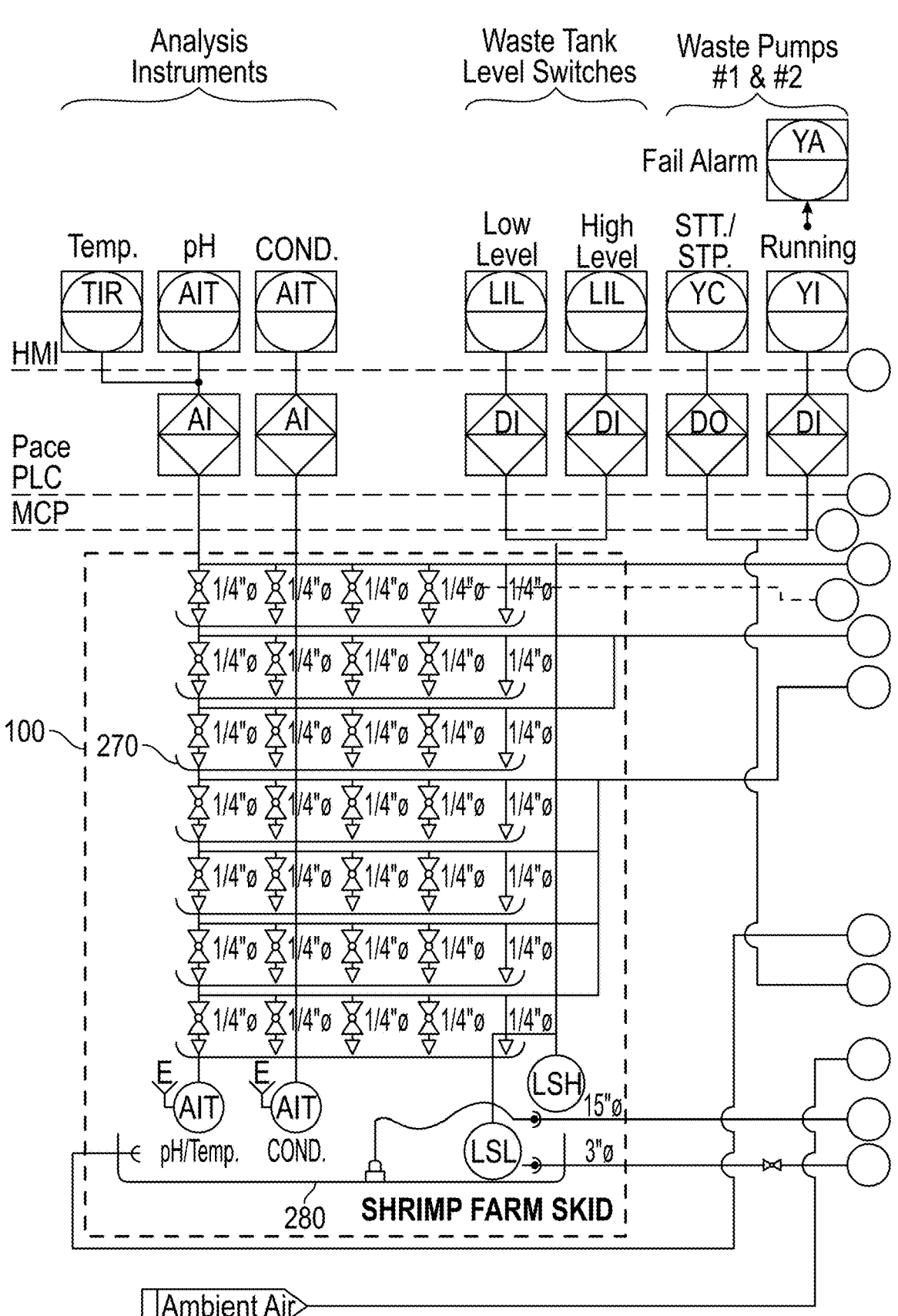
FIG. 8A shows a first portion of a schematic of an example embodiment of an aquaculture system.
Figure 8A:
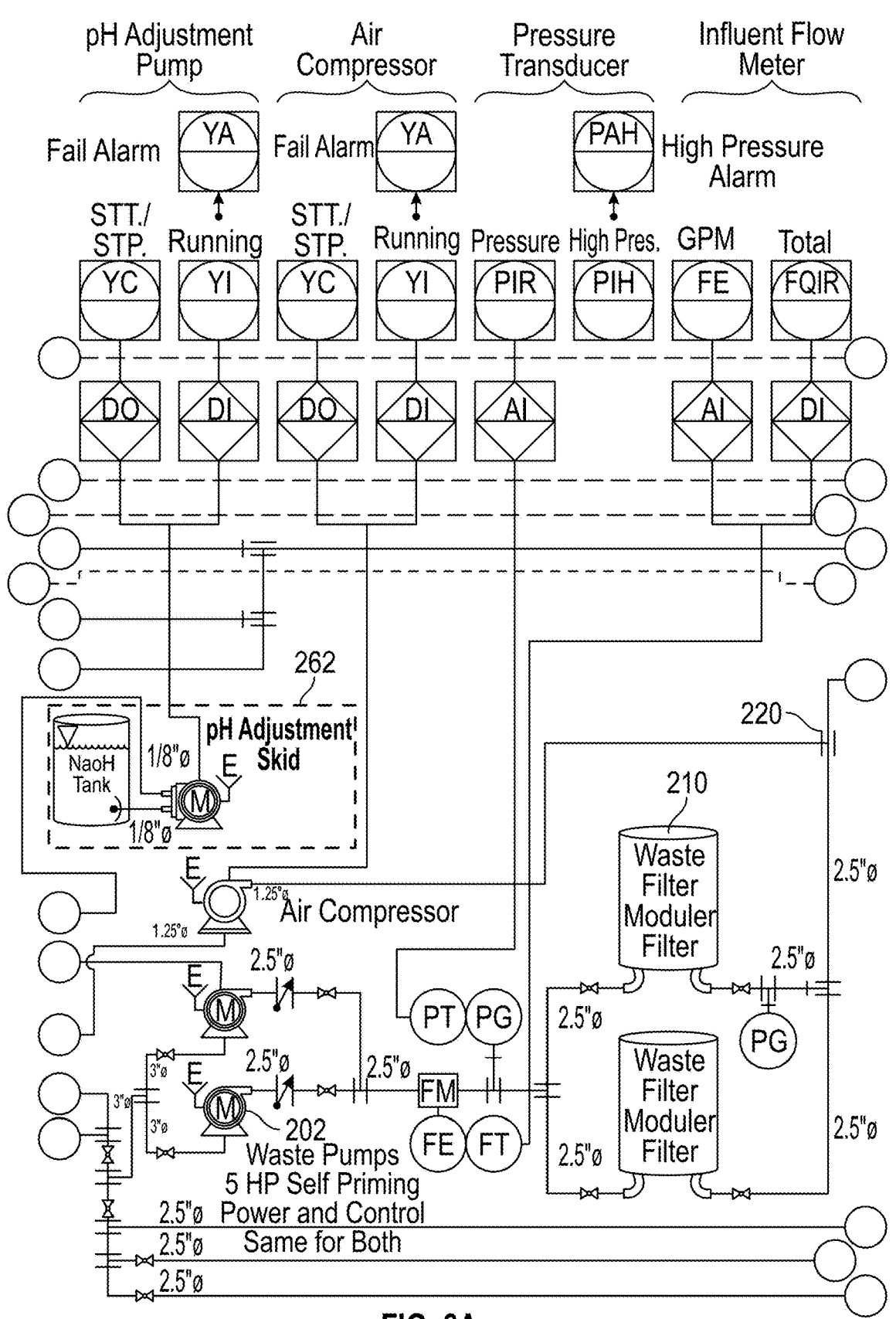
Figure 8A:
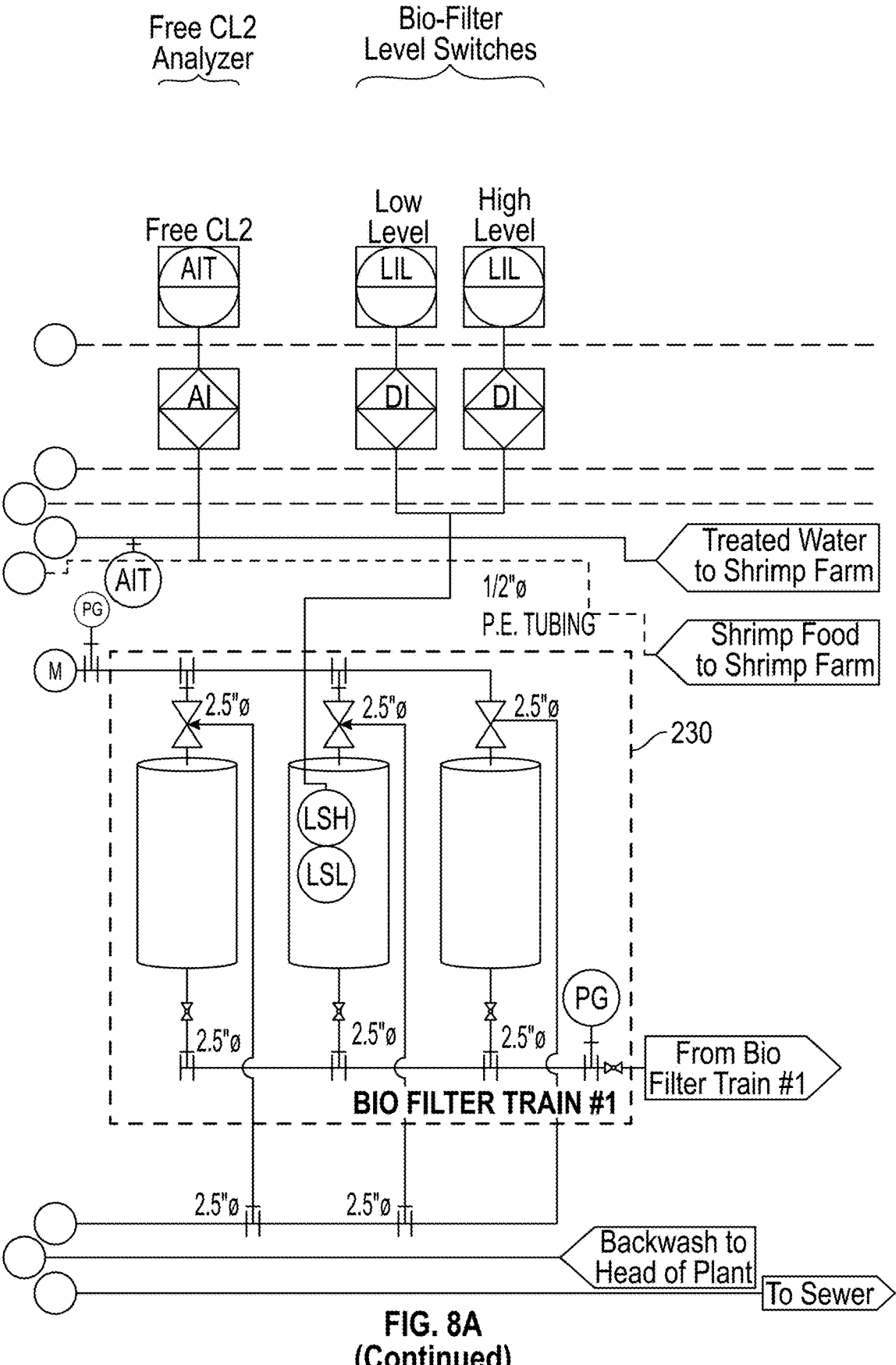
Figure 8B:
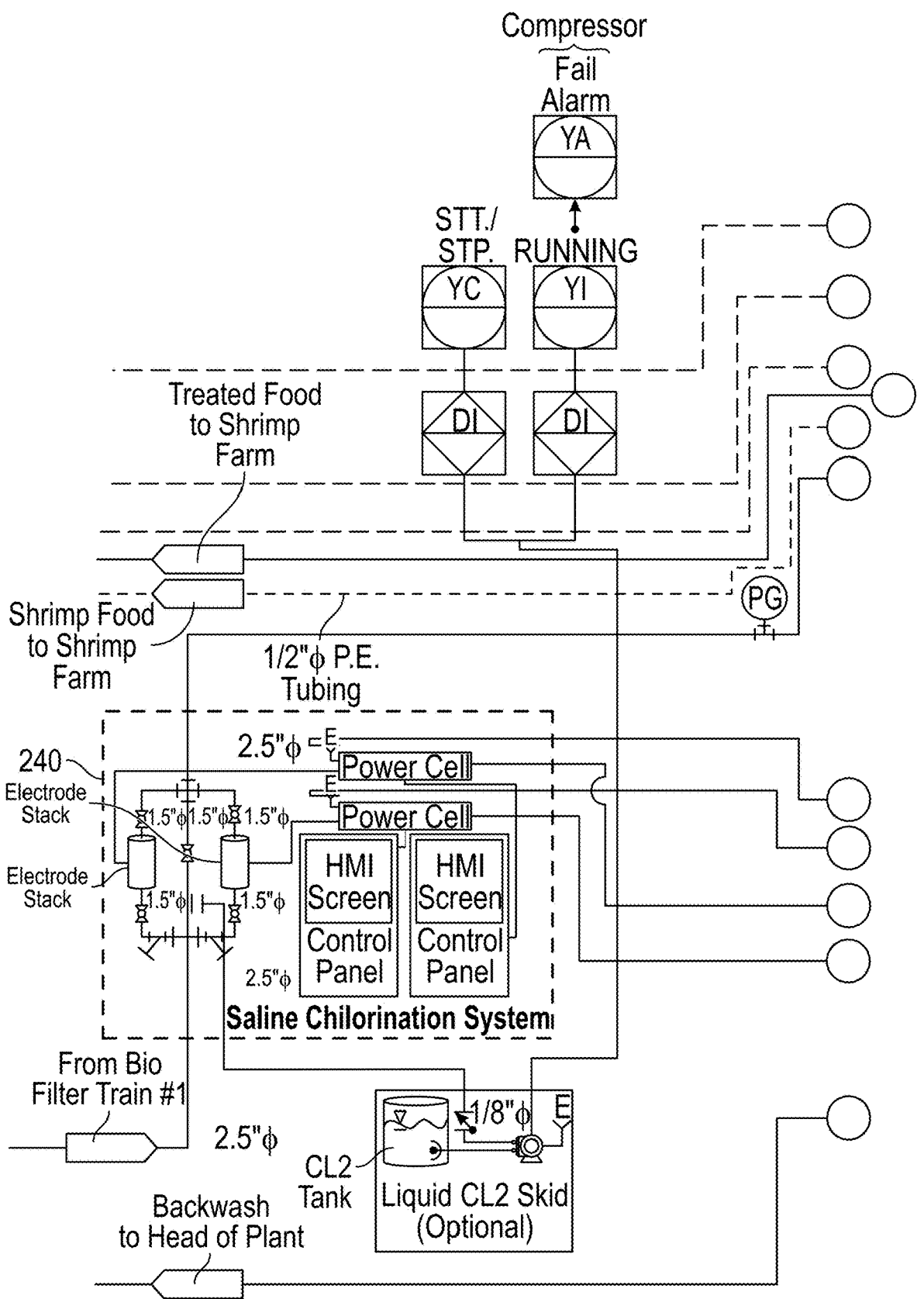
FIG. 8B shows a second portion of a schematic of an example embodiment of an aquaculture system.
Figure 8B:
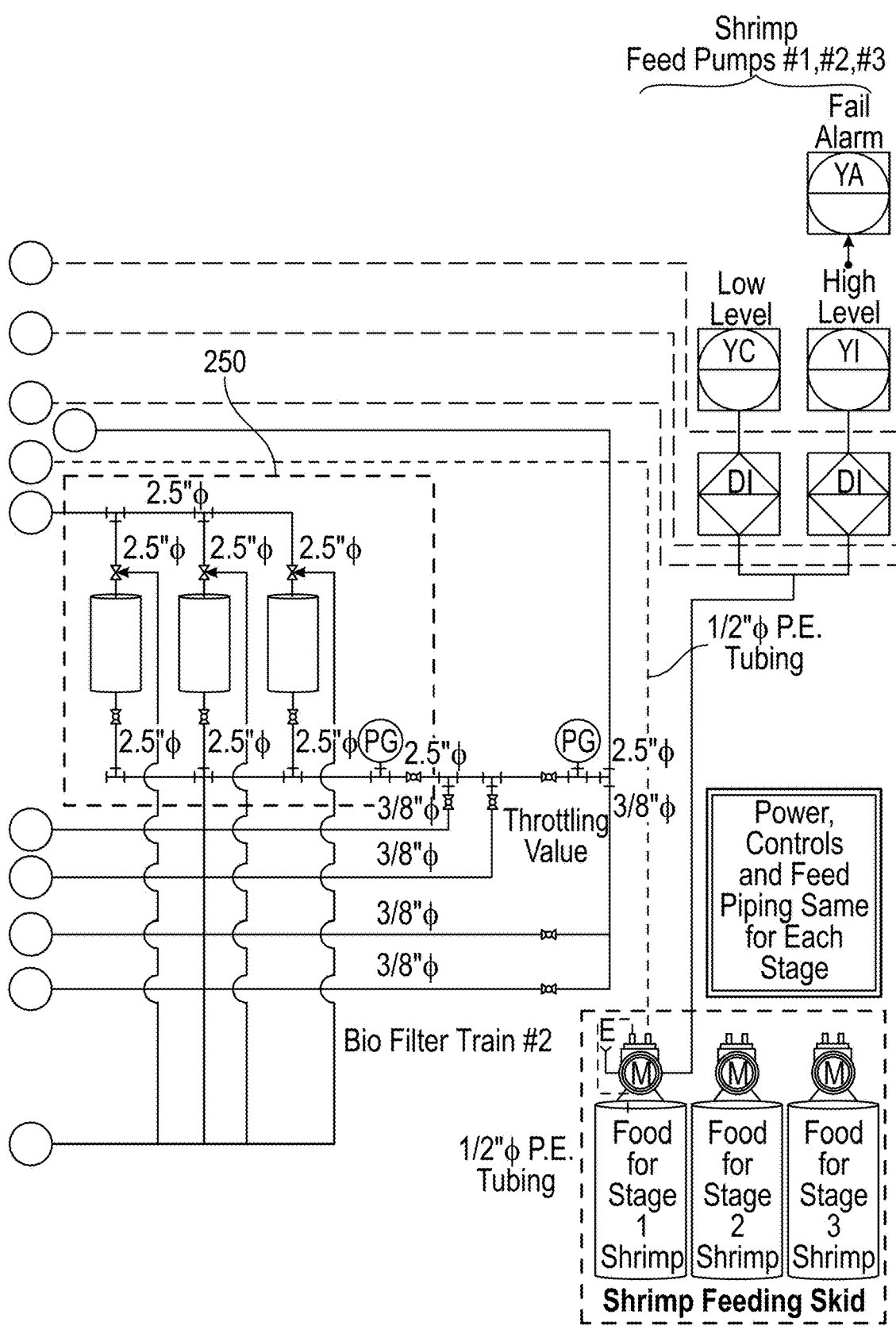

Some systems can implement high turnover (e.g., less than 4 hours) recirculation of water. Water turnover can take 8 hours, 6 hours, 4 hours, 3 hours, 2.5 hours, 2 hours, 1.5 hours, 1 hour, 0.75 hours, 0.5 hours, or any times therebetween, or any ranges of time bounded by any combination of these time values, although time values outside these ranges could be used in some implementations. Some embodiments can implement treatment of bio floc for reduced inefficiency of re-consumption of excrement as aquaculture energy source. Each tray can have independent control of turnover rate, water quality, and/or feed. Unlike some traditional aquaculture farms, which consume and re-consume digested excrement on the order of 5-10 times, the biofloc can be removed from the system and recycled after an efficient re-consumption has occurred (e.g., on the order of 1-3 times within the trays). This can improve the biomass growth rate and reduce disease and inefficiencies with production. Water can be disinfected (sometimes referred to herein as being sanitized) and removed of reduced contaminants including ammonia. The treatment system can utilize a tri-filter system with biologically activated carbon filtration and advanced oxidation. FIGS. 8A-8B includes a schematic of the aquaculture system, which can include the proposed treatment system skid. The left side of the schematic is presented on FIG. 8A, and a right side of the schematic is presented on 8B. As shown in FIGS. 8A-8B, the aquaculture system can include a water treatment system 200, and an aquaculture growth system 100 (which can include stacked growth trays, as discussed herein).

Figure 8C:
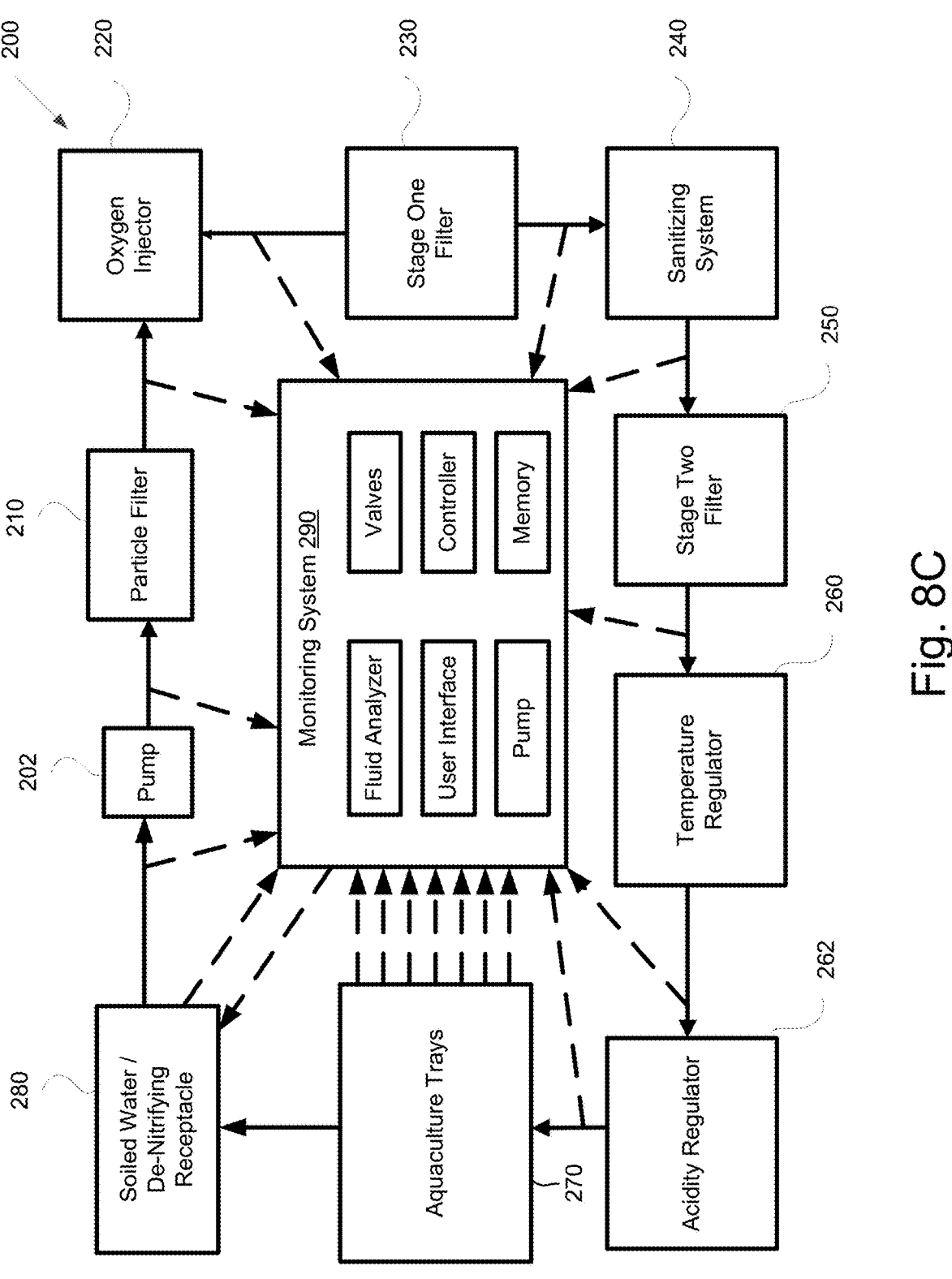
FIG. 8C shows an example embodiment of a water treatment system.

FIG. 8C schematically shows an example water treatment system 200. Such a water treatment system 200 may be used in conjunction with an aquaculture growth system 100, such as one described herein. One or more parameters of the water may be measured at various points in the water treatment system 200 and/or in the aquaculture growth system 100, as shown by broken lines in FIG. 8C, using a monitoring system 290. The monitoring system 290 can include a fluid analyzer, which can include one or more sensors configured to measure one or more parameters of a fluid sample delivered to the fluid analyzer. A plurality of tubes can transport water from the plurality of locations to the fluid analyzer of the monitoring system 290. The tubes can be flexible or rigid tubes or any other suitable fluid transportation conduits. At each point indicated in FIG. 8C, a sample of water may be diverted to the monitoring system 290. The fluid analyzer can include one or more flow cells, optical sensors, electrolytic sensors, etc. for measuring the one or more parameters of the water. In some embodiments, the system can include one or more sensors that can evaluate a state of the water while it travels (e.g., through the pipes) between various elements of the water treatment system (e.g., the sensors may be placed on or in the pipes). For example, temperature (or any other suitable parameter) can be measured by a temperature sensor that is on a pipe leading from the temperature regulator 260 to the aquaculture trays 270, such as without diverting the water away from its normal course towards the aquaculture trays 270.

The monitoring system 290 may include a controller, which can be implemented using one or more computer processors. The one or more computer processors can execute instructions that are stored in memory (e.g., a non-transitory computer-readable memory) in order to implement the features discussed herein. In some embodiments, the controller can include at least one special purpose hardware processor that is configured to implement the features discussed herein. The monitoring system 290 can include one or more valves for controlling the flow of fluid through the monitoring system 290. The controller can actuate the one or more valves to selectively provide access to water from the various different locations in the water treatment system 200 and/or in the aquaculture trays 270. In some embodiments, the monitoring system 290 can include one or more pumps, which can deliver water to the water treatment system 200 (e.g., to the fluid analyzer thereof). In some cases, water can be delivered to the monitoring system 290 by gravity (e.g., from the aquaculture trays positioned higher than the fluid analyzer) and/or by pressure in the fluid pathway. For example the one or more pumps 202 can pressurize the water as it flows through the water treatment phases discussed herein, and when a valve is opened to provide access to the fluid analyzer, the pressurized water can be driven to the fluid analyzer. By operating the valves, the monitoring system can cycle through taking measurements from the various measurement locations in the water treatment system 200 and/or in the aquaculture trays 270.

Data corresponding to the measurements received from the fluid analyzer (e.g., from the one or more sensors) of the monitoring system 290 may be stored in the memory, and can be presented via a user interface, which can include output elements such as a display, printer, speaker, or any other information output device. The user interface can include one or more user input elements, such as buttons, dials, switches, microphones, or any other suitable device for receiving information from a user. In some cases the user interface can include a touchscreen display. The user interface can display the data corresponding to the measurements. For example, the user interface can display the history of the various water parameter measurements for the various different locations, which can be stored in the memory, in response to the user selection provided via the user interface. By way of non-limiting examples, a user can make a selection to view the oxygen content for the past 12 hours for the water being delivered to the aquaculture trays 270, or a user can make a selection to view the total ammonia nitrogen (TAN) of water before oxygenation from the past 6 hours, etc.

Figure 11:
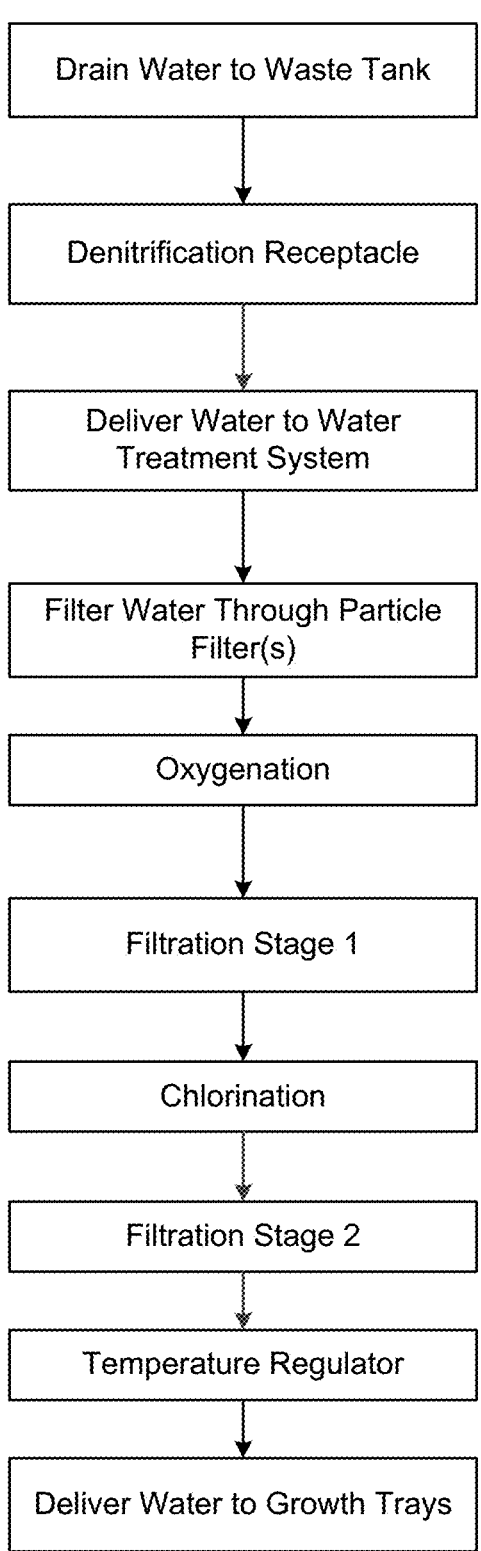
FIG. 11 is a flowchart showing an example method for treating water.

FIG. 11 is a flowchart of an example embodiment of a method for treating water, such as for an aquaculture system. Soiled water from the aquaculture trays 270 can be delivered to a soiled water receptacle (sometimes referred to as a waste tank, a drainage tray, etc.). Water from the various growth trays can mix in the soiled water receptacle. The soiled water receptacle can be positioned below (e.g., under) the stack of growth trays. In some embodiments, the soiled water receptacle (or a different element of the system can be used for de-nitrification, as discussed herein. Water may be pumped through the water treatment system 200 using at least one pump 202. In some embodiments, two or more pumps 202 can be used, such as for redundancy in the event that one pump fails, and/or to increase the pressure applied to the water. The pump 202 may receive water from the soiled water or denitrifying receptacle 280. Before or after passing through the pump 202, some portion of the water may be diverted for measurement by the monitoring system 290. In some embodiments, water from the soiled water or de-nitrifying receptacle can be delivered to the monitoring system for measurement.

The soiled water may be passed through one or more particulate filters 210. The particulate filter 210 may be a cartridge filter, a bag filter, or a sand filter, or any other suitable filter type that is configured to filter out particulate matter. Each particulate filter 210 may be configured to remove particles having a size (e.g., diameter) greater than about 2-30 microns, greater than about 5-25 microns, greater than about 5-10 microns, although other ranges can be used. In some designs, the particulate filter 210 is configured to remove particles having a size greater than about 20-40 microns. Use of a particulate filter 210 can serve as an initial filter to prevent larger particles in the water from passing through the rest of the water treatment system 200. In some designs, the water treatment system 200 includes two particulate filters 210. In some embodiments, multiple particulate filters 210 can be used in parallel, such as to facilitate adequate filtering and flow of water through the water treatment system. In some embodiments, multiple particulate filters 210 can be used in series, such as having different particulate size thresholds (e.g., a course particulate filter having the threshold particulate filtering size that is larger than a fine particulate filter). Multiple particulate filters may allow for use of a first particulate filter 210 while a second particulate filter 210 is being repaired or replaced or cleaned, without disrupting the flow of water through the water treatment system 200. A valve or switch may be used to pass water through a first particulate filter 210 and not through a second particulate filter 210. Then, when the second particulate filter 210 is to be used (e.g., during cleaning of the first particulate filter 210), the valve can redirect water to the second particulate filter 210. The one or more valves can be used to direct water to some or all of the particulate filters 210. In some designs, two or more particulate filters 210 may be used in series in order to improve the quality of filtration.

Water may be passed from the one or more particulate filters 210 through an oxygenator (e.g., an oxygen injector 220). The oxygen injector 220 may include a gas injector configured to infuse oxygen gas (e.g., pressurized $O_2$) into the water. In some designs, the oxygen injector 220 is configured to inject ozone gas (e.g., pressurized $O_3$) into the water of the water treatment system 200. In some cases, ozone can be used for sanitizing the water, and the ozone ($O_3$) can breakdown into oxygen molecules ($O_2$), which can oxygenate the water. A venturi injector may be used for oxygenating the water, in some implementations. An agitator can be used to stir, mix, or otherwise agitate the water to facilitate oxygenation.

The oxygenator (e.g., the oxygen injector 220) may be configured to increase a level of dissolved oxygen ("D.O.") in the water. Alternatively or additionally, the oxygen injector 220 may be configured to reduce a proportion of nitrogen gas (e.g., $N_2$) in the water of the water treatment system 200. For example, by raising a level of dissolved oxygen, a level of dissolved nitrogen may be proportionally reduced in the water (e.g., even if the amount of dissolved nitrogen remains the same). In some designs, the oxygen injector 220 is configured to raise the level of D.O. of the water to greater than a level of solubility of oxygen in the water at atmospheric pressure (e.g., about 7 mg/L at atmospheric pressure). In some designs, the oxygenator (e.g., oxygen injector 220) is configured to raise the level of D.O. of the water to 7 mg/L, 10 mg/L, 15 mg/L, 20 mg/L, 25 mg/L, 30 mg/L, 25 mg/L, 40 mg/L, or any values therebetween, or any ranges bounded by any combination of these values, although D.O. values outside these ranges can be used in some cases. The water can be pressurized (e.g., by the one or more pumps 202), which can facilitate the increasing of the dissolved oxygen level. The water at the oxygenator can be pressurized to 10 pounds per square inch (psi), 15 psi, 20 psi, 25 psi, 30 psi, 35 psi, 40 psi, 45 psi, 50 psi, 55 psi, 60 psi, or any values therebetween, or any ranges bounded by any combination of these values, although other pressures can be used in some instances. The oxygen can be pressurized when introduced to the water. The oxygenator (e.g., oxygen injector) can include a pressurized oxygen or air container that contains pressurized oxygen or air. In some embodiments, the system can use air (e.g., nitrogen and oxygen, etc.) for oxygenating the water. The air can be pressurized using an air compressor, and the pressurized air can be delivered to the water for oxygenation. In some cases, air or oxygen that is not pressurized can be used for oxygenating the water. Where air is used instead of oxygen, the dissolved air in the water can be raised to the same values or ranges discussed in connection with raising the dissolved oxygen (D.O.).

A sufficient level of D.O. can support the growth and development of the aquatic animals in the aquaculture growth system 100. Moreover, a higher D.O. level can promote the more efficient filtration in later stages of the water treatment system 200, e.g., during the stage one filter 230 (e.g., nitrification) and/or sanitizing system 240, as described more fully herein. As a further advantage, raising a level of D.O. in the water and/or reducing a level of dissolved nitrogen in the water can promote the filtration of water at later stages (e.g., can improve efficiency of operation of one or more filters using bacteria such as the stage one filter 230 and/or stage two filter 250). As a temperature of the water rises, the level of D.O. may drop. Conversely, as the temperature of the water decreases, the level of D.O. may increase. The proper temperature of the water may be helpful in maintaining a sufficient level of D.O. The aquatic animals can be sensitive to temperature, and in some cases a temperatures of 20 to 30 degrees Celsius, 23 to 27 degrees Celsius, or about 25 degrees Celsius can be used to promote growth (e.g., for shrimp), although other temperatures can be used. Temperature can be regulated, as discussed herein. The water treatment system 200 may pass the oxygenated water from the oxygen injector 220 to the stage one filter 230.

After the water passes through the oxygen injector 220, the water treatment system 200 may pass the water through a nitrification stage (e.g., using one or more stage one filters 230). The stage one filters 230 may be housed in one or more filter chambers (e.g., three chambers). The stage one filters 230 may include a chemical medium. The chemical medium can include carbon, such as granular activated carbon (GAC). The amount of the chemical medium in the stage one filters 230 may be sufficient to allow a target throughput of water without reducing the rate of filtration below a threshold level. For example, in some designs, the filter chamber of the stage one filter 230 may contain between about 40%-80% carbon by volume. The filter chamber may allow for between about 20%-60% water by volume at a given time during the water treatment process. The medium (e.g., activated carbon) may have a mesh size of between 4-18 (e.g., about 1-4.75 mm) or 8-12 (e.g., about 1.7-2.38 mm). This mesh size provides balance between a beneficial amount of water treatment during the stage one filter 230 while reducing the frequency with which the filter needs to be cleaned (e.g., backflushed or removed or replaced). Smaller sizes (e.g., mesh size of 20-30) may be additionally or alternatively used in the stage one filter 230 to promote more effective filtering, but may result in more backflushing.

The stage one filter 230 may include a biological medium. The biological medium may include bacteria, such as nitrifying bacteria. The bacteria can be adapted to convert ammonia to nitrites and/or nitrates (directly or indirectly). The bacteria can be adapted to convert nitrites to nitrates. In some cases the nitrifying bacteria can dwell on the activated carbon (e.g., GAC). The biological medium can be configured to oxidize ammonia to produce a proportion of un-ionized ammonia ($NH_3$) of the total ammonia nitrogen (TAN) in the water to values suitable for aquaculture. In some designs, the stage one filter 230 can be configured to convert ammonia to nitrites and/or nitrates (directly or indirectly) on the order of seconds or minutes. In some designs, the bacteria are at least 5 days old, at least 10 days old, at least 15 days old, at least 20 days old, at least 25 days old, at least 30 days old, or any values therebetween, or any ranged bounded by any of these values, although other values outside those ranges can be used. This may provide sufficient maturity of the bacteria to convert ammonia to nitrites and/or nitrates in a suitable time and/or to maintain a sufficient throughput of water.

The nitrification process can reduce the oxygen concentration in the water. The oxygenator 220 can raise the oxygen concentration to a sufficiently high level such that water that is delivered from the water treatment system 200 to the aquaculture trays 270 can have oxygen concentration that is higher than a level of solubility of oxygen in the water at atmospheric pressure. The water can be pressurized until it is released into the aquaculture trays, and the pressurized water can hold more dissolved oxygen than water at atmospheric pressure (e.g., ambient pressure). Then, when the water is released into the aquaculture trays at atmospheric pressure (e.g., ambient pressure), the excess oxygen can be released from the water to form bubbles (e.g., of oxygen and/or other gases found in air). The oxygen/air can be released from the water as microbubbles, which can appear as a fog in the water. The bubbles can help oxygenate the water that was already in the tray. The bubbles can help mix the water, can facilitate distribution of food, and can impede waste matter in the tanks from becoming stuck on surfaces of the tray, such as by dissolved air floatation (DAF).

With continued reference to FIG. 8C, the water treatment system 200 can further comprise a sanitizing system 240.

The water treatment system 200 may pass the water that has passed through the stage one filter 230 (e.g., nitrified water) to the sanitizing system 240. In some designs, the sanitizing system 240 is positioned after the stage one filter 230 in the water treatment system 200. The sanitizing system 240 can be configured to kill bacteria and/or other microbes in the water, or to otherwise sanitize or disinfect the water. In some embodiments, chlorine can be used to sanitize or disinfect the water. The sanitizing system 240 may be configured to increase a level of chlorination in the water. For example, the sanitizing system 240 may be configured to deliver chemical chlorine (e.g., $Cl_2$, hypochlorite) into the water. The system can have a container of chlorine (e.g., in liquid form), which can deliver the chlorine into the water. Alternatively or additionally, the sanitizing system 240 may be configured to use electrolysis to increase the level of chlorine in the water. Salt water can be used (e.g., for raising salt water aquatic animals), and electricity can be applied to convert some of the salt in the water into chlorine. For example, the sanitizing system 240 may use electrolysis to convert dissolved salt (NaCl) in water ($H_2O$) into hypochlorous acid (HClO) and/or sodium hypochlorite (NaClO). The chlorination stage can include an electrochlorinator configured to use electrolysis to convert salt to chlorine.

In some designs, the sanitizing system 240 includes an ultraviolet light source. Ultraviolet light may be helpful in addition to or instead of a system that raises a level of chlorine in the water. In some cases the system can input ozone ($O_3$) into the water, which can facilitate sanitizing of the water, and which can also convert into oxygen molecules for oxygenating the water.

The water treatment system 200 may include a dechlorination stage, which can include one or more stage two filters 250. The water treatment system 200 may pass the sanitized water that has passed through the sanitizing system 240 to the stage two filters 250. The stage two filters 250 may be housed in one or more filter chambers (e.g., three chambers). The stage two filters 250 may include a chemical medium. The filters 250 can include carbon, such as GAC. The amount of the chemical medium in the stage two filter 250 may be sufficient to allow a target throughput of water without reducing the rate of filtration below a threshold level. For example, in some designs, the filter chamber of the stage two filter 250 may contain between about 40%-80% carbon by volume. The filter chamber may allow for between about 20%-60% water by volume at a given time during the water treatment process. The filter medium may have a mesh size of between 18-60 (or about 0.25-1 mm in diameter). This mesh size can provide an improved filtration result during the stage two filter 250. While smaller chemical medium sizes often require more frequent cleaning and/or replacement, the stage two filter 250 may not require as frequent of cleaning/replacement since the water has already passed through a stage one filter 230 by this stage. In some designs, even smaller particle sizes (e.g., mesh size of between about 60-100 or more (e.g., about 0.15-0.25 mm)) may be additionally or alternatively used in the stage two filter 250 to further improve filtration. Other filter sizes can be used (e.g., smaller or larger mesh sizes). In some embodiments, the dechlorination stage can occur as the water sits in a holding tank, or as the water travels through other portions of the water treatment system, and/or through the water delivery system.

Additionally or alternatively, the stage two filters 250 may include a biological medium. The biological medium may include bacteria, such as nitrifying bacteria. The stage two filters 250 can have bacteria can be adapted to convert ammonia to nitrites and/or nitrates (directly or indirectly). The bacteria can be adapted to convert nitrites to nitrates. In some designs, the stage two filter 250 can be configured to convert ammonia to nitrites and/or nitrates (directly or indirectly) on the order of seconds or minutes, such as similar to the other nitrifying bacteria discussed herein.

With continued reference to FIG. 8C, the water treatment system 200 may include a temperature regulator 260. The temperature regulator 260 may include a heating element that is configured to raise the temperature of the water in the water treatment system 200. For example a heating element can convert electricity to heat for heating the water. A heating element can burn gas or other fuel to produce heat for heating the water. Any other suitable heating element can be used to heat the water. Additionally or alternatively, the temperature regulator 260 may be configured to lower a temperature of the water in the water treatment system 200. For example, the temperature regulator 260 can use a heat sink, a water-to-air heat exchanger, a thermoelectric cooler, or any other suitable device for modifying the temperature of the water. In some embodiments, the temperature regulator 260 may be configured to inject water into the treatment system at a temperature different from water in one or more receptacles of the aquaculture growth system 100. For example, the temperature regulator 260 may inject warmer water than is flowing through the water treatment system 200 to increase the temperature of the water, or it may inject cooler water to cool the water in the system. The temperature regulator can have one or both of a warm water reservoir and a cool water reservoir, from which water can be input into the system to adjust the water temperature. In some embodiments, the temperature regulator can be configured to perform only one of heating and/or cooling, depending on ambient temperatures and use.

Maintaining water at a proper temperature in the water treatment system 200 can provide many benefits. For example, the water in the water treatment system 200 may be used in the aquaculture trays 270 where aquatic animals (e.g., shrimp) are raised. In some cases water that is warmer, or cooler, than ambient temperature may promote the faster and/or healthful growth of the aquatic animals in the aquaculture trays 270. The aquaculture trays 270 may be synonymously referred to as aquatic animal trays, growth trays, growth receptacles, growth containers, aquatic animal receptacles, aquatic animals containers, etc. The temperature regulator 260 can be configured to try to maintain water temperature in a range, such as 20 to 30 degrees Celsius or 23 to 27 degrees Celsius, or at about 25 degrees Celsius. In some embodiments, the temperature regulator 260 can be configured to try to maintain water temperature above a temperature, such as above 20 degrees Celsius, above 23 degrees Celsius, above 24 degrees Celsius, above 25 degrees Celsius, above 26 degrees Celsius, above 27 degrees Celsius, above 28 degrees Celsius, or more. In some embodiments, the temperature regulator 260 can have a water temperature sensor, which can be in addition to any temperature sensor(s) of the water monitoring system 290. The temperature regulator 260 can have a controller, which can operate the temperature regulator to regulate the temperature, as described herein. For example, the controller can receive information from a temperature sensor regarding the temperature of water being output by the temperature regulator and/or regarding the temperature of water being input into the temperature regulator, and the controller can adjust the amount of heating and/or cooling that is applied to the water based at least in part on that information. For example, the temperature regulator can have an output temperature set point or range. If the temperature sensor measures the temperature of the output water to be below the temperature set point or range, the controller can cause raise the temperature of the water (e.g., using a heating element). If the temperature sensor measures the temperature of the output water to be above the temperature set point or range, the controller can cause lower the temperature of the water (e.g., using a cooling element). A user interface can enable the user to change the temperature set point or range. The controller can be implemented on one or more computer hardware processors, such as executing instructions stored on memory or specially configured to perform the features described herein. In some embodiments, the temperature regulator can receive water temperature information from the monitoring system 290, and can adjust the temperature based at least in part on the water temperature information from any one, or any combination of, the measurement locations (e.g., as shown in FIG. 8C). In some embodiments, the controller of the monitoring system can be used to control the temperature regulator. The temperature regulator can receive commands from the monitoring system, and can adjust the temperature accordingly.

The water treatment system 200 may include an acidity (e.g., pH) regulator 262. The acidity regulator 262 can be configured to raise and/or lower the acidity level of the water, such as by adding an acid or base to the water. The acidity regulator 262 can have an acid reservoir and/or a base reservoir, which can be injected into the water to adjust the pH of the water.

Maintaining water at a proper acidity level in the water treatment system 200 can be important for health and growth of the aquatic animals (e.g., shrimp). The water in the water treatment system 200 may be used in the aquaculture trays 270 where aquatic animals (e.g., shrimp) are raised. The acidity regulator 262 can be configured to try to maintain water acidity in a range, such as a pH of 7, 7.5, 8, 8.5, 9, 9.5, or 10, or any values therebetween or any ranges bounded by any combination of these values, although other values can be used. The acidity regulator 262 can regulate the water to be a mild basic solution, such as having a pH of 7.8 to 8.5 or 8 to 8.3. The acidity regulator 262 can have a controller, which can operate the acidity regulator 262 to regulate the acidity, as described herein. For example, the controller can receive information from an acidity sensor regarding the pH of water being output by the acidity regulator 262 and/or regarding the pH of water being input into the acidity regulator 262, and the controller can adjust the amount of acid or base that is introduced, if any, to the water based at least in part on that information. For example, the acidity regulator 262 can have an output water pH set point or range. If the acidity sensor measures the pH of the output water to be below the set point or range, the controller can cause raise the pH of the water (e.g., using the base). If the acidity regulator 262 measures the acidity of the output water to be above the set point or range, the controller can lower the pH of the water (e.g., using the acid). A user interface can enable the user to change the pH set point or range. The controller can be implemented on one or more computer hardware processors, such as executing instructions stored on memory or specially configured to perform the features described herein. In some embodiments, the acidity regulator 262 can receive water pH information from the monitoring system 290, and can adjust the acidity based at least in part on the water pH information from any one, or any combination of, the measurement locations (e.g., as shown in FIG. 8C). In some embodiments, the controller of the monitoring system can be used to control the acidity regulator 262. The acidity regulator 262 can receive commands from the monitoring system, and can adjust the acidity of the water accordingly.

The aquaculture system can include the water treatment system 200 and may further include one or more aquaculture trays 270, such as for different growth stages or sizes of the aquatic animals, as discussed herein. The water treatment system 200 may deliver treated water (e.g., from the temperature regulator 260, the acidity regulator 262, and/or the stage two filter 250) to the aquaculture trays 270. The water in the aquaculture trays 270 can have a heterotrophic plate count (HPC) which indicates the number of bacteria in the trays of about 2000, about 1500, about 1000, about 800, about 500, about 300, about 200, about 150, about 100, about 50, about 35, about 25 CFU (colony forming units) per 100 mL, or less, or any values therebetween, or any ranges bounded therein. The aquaculture trays 270 may be included in an aquaculture growth system 100, as described more fully herein. Each or some of the aquaculture trays 270 may pass water and/or aquatic animals from one tray to another tray (e.g., by gravity flow). One or more of the aquaculture trays 270 may include aquatic animals. The aquaculture trays 270 may have a length that is at least four times a width. The aquaculture trays 270 may have a width that is at least three, four, five, six, or more times a height, or any values therebetween. The aquaculture trays 270 may have a length of 10 feet, 20 feet, 30 feet, 40 feet, 50 feet, 60 feet, 70 feet, 80 feet, 90 feet, 100 feet, or more, or any values therebetween, or any ranges bounded by any combination of these values, although sizes outside these ranges can also be used. In some designs, the aquaculture trays 270 can have a length of about 40 to 60 feet. The width of the aquaculture trays 270 may be 2 feet, 5 feet, 10 feet, 15 feet, 20 feet, 25 feet, or more, or any values therebetween, or any ranges bounded by any combination of these values, although other sized can also be used. In some designs, the aquaculture trays 270 have a width of about 5 to 10 feet. The aquaculture trays 270 may have a height between about 0.5 feet, 1 foot, 1.5 feet, 2 feet, 2.5 feet, 3 feet, or more, or any values therebetween, or any ranges bounded by any combination of these values, although other sizes can also be used. The aquaculture trays 270 may be nestable with each other, which can facilitate shipping. This may allow for easy construction, deconstruction, and/or transportation. The aquaculture trays 270 may be constructed, at least in part, of wood. The aquaculture trays 270 may include metal, fiberglass, plastic, glass, or any other rigid and sturdy material. In some designs, the aquaculture trays 270 include a waterproof liner. The waterproof liner may be made of plastic (e.g., polyethylene) and/or rubber. In some designs, the liner is chemically treated. The aquaculture trays 270 can have a flat base, with side walls, such as on four sides. The side walls can be generally upright, but angled from vertical to facilitate nesting of the aquaculture trays 270. In some embodiments, the aquaculture trays 270 can include an anti-algae coating, and/or an antimicrobial coating, and/or an anti-fungal coating.

The aquaculture trays 270 (e.g., the 7 growth trays of some embodiments) can have substantially the same dimensions. When arranged in the stacked configuration (e.g., supported by the frame structure, as discussed herein), the aquaculture trays 270 can have substantially overlapping footprints. For example, if viewing the stacked aquaculture trays 270 from above, a lower tray can be positioned under an upper tray so that the lower tray is obscured from view. Adjacent aquaculture trays 270 in the stacked configuration can overlap by 20%, 30%, 40%, 50%, 60%, 70%, 80%, 90%, 95%, 98%, or 100%, or any values therebetween, are within any ranges bounded by any combination of these values, although other values outside these ranges could be used. In some embodiments, the soiled water tray can be larger than the aquaculture trays 270, such as by 5%, 10%, 20%, 30%, 40%, 50%, or more, or any values therebetween, or any ranges bounded by any of these values, although other sizes can be used. In some embodiments, the soiled water tray can extend out beyond a footprint of the aquaculture trays 270, such as on a front side, where water drains from the aquaculture trays 270 into the soiled water tray.

The aquaculture system may include a first water receptacle for receiving water and/or a plurality of aquatic animals. The first set of one or more water receptacle that may each include an inlet for receiving water and/or an outlet for releasing the aquatic animals out of the one or more first water receptacles. The aquaculture system may include a second set of one or more water receptacle lower than the first one or more water receptacle. The second set of water receptacles may be arranged to receive the aquatic animals from the first one or more water receptacle, such as through inlets to the second water receptacles. The second set of water receptacle may include outlets for releasing the aquatic animals out of the second set of water receptacles. The aquaculture system may include a third set of one or more water receptacles lower than the second set of water receptacle. The third set of water receptacles can be configured to receive the aquatic animals from the second set of water receptacles. The third set can include more water receptacles and/or more water receptacle area than the second set. The second set can include more water receptacles and/or more water receptacle area than the first set. In some embodiments, seven aquaculture water receptacles can be used, as discussed herein, although other numbers of water receptacles can be used in other implementations.

With continued reference to FIG. 8C, the water treatment system 200 may include a denitrifying receptacle 280. The denitrifying receptacle 280 may be a waste or soiled water receptacle that is configured to receive soiled water from one or more trays of the aquaculture trays 270. The system may pass water from the aquaculture trays 270 to the denitrifying receptacle 280. The denitrifying receptacle 280 may contain a denitrifying medium that is configured to convert nitrate to nitrogen gas, directly or indirectly. The denitrifying medium may be referred to as a denitrifier. The denitrifying medium may be configured to increase a level of nitrogen gas and/or reduce a level of nitrate in the water. In some designs, the denitrifying medium is a bacteria, such as a heterotrophic bacteria. The bacteria can be adapted to convert nitrates, nitrites, nitric oxide, and/or nitrous oxide, directly or indirectly, into dinitrogen (e.g., nitrogen gas). In some designs, the denitrifying receptacle 280 may be disposed below one or more of the aquaculture trays 270. For example, the denitrifying receptacle 280 can be disposed below all of the aquaculture trays 270. The denitrifying receptacle 280 can be used as a waste water tray. In some cases, the waste water tray is not used for denitrification. However, in some instances, as the water is cycled repeatedly through the water treatment system 200, the levels of nitrate and/or nitrite (e.g., caused by nitrification of ammonia) can raise to levels that can be harmful to the aquatic animals or impeded growth and development. Accordingly, the soiled water tray can be used for denitrification to lower the amount of nitrate and/or nitrite in the water. A denitrifying bacteria can be introduced into the soiled water tray. A food source can be added to the soiled water tray, such as carbon, sugar, methanol, etc. to facilitate denitrification. The denitrifying receptacle 280 can include a growth substrate or structure, such as a net, that promotes attached beneficial bacterial growth, which can improve nitrate reduction.

The system can include a monitoring system 290. The monitoring system 290 can be configured to sense one or more properties of the water in the water treatment system 200 at various points within the system, as indicated by dotted lines in FIG. 8C. For example, the monitoring system 290 can be configured to detect any combination of the following values: a level of total chlorine, a level of free chlorine, a level of total ammonia (e.g., TAN), a level of un-ionized ammonia ($NH_3$), a level of ionized ammonia or ammonium (e.g., $NH_4^+$), a total oxygen concentration or dissolved oxygen concentration (e.g., D.O.), a total nitrogen concentration or dissolved nitrogen concentration (e.g., dinitrogen or nitrogen gas), an amount of total suspended solid (TSS), a total level of nitrates, a total level of nitrites, a potential of hydrogen (pH), a temperature, a salinity, oxidation reduction potential (ORP), etc. The monitoring system 290 may test any combination of these values at more than one location throughout the water treatment system 200. In some designs, some water may be deflected or removed from the pipes to be tested by the monitoring system 290. Alternatively or additionally, a sensor may be placed within or at the pipes to sense to capture data from the water as it passes through the water treatment system 200. The monitoring system 290 can have a fluid analyzer with sensors configured to measure any combination of the above-identified parameters. A single water sample can be used for conducting multiple measurements (e.g., in series), or multiple samples of water can be tested by different sensors (e.g., in parallel).

In some embodiments, the monitoring system can conduct the same measurements for water from each of the locations in the system. In some cases, different measurements can be taken at different locations, such as with or without overlap of measurements at some locations. The monitoring system 290 may test water from the soiled water or denitrifying receptacle 280, and/or from one or more locations between the soiled water receptacle 280 and the oxygenator 220, such as before or after the particle filter 210 and/or before or after the one or more pumps 202). At these points, the monitoring system 290 may test for at least one of a level of total ammonia, a level of total un-ionized ammonia, an amount of TSS, a total level of nitrates and/or nitrites, D.O., and/or a pH of the water, although other measurements can be taken as well.

In some embodiments, after the water has passed through the particulate filter 210, the monitoring system 290 may sense an amount of TSS, the temperature of the water, the salinity of the water, water pressure, and/or a concentration of particulates within the water. These measurements may be helpful, for example, in determining whether the particulate filter 210 needs to be replaced or repaired. Alternatively or additionally, the monitoring system 290 may use one or more of these values to compare with values obtained at one or more other stages in the water treatment system 200.

After the water has passed through the oxygen injector 220, the monitoring system 290 may sense one or more properties of the water. For example, the monitoring system 290 may sense a level of oxygen in the water (e.g., D.O.), a level of nitrogen in the water, a temperature of the water, a pH of the water, a level of salinity of the water, and/or a level of TSS, and other measurements can be taken as well.

With continued reference to FIG. 8C, after the water has passed through the stage one filter 230 (e.g., the nitrification stage), the monitoring system 290 may sense some or all of the water parameters, such as an amount of TSS in the water, a level of total ammonia, a level of total un-ionized ammonia, a level of ionized ammonia or ammonium (e.g., NH4+), a total level of nitrates, a total level of nitrites, a pH of the water, the temperature of the water, and/or the salinity of the water. These measurements may be helpful, for example, in determining whether the stage one filter 230 needs to be replaced or repaired and/or if one or more of the chemical and/or biological medium is functioning properly. The measurements may also provide feedback as to whether the stage one filter 230 is filtering sufficiently within the water treatment system 200. Alternatively or additionally, the monitoring system 290 may use one or more of these values to compare with values obtained at one or more other stages in the water treatment system 200.

The monitoring system 290 can be configured to sense one or more properties of the water after it has passed through the sanitizing system 240 (e.g., after chlorination). For example, it may be useful to determine a level of chlorine in the water. Other factors may be sensed at this point. At this point, the monitoring system 290 may sense a level of total chlorine in the water, a level of free chlorine in the water, a temperature of the water, and/or a level of salinity in the water, and any other available parameters can be measured as well. In particular, in certain designs where electrolysis is used, knowing the level of salinity in the water can be helpful in determining whether a sufficient level of chlorine is produced by the sanitizing system 240. Because having too high a level of free chlorine in the water can be unnecessary or even undesirable, sensing a level of total free chlorine can allow for proper measures to be taken to reduce the level of total free chlorine (e.g., by reducing a level of salinity in the water). Conversely, if the total free chlorine is too low, this may be an indication that the sanitizing system 240 is not working properly and that it may need to be repaired or replaced.

After the water has passed through the stage two filter 250 (e.g., a dechlorination stage), the monitoring system 290 may detect one or more values related to the water. For examples, the monitoring system 290 may sense an amount of TSS in the water, a level of total ammonia, a level of total un-ionized ammonia, a level of ionized ammonia or ammonium (e.g., NH4+), a total level of nitrates, a total level of nitrites, a pH of the water, the temperature of the water, water pressure, and/or the salinity of the water, and any other available parameters can also be measured. These measurements may be helpful, for example, in determining whether the stage two filter 250 needs to be replaced or repaired or if one or more of the chemical and/or biological medium is functioning properly. The measurements may also provide feedback as to whether the stage two filter 250 is filtering sufficiently within the water treatment system 200. Alternatively or additionally, the monitoring system 290 may use one or more of these values to compare with values obtained at one or more other stages in the water treatment system 200.

The monitoring system 290 may be configured to sense a temperature of the water after the water has passed through the temperature regulator 260, which can be used as feedback to control the temperature regulator 260. In some cases, temperature can be measured for water before the temperature regulator 260 and that temperature can be used to control how the temperature regulator 260 adjusts the temperature. In some cases, the temperature regulator 260 can have a dedicated temperature sensor, which can measure water temperature at the temperature regulator more often than the monitoring system 290 would.

The monitoring system 290 may be configured to sense a pH of the water after the water has passed through the acidity regulator 262, which can be used as feedback to control the acidity regulator 262. In some cases, pH can be measured for water before the acidity regulator 262 and that pH can be used to control how the acidity regulator 262 adjusts the acidity of the water. In some cases, the acidity regulator 262 can have a dedicated pH sensor, which can measure water pH at the acidity regulator more often than the monitoring system 290 would.

Any combination of the additional parameters discussed herein can also be measured before or after the temperature regulator 260 and before or after the acidity regulator 262. Treated water can be delivered to the one or more aquaculture trays 270, and the monitoring system 290 may test for a plurality of values after the water has completed the water treatment process. In the example, embodiment of FIG. 8C, where the acidity regulator is the last water treatment stage, the treated water can be sampled after the acidity regulator 262 and any combination of the identified parameters can be measured in the treated water. If a different water treatment stage is last, such as the temperature regulator 260 or the second stage filter 250, then the treated water being output by those last stages can be sampled and measured. For example, at this stage the monitoring system 290 may be configured to sense any combination of the identified parameters such as one or more of the following values: a level of total chlorine, a level of free chlorine, a level of total ammonia, a level of total un-ionized ammonia, a total oxygen concentration (e.g., D.O.), an amount of TSS, a total level of nitrates, a total level of nitrites, a pH of the water, a temperature, and/or a salinity of the water.

The monitoring system 290 can receive water samples from some or all of the aquaculture trays (e.g., by tubes coupled to the aquaculture trays), and can perform any combination of the measurements identified herein using the water samples. The monitoring system 290 can be positioned lower than the aquaculture trays so that gravity can drive the water from the aquaculture trays to the fluid analyzer when the valves are configured to provide a fluid pathway. Some or all of the measurement locations in the water treatment system 200 can be pressurized (e.g., by the one or more pumps 202), and the pressure can drive water from the sampling locations to the fluid analyzer when the valves are configured to provide a fluid pathway.

The monitoring system 290 can cycle through the different measurement locations. By way of example, the system can use 12 measurement locations as follows: each of the 7 aquaculture trays, water being delivered from the soiled water receptacle to the water treatment system 200 (e.g., after the pump 202), after the oxygenator 220, after the nitrification stage 230, after the chlorination stage 240, and water output from the water treatment system before reaching the aquaculture trays. The monitoring system can cycle through these 12 measurement locations once each hour, taking a new set of one or more measurements every 5 minutes. Various alternatives are possible, such as different numbers of measurement locations, different sampling rates, etc. The monitoring system 290 can be configured to make a new set of one or more measurements every 1 minutes, 2 minutes, 3 minutes, 5 minutes, 7 minutes, 10 minutes, 15 minutes, or any values therebetween, or any ranges bounded by any combination of these values, although other sampling rates can be used.

An example measurement cycle can be performed as follows. The monitoring system 290 can actuate the one or more valves to provide fluid access between a measuring location and the fluid analyzer. Fluid can be delivered from the measurement location and flushed through the fluid analyzer for a flushing period of time sufficient to flush the water from a previous measurement location out of the fluid analyzer (e.g., 1 to 10 minutes or 3 to 7 minutes). Water from the prior measurements, and/or water flushed through the fluid analyzer can be delivered to the soiled water receptacle 280. In some embodiments, the monitoring system 290 can include a pump to move the water, or the measurement location can have pressurized water or can be located higher than the fluid analyzer so that gravity can flush the water through the fluid analyzer to the soiled water receptacle. After the flushing period of time, the fluid analyzer can make one or more measurements using one or more fluid samples. In some embodiments, the one or more valves can be actuated to prevent fluid flow through the fluid analyzer during the measurement(s). Information from the one or more measurements can be stored (e.g., in memory of the monitoring system), can be transmitted (e.g., to a remote location by a network such as the internet for remote monitoring or data logging), and/or can be used. For example, the monitoring system 290 may trigger an alarm, or shut down a system, or adjust a water treatment parameter based on the one or more measurements. The monitoring system 290, can then transition to the next measurement location, and the one or more valves can be actuated to provide fluid access between the next measurement location and the fluid analyzer. The process can repeat for each measurement location, and cycle repeatedly through the measurement locations. The monitoring system 290 can generate a history of measurement values for the various parameters at the various locations, which history can be stored in the memory and can be accessible through the user interface.

In some embodiments, the controller can analyze the information from the one or more measurements an can take actions based on that information. For example, if a measure parameter is outside of an acceptable range, or has a rate of change outside of an acceptable range, the controller can trigger an alarm, can stop the water flow (e.g., by turning off the one or more pumps 202). By way of example, if a measurement of the water being delivered from the water treatment system to the aquaculture trays 270 shows that the chlorine content of the water is above a threshold amount, the controller can stop the pump(s) 202 and/or can trigger an alarm (e.g., a sound alarm, an email alert, a visual alert, etc.). This can help prevent the aquatic animals (e.g., shrimp) from being exposed to chlorine levels that can be harmful to the animals. Similar operations can be performed for other measured parameters. In some embodiments, the controller can adjust one or more parameters of the water treatment system based at least in part on the information. For example, if a measurement indicates too little chlorine is present, the controller can send a command to the sanitizing system to increase the amount of chlorine (e.g., by applying more current in an electrolysis chlorinator). The oxygenator 220 can adjust the amount of oxygen (e.g., as air or as concentrated oxygen) that is added to the water, such as based at least in part on a measurement of oxygen in the water. The acidity and temperature an also be adjusted in response to corresponding measurements.

The water treatment system 200 can be configured in various different ways. The order of some stages can be changed, some stages can be combined, and some stages can be omitted. For example, the acidity regulator and/or the temperature regulator can be omitted, or can be repositioned at any other position along the water treatment process. The oxygenator 220 could be positioned before the particle filter 210. The one or more pumps 202 can be positioned at other positions, and can either push or pull water through the various stages depending on the positions of the pump(s) 202. In some embodiments, the stage one filter 230 (e.g., nitrification stage) and the particulate filter 210 can be combined into a single filter. This change may cause the filter to need more frequent backflushing or cleaning or replacement.

Many of the measurement locations that provide water to the monitoring system 290 are shown at locations between the water treatment stages or components. Tubes can be coupled to the pipes that interconnect the water treatment stages or components, so that water can be diverted to the monitoring system through the tubes. In some embodiments, the tubs can be coupled to the water treatment stages or components instead of to the interconnecting pipes. For example, tubes can couple the monitoring system to the particulate filter 210, oxygenator 220, to the stage one filter 230, to the sanitizing system 240, to the stage two filter 250, to the temperature regulator 260, and/or to the acidity regulator 262.

Figure 9:
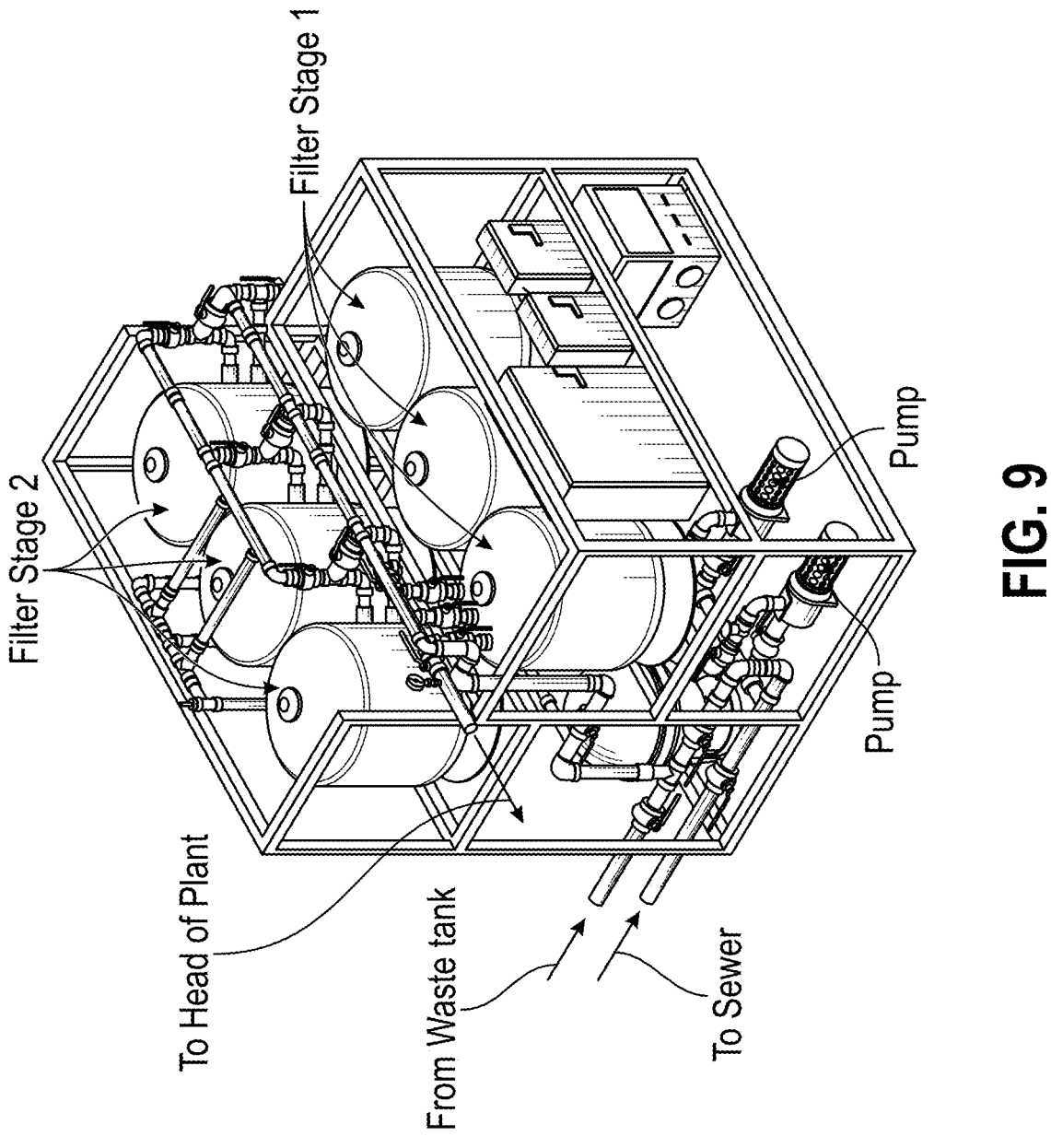
FIG. 9 is a perspective view of an example embodiment of a water treatment system.
Figure 10:
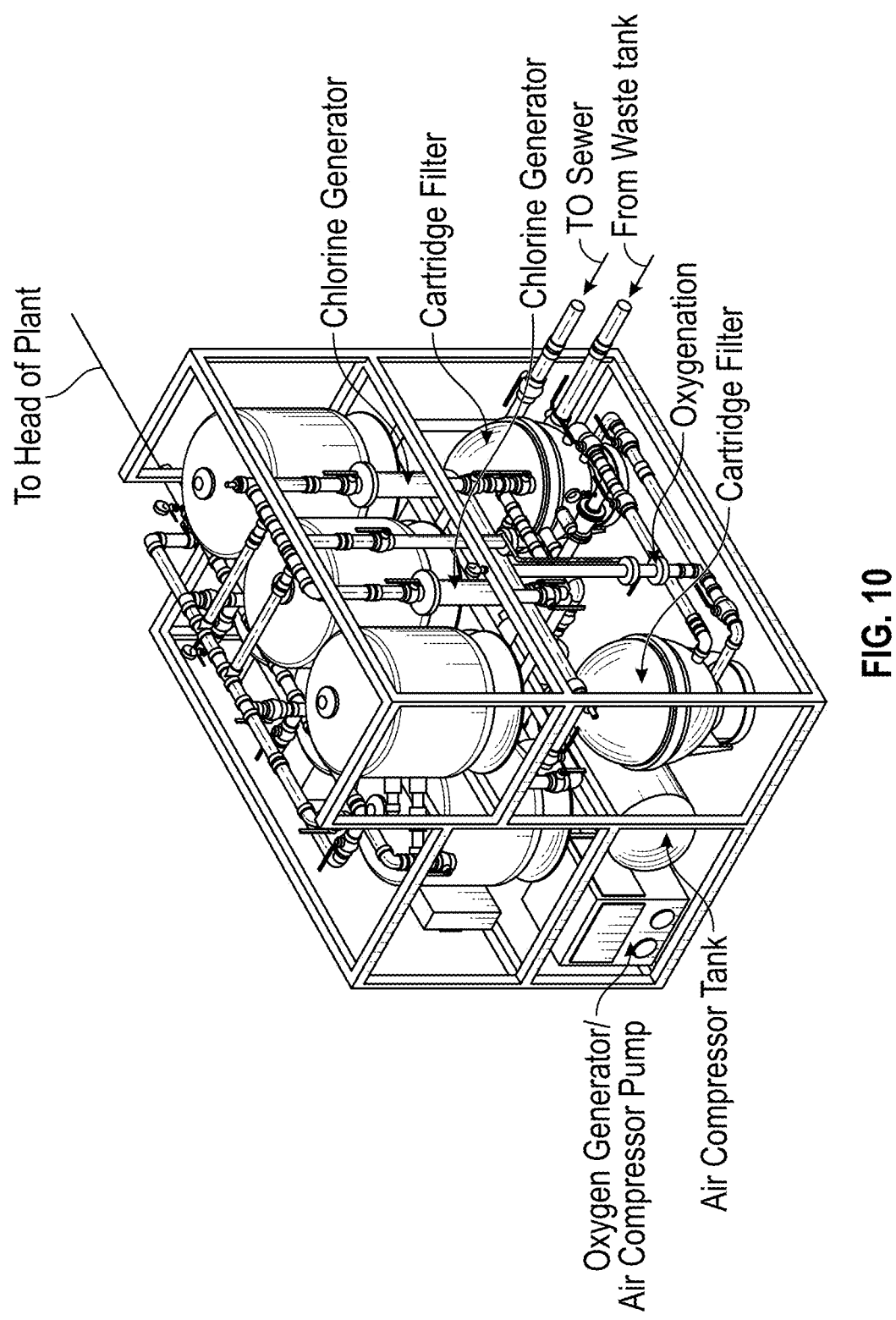
FIG. 10 is another perspective view of an example embodiment of a water treatment system.

FIGS. 9 and 10 show an example water treatment system. With reference to FIGS. 9 to 11, the water treatment system can output treated water, which can be delivered to the growth trays. Water from the growth trays can drain out (e.g., via the outlets discussed herein) to a drain tray, waste tank, soiled water container, or harvesting tank, which can be positioned below the growth trays. One or more pumps can move water from the drain tray, waste tank, soiled water container, or harvesting tank or can otherwise transfer water from the growth trays to the water treatment system for treatment. In some embodiments, non-clogging pumps can be used, which can be configured to pump water that includes solids (e.g., biofloc and/or other waste) dispersed therein. The water can be delivered to one or more particulate filters (e.g., cartridge filters), which can be configured to remove particulate matter (e.g., waste) from the water. In the embodiments of FIGS. 9 and 10, two cartridge filters are used, and the water can be diverted and driven through the two cartridge filters in parallel, although in other implementations the water can be driven though the filters in series or a single filter can be used.

The water can be oxygenated. In some embodiments, compressed air or compressed oxygen can be introduced to the water. For example, a compressor system (e.g., a compressor pump and/or compressor tank) can be used to compress the air or oxygen. A pipe or tube (e.g., not shown in FIGS. 9-10) can deliver the compressed oxygen or air to the water, such as at the location indicated in FIG. 10. The water can be delivered to one or more stage one filters where nitrification of the ammonia in the water can take place. The stage one filter(s) may include a biological filter, such as having nitrifying bacteria. In some embodiments, the stage one filters can include granular activated carbon. The stage one filters can provide sufficient dwell time for the oxygen that was previously introduced to the water to facilitate the nitrification of the ammonia in the water. In some embodiments, three stage one filters can be used. The water can be sent to the three stage one filters in parallel, although other embodiments could use the filters in series and any other number of filters could be used.

Chlorine can then be applied to the water. The system can use one or more chlorine generators, which can generate chlorine using the salt in the salt water that is used for the salt-water animals being grown (e.g., shrimp). The chlorine generators can apply electricity to generate chlorine from the salt water by electrolysis. In the illustrated embodiment, two chlorine generators are used and the water is sent to the chlorine generators in parallel, although other implementations could use any number of chlorine generators, which could be used in series or parallel. In some cases, chlorine (e.g., liquid chlorine) can be added to the water (e.g., to supplement, or in place of, the salt water chlorine generation). The water can be delivered to one or more stage two filters. The stage two filter(s) can be biological filters, such as having nitrifying bacteria, and at least some of the remaining ammonia can be removed from the water. The stage two filters can provide dwell time for the chlorine to interact with the water to treat the water. Chlorine can be applied to the water to reach a chlorination breakpoint. The stage two filters can include granular activated carbon. In some embodiments, the stage two filter(s) can dechlorinate the water, such as to reduce the chlorine level to an amount that is acceptable for the aquatic animals (e.g., shrimp). In some embodiments, three stage two filters can be used. The water can be sent to the three stage two filters in parallel, although other embodiments could use the filters in series and any other number of filters could be used. In some embodiments, the one or more stage one filters and/or the one or more stage two filters can use a sacrificial medium. Water exiting the stage two filters can be delivered to the growth trays as treatment water. The input of treated water can replenish water that is being drained from the growth tray for continuous water treatment. In some embodiments, chlorine extracted from the salt water can be reconverted into salt, such as by a chemical reaction.

The stage one and/or stage two filters can be backwashed. The system can include various valves for controlling the flow of water through the water treatment system. Water can be passed backwards through the filter at a faster rate than during normal filtering operation, which can clean the filter being backwashed. The system can include sets of three filters (e.g., three stage one filters and/or three stage two filters) to facilitate backwashing. Appropriate valves can be actuated so that the two filters that are not being backwashed can output water that is driven backwards through the filter being backwashed. The flow of water through the one filter in reverse can be faster than the flow of water through the other filters in the forward direction. Pressure may be applied to the water to facilitate the backwashing. For example, the water treatment system 200 may pressurize the water to a level of about 10-50 pounds per square inch (psi). Water used to backwash a filter can be delivered to the start of the water treatment system, or to the soiled water container, or to the particulate filter(s). The particulate filter(s) (e.g., the cartridge filter(s) or bag filter(s)) can filter out particulates and waste that is driven out of the filter being backwashed. The system can avoid dumping salt water to the sewer or other waste water output.

In some designs, the disclosed water treatment system 200 may be referred to as a "closed" system where the same water moves throughout each part of the water treatment system 200. This can provide a number of benefits, such as a reduction in the use of salt (e.g., for salt water designs) as well as a smaller industrial footprint. Moreover, the use of the closed system may prevent the growth of bacteria that may be harmful to the aquatic animals in the aquaculture growth system 100. In some embodiments, the water is pressurized during the full water treatment process. In some cases, the water is not left to sit in a container at ambient pressure during any stage of the water treatment process. The water can be continuously flowing through the growth trays, to the soiled water container, through the water treatment system, and back again.

The collected biofloc from trays can be recycled as high nutrient fertilizer for agriculture including hydroponic growing. Collected used biofloc from the treatment trays can be high in nutrients (e.g., carbon, nitrogen, phosphorus, and/or trace metal nutrients). Some portion (e.g., approximately 25%) of the food provided to the aquaculture farm can be recycled as used biofloc and can be recycled as fertilizer for secondary use in agriculture.

Figures 12A, 12B:
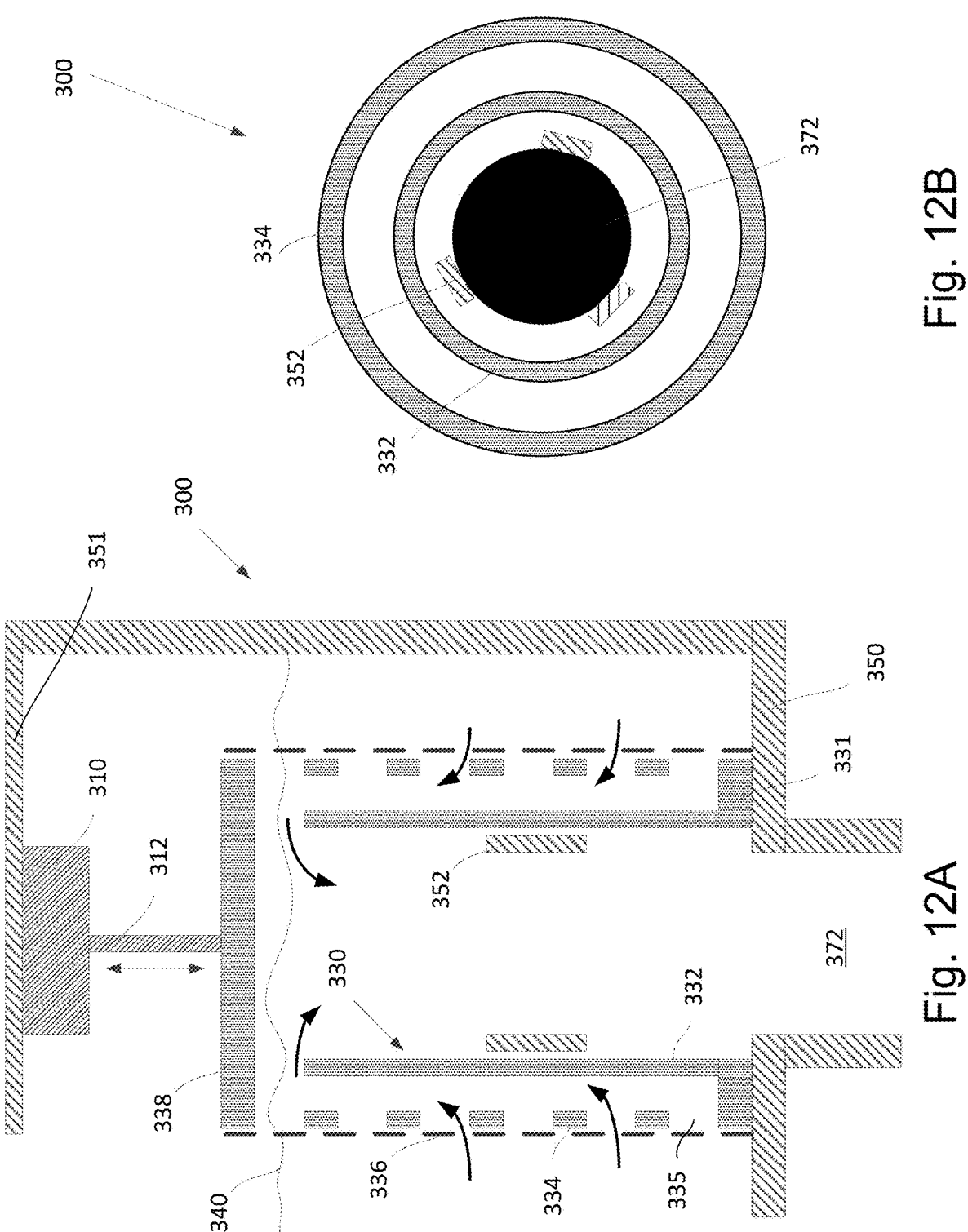
Figure 12C:
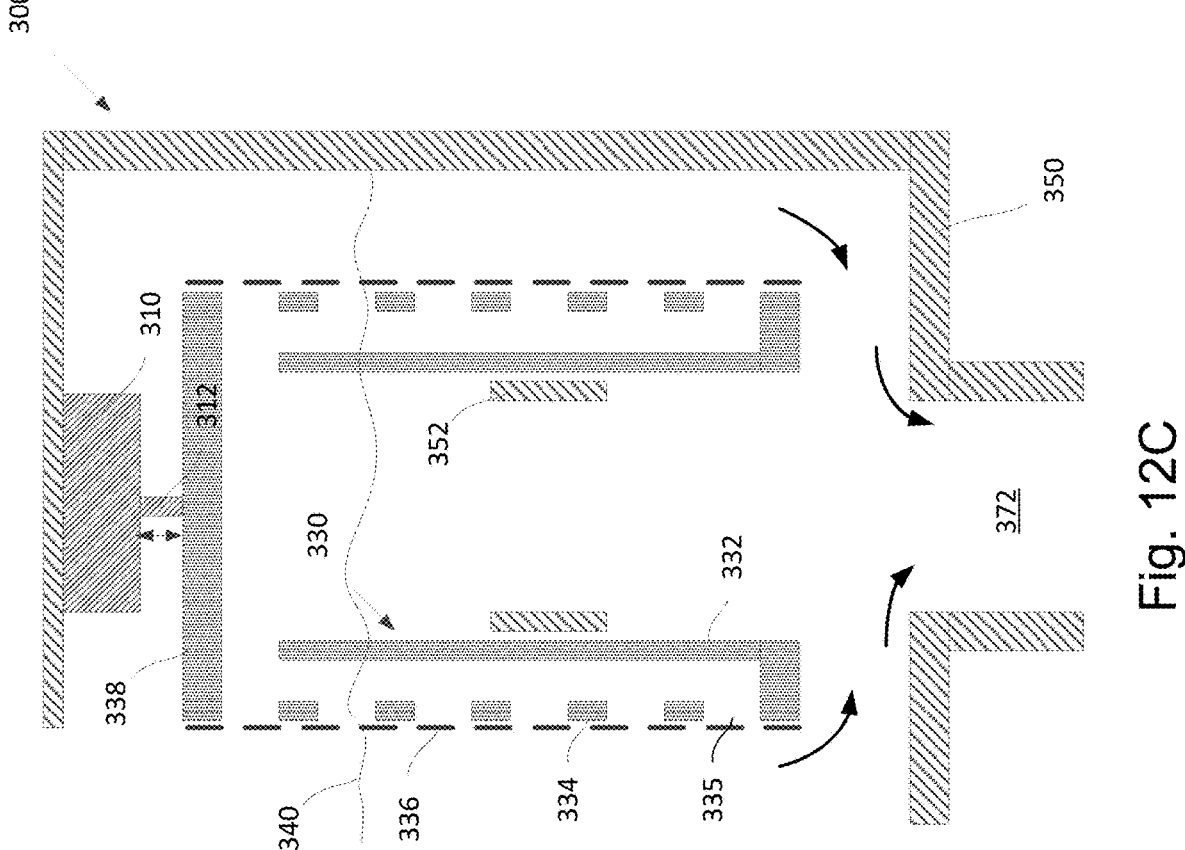
Figure 12D:
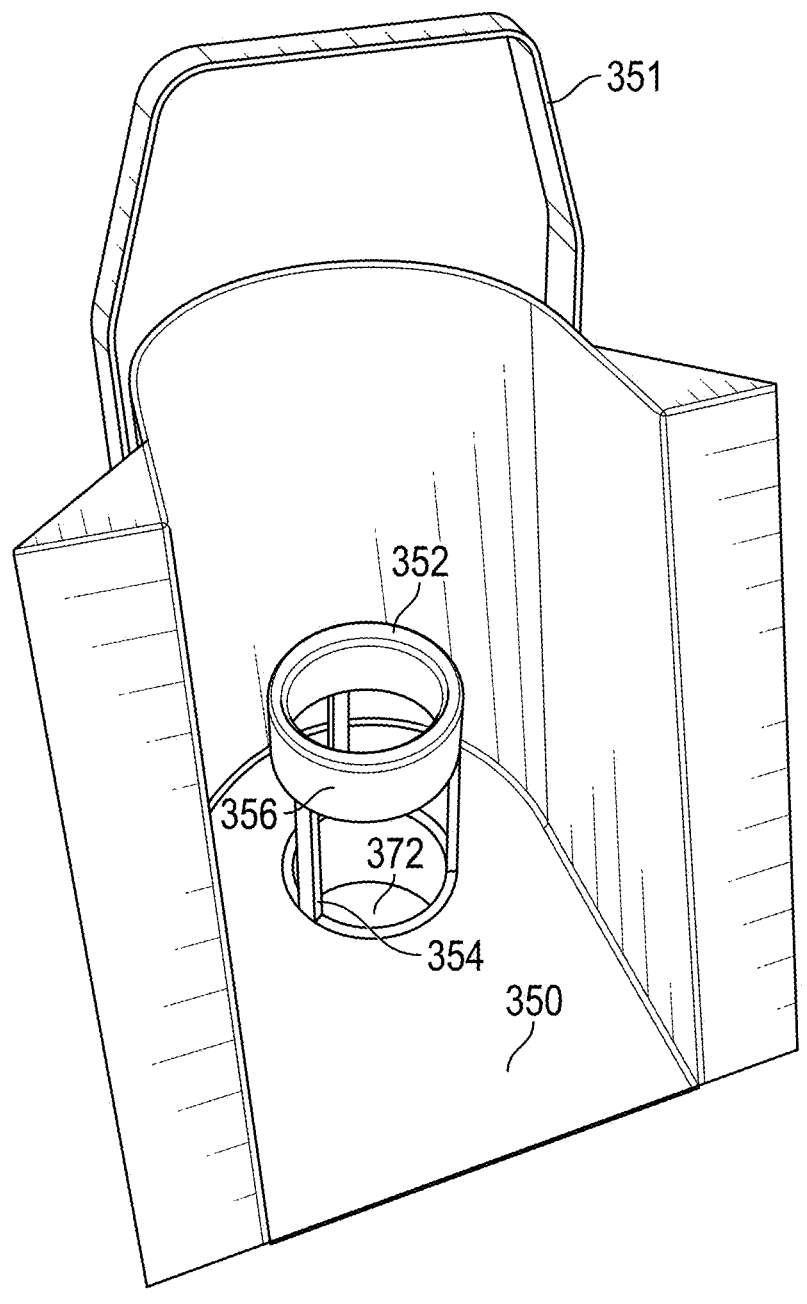
Figure 12E:
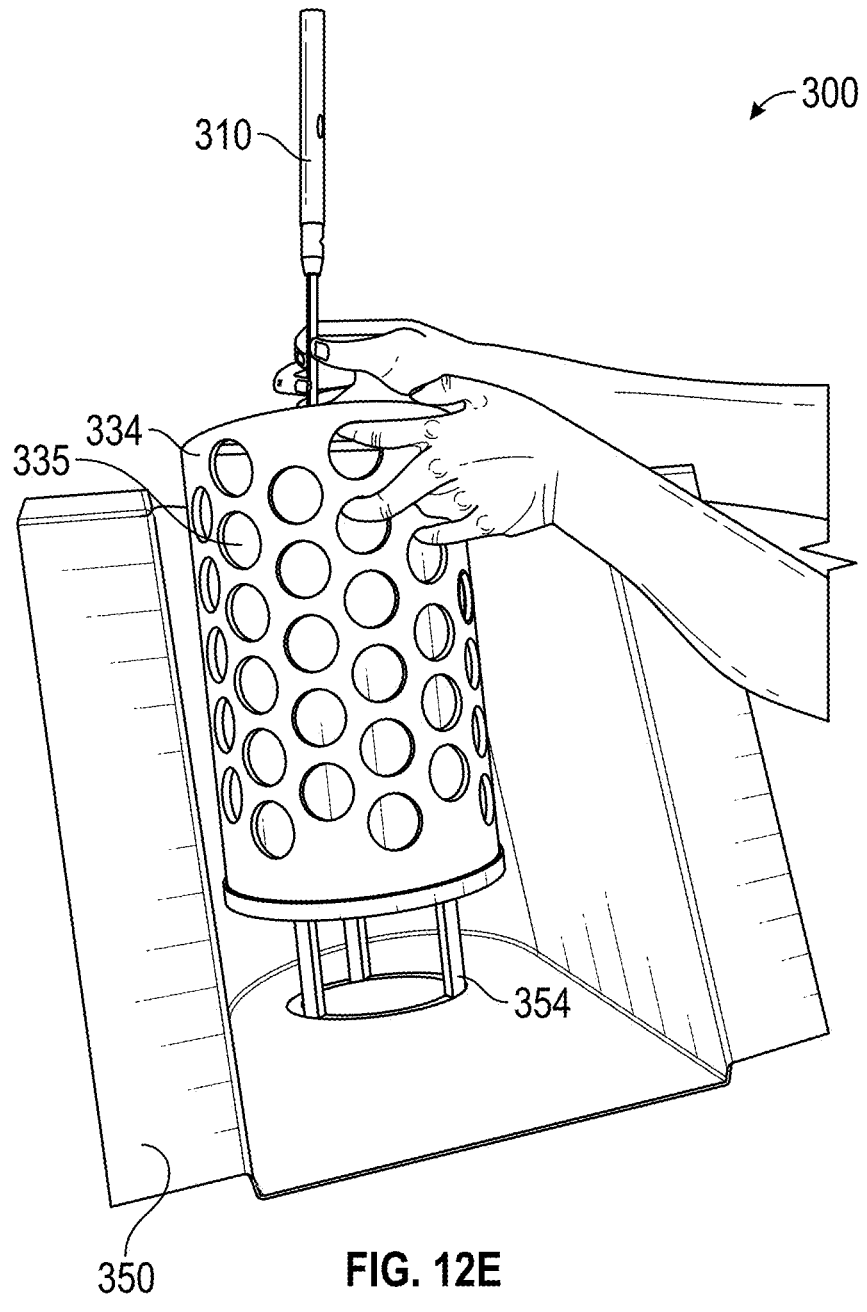
Figure 12F:
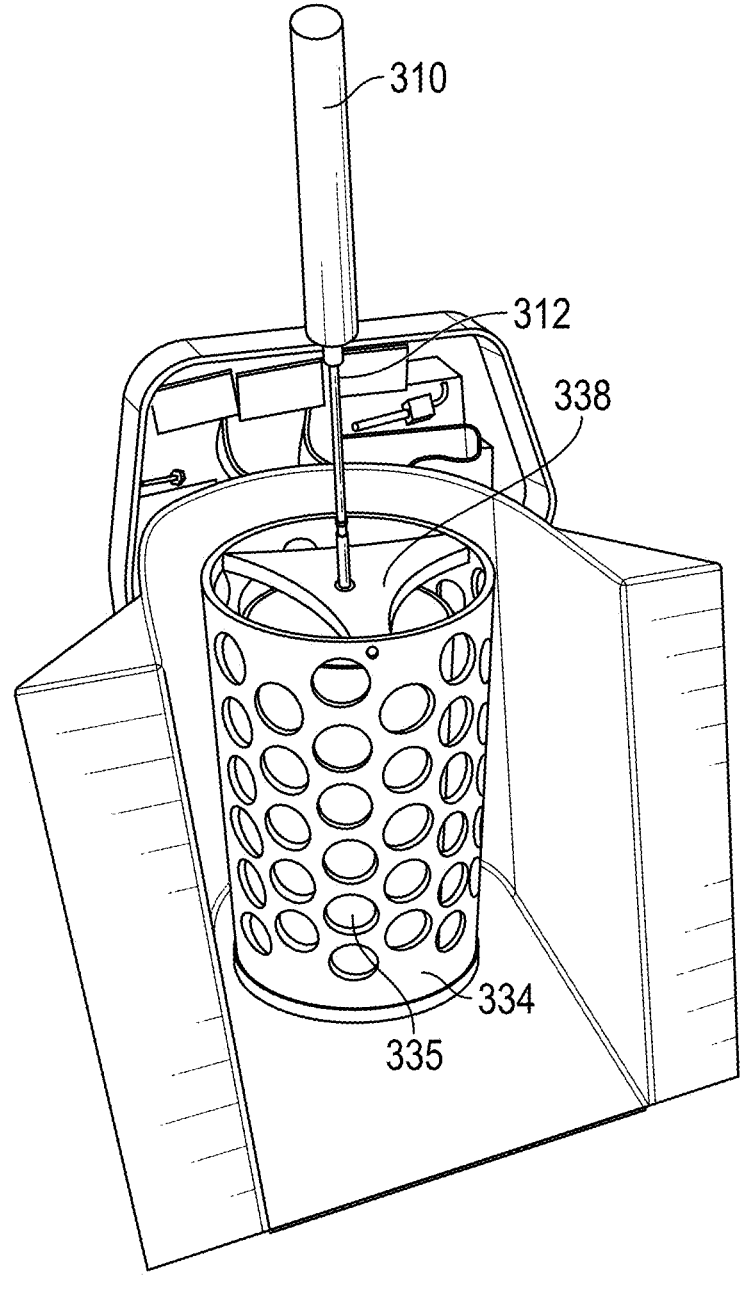
Figure 12G:
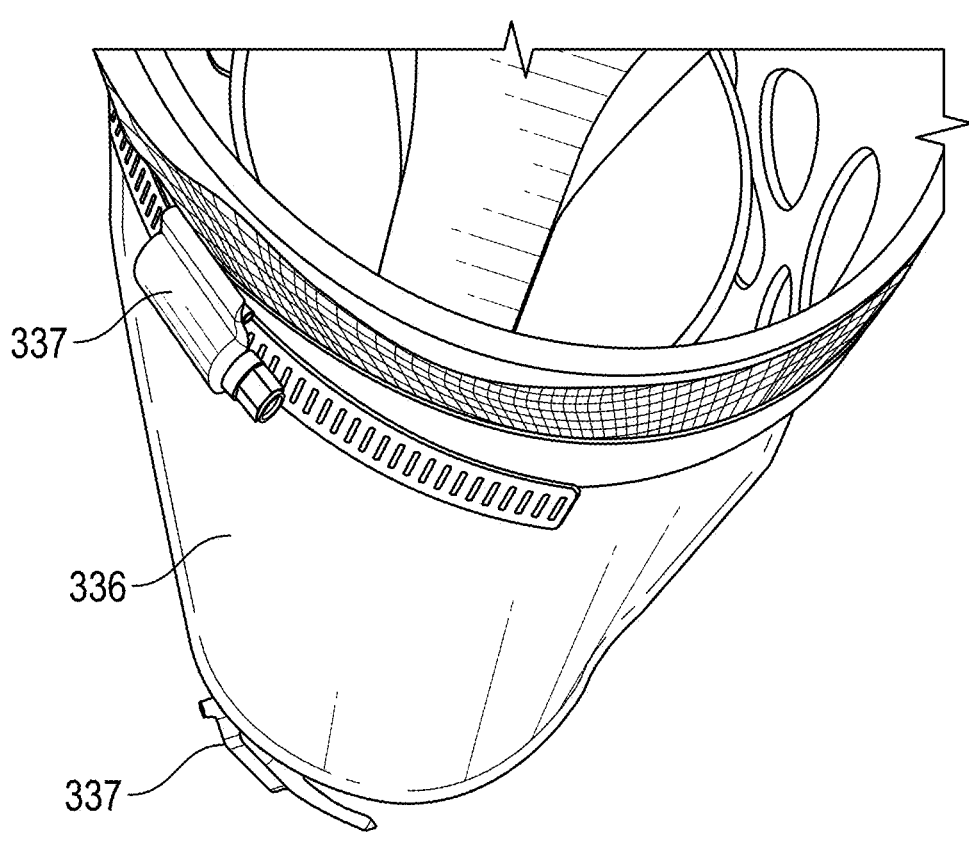

With reference to FIGS. 12A-12G, a drain valve system 300 is disclosed. FIG. 12A schematically shows a side view cross-section of a drain valve system 300 in a closed configuration. FIG. 12B shows a top-down cross-section of the drain valve system 300. FIG. 12C shows a side view cross-section of the drain valve system 300 in an open configuration. FIG. 12D shows a portion of the valve system including a valve support structure. FIG. 12E shows the drain valve system 300 in an open configuration. FIG. 12F shows the drain valve system 300 in a closed configuration. FIG. 12G shows a partial view of a drain valve.

The drain valve system 300 may include an actuator 310, a drain valve 330, and a valve support structure 350. The actuator 310 may be secured to a part of the drain valve system 300, such as the valve support structure 350, as shown in FIG. 12A. Other configurations are possible. In some designs, the actuator 310 is automatically and/or remotely controlled. The actuator 310 may include a piston 312, such as a hydraulic or pneumatic piston. The actuator 310 can include a motor, such as a stepper motor, or any other suitable actuation mechanism capable of moving the drain valve 330. The actuator 310 (e.g., the piston 312) may be mechanically secured to a valve cap 338 or other suitable portion of the drain valve 330. In some designs, such as those shown in FIGS. 12F and 12G, the valve cap 338 may be coupled to the outer valve sheath wall of the drain valve 330. However, the valve cap 338 may be coupled at other points on the drain valve 330 as well.

The drain valve 330 can have an inner valve sheath 332 and an outer valve sheath 334. The inner valve sheath 332 can have an open top end, and an open bottom end, and an open inside channel for water to flow through (e.g., when in the closed position). The inner valve sheath 332 can have closed sidewalls that can impede water from entering the inside channel, and can impede water from flowing to the outlet 372 when in the closed configuration.

A distal or bottom end of the drain valve 330 (e.g., a distal or bottom end of the inner valve sheath 332) may provide a fluid seal around the outlet 372, such as by sealing against the valve support structure 350. The fluid seal does not need to be completely water-tight, and in some cases may permit small quantities of water to flow past the bottom of the closed drain valve 330 to the outlet. This minimal water loss can be acceptable, such as if none of the aquatic animals can escape to the outlet and if the water loss does not cause the water level to drop below the intended height (e.g., which can be set by the height of the inner valve sleeve 332 in the closed position, as discussed herein). The inner valve sheath 332 can define a minimum water level 340 during a closed configuration, as shown in FIG. 12A. For example, water above a level defined by a proximal or upper end of the inner valve sheath 332 may pass through the upper opening and drain through the outlet 372, as shown by the directional flow arrows in FIG. 12A. The valve 300 can be configured to skim off the top layer of water for drainage. In some cases, the top layer of the water can have a higher concentration of undesired substances, such as ammonia and/or $CO_2$. Accordingly, it can be beneficial that the valve 300 removes the top layer of the water. As shown in FIG. 12A, the drain valve 330 may include a support foot 331, which may provide for a better fluid seal against the area around the outlet 372. For example, the support foot 331 or the bottom/distal end of the drain valve 330 can include a resilient material, such as an O-ring or gasket, which can compress against the sealing surface outside the outlet 372. In some embodiments, the actuator 310 can press the drain valve 330 against the sealing surface, which can compress the resilient material to facilitate sealing. The support foot can provide a structural foundation for the joining the outer sheath 334 to the inner sheath 332, as described more fully herein. The drain valve 330 (e.g., the inner sheath 332) may comprise a rigid material (e.g., plastic, wood, metal, glass), thus preventing a flow of water therethrough.

The drain valve 330 can be aligned with the outlet 372. For example, a center axis through the outlet can align with a center axis through the drain valve 330, through the inner sheath 332, through the outer sheath 334, and can align with the actuator. The drain valve 330 can fit over a guide structure 352. In some designs, the one or more guide structures 352 may be coupled to the valve support structure 350. As shown in FIGS. 12A and 12C, the one or more guide structures 352 may allow for the flow of water therethrough. The drain valve 330 can be configure to permit the flow of water through the drain valve 330 to the outlet during a closed configuration while preventing the flow of objects over a threshold size and/or aquatic animals therethrough. The water can flow into the open top of the inner sheath 332, through an interior of the inner sheath 332, and to the outlet 372.

The drain valve 330 may further include an outer sheath 334. The outer sheath 334 may be made or formed of the same rigid material as the inner sheath or of another rigid material. The outer sheath 334 can beneficially be radially spaced from the inner sheath 332 so as to allow for flow of water between the outer sheath 334 and the inner sheath 332. The outer sheath 334 can be configured to permit fluid (e.g., water) to pass through the outer sheath 334, while impeding the aquatic animals and/or objects larger than a threshold size from passing through the outer sheath 334. In some embodiments, the outer sheath 334 can include the rigid material, which can have openings 335 formed therein. In some embodiments, the openings 335 can be sized to impede the aquatic animals from passing therethrough, while permitting water to pass therethrough.

In some embodiments, the outer sheath 334 can include a lining 336. The lining 336 may have smaller apertures than the openings 335 in the rigid portion of the outer sheath 334. The rigid portion of the outer sheath 334 can function as a frame or support for the lining 336, and the lining 336 can impede the aquatic animals from passing through the outer sheath 334. In some embodiments, the openings 335 can be sufficiently large that the aquatic animals could pass through the openings 335 if it weren't for the lining 336. The openings 335 can be distributed around the surface of the outer sheath 334. For example, the openings 335 can cover 20%, 30%, 40%, 50%, 60%, 70%, or more of the surface of the outer sheath 334, or any values therebetween, or any ranges bounded by any combination of these values, although other values can be used. The amount of open area of the openings 335 can control the flow rate through the outer sheath 334. The lining 336 can prevent smaller particles from passing through the water outlet 372 than would be prevented by the sheath 334 alone. The lining 336 may be made from any material that can be configured to allow the flow of water therethrough while restricting the flow of particles greater in size that a target threshold (e.g., to impede the aquatic animals from passing through). For example, the lining 336 may include a metal mesh, a plastic mesh, a cloth screen, a screen of fibers, a netting, a grating, or any other suitable structure. The lining 336 can be coupled to the rigid portion (e.g., frame or support) of the outer sheath 334 by one or more fasteners 337, such as by one or more clamps. The outer sheath 334 can provide a filtering surface area that is configured to permit passage of water while impeding passage of the aquatic animals of 50 square inches, of 75 square inches, of 100 square inches, of 125 square inches, of 150 square inches, of 175 square inches, of 200 square inches, of 225 square inches, of 250 square inches, of 300 square inches, of 350 square inches, of 400 square inches, of 500 square inches, or any values therebetween, or any ranges bounded by any combination of these values, although other values can be used. The filtering surface area can be larger than the opening(s) that permit water to enter the inner sheath 332, such as by 1.5 times, 2 times, 2.5 times, 3 times, 3.5 times, 4 times, 5 times, 6 times, 7 times, 8 times, 9 times, 10 times, or more, or any values therebetween, or any ranges bounded by any combination of these values, although other values can be used.

FIG. 12B schematically shows a top view cross-section of a drain valve system 300. While FIG. 12B shows significant space between the one or more guide structures 352 and the wall of the inner sheath 332, this is not necessary in some designs. The inner sheath 332 can slidably engage the guide 352. The guide 352 can enable the drain valve 330 to move axially, such as to slide up to an open position and down to a closed position. The guide 352 can restrict non-axial movement of the drain valve 330. For example, if the drain valve 330 were pressed and/or moved slightly to the side (e.g., normal to the axis extending through the outlet and/or the drain valve 330), the inside of the sidewalls of the inner sheath 332 can abut against the guide 352 to impede the drain valve 330 from moving to expose the outlet 372. As shown and as described above, the outer sheath 334 may be spaced from the inner sheath 332 to provide a flow of water therebetween. The cross section of the valve as seen from above may be circular, such as in FIG. 12B, but other shapes are possible, such as a square, rectangle, triangle, hexagon, etc.

FIG. 12C schematically shows a side view cross-section of a drain valve system 300 in an open configuration. The drain valve 330 can slide upward to transition from the closed position to the open position. As shown by the directional flow arrows 370, water is able to flow underneath the drain valve 330, for example because the inner sheath 332 (e.g., including the support foot) is spaced away from the outlet. In the open position the support foot does not provide a fluid seal with the valve support structure 350. Additionally, objects over the threshold size and/or aquatic animals are able to flow out of the water outlet 372 when the valve system 300 is in the open configuration. This may easily allow the passage of aquatic animals (e.g., shrimp) from one aquaculture tray 270 to another aquaculture tray 270 or to a harvesting container.

The drain valve system 300 may be able to toggle between an open and close configuration in less than 15, less than 10 seconds, less than 5 seconds, less than 2 seconds, or any values or ranges therebetween. In an open configuration, the inner sheath 332 (sometimes called a valve wall) may be configured to be raised above a surface of the valve support structure 350 by a raised distance. The raised distance can be less than one inch if the aquatic animals are sufficiently small to pass through such an opening (e.g., larval or juvenile shrimp). However, the valve support structures 350 may be configured to be raised up to 3 inches, 6 inches, or even a foot in some designs, particularly if the aquatic animals are a size (or have achieved a size) where such a height is necessary to allow them to pass through. The raised distance can be any value or range between the identified values, and other values for the raised distance can be used, such as for different types of aquatic animals of different sizes.

FIGS. 12D-12G show pictures of an example embodiment. In FIG. 12D, the drain valve 330 is omitted and the guide 352 is shown. The guide 352 can include one or more supports 354 extending upward, such as from the area adjacent to the outlet 372. In some embodiments, the guide 352 can include a continuous upper guide element 356, which can be supported above the one or more supports 354. In some embodiments, the guide 352 can be an upright structure having openings (e.g., between the supports 354 in the embodiments of FIG. 12D) that are sufficiently large to permit water and the aquatic animals to pass through the guide to the outlet 372.

FIG. 12E illustrates a drain valve system 300 with the drain valve 330 raised to the open position. FIG. 12F shows a drain valve system 300 with the drain valve 330 in the closed position. FIG. 12F illustrates how one embodiment couples the actuator 310 to the valve cap 338, such as using a piston 312. FIG. 12G illustrates an example lining 336 that may be placed radially outward of the sheath 334. Other locations and/or configurations of the lining 336 are possible.

An actuator support 351 can support the actuator for moving the drain valve 330. The actuator support 351 can be positioned above the drain valve 330. In some embodiments, the actuator 310 (e.g., piston 312) can have a first side coupled to the actuator support 351 and a second side coupled to the drain valve 330, such as to the cap 338, which can be attached to the outer sheath 334 (as can be seen in FIG. 12F). The actuator 310 can be responsive to input received from a user input element such as a button or switch that can receive input from a user to transition the valve between the closed and open positions.

Many alternatives are possible. In some embodiments, the lining 336 can be omitted. For example, the rigid portion of the outer sheath 334 can have openings that are smaller than shown in the figures, and the openings can impede the aquatic animals from passing through, without using the liner 336. In some embodiments, the outer sheath 334 can be omitted. As can be seen in the cross-sectional view of FIG. 12H, the sheath 332 can have a lower portion with closed sidewalls, and an upper portion with openings to permit water to flow into the drain valve 330 and through to the outlet 372. The openings 335 in the upper portion of the sheath 332 can be small enough to impede the aquatic animals from passing through. In some embodiments, a liner 336 can cover the openings 335, similar to the discussion relating to the outer sheath. With reference to FIG. 12I, the sheath 332 can have openings at the top side that can permit water to flow therethrough, while impeding the aquatic animals from passing through. For example, a liner 336 can extend across the top side of the sheath 332. In some embodiments, the top side of the sheath 332 can have covering (e.g., made of the same rigid material as the side walls) that has openings therein. In any of the drain valve systems disclosed herein, the valve guide 352 can be omitted. For example, the actuator 310 can hold the drain valve 330 in place, such as to prevent it from moving to expose the outlet 372. In some embodiments, the actuator 310 can be omitted. For example, the drain valve 330 can be manually moved, such as by a user pulling upward on the drain valve 330 towards the open position or pressing downward on the drain valve 330 towards the closed position.

In some embodiments, aquatic animals can be transitioned into the aquaculture system gradually. Aquatic animals can be received in a container of water, which can be used for shipping. The water can have different parameters than the water in the aquaculture system. In some cases, transitioning the aquatic animals from the water of the receiving container straight to the water of the aquaculture system can be harmful to the animals. The water from the receiving container can slowly be brought into conformity with the parameters of the water in the aquaculture system over time, such as 1 day, 2 days, 3 days, 4 days, 5 days 7 days, 10 days, 14 days, or more, or any values or ranges between any of these values.

Figure 13A:
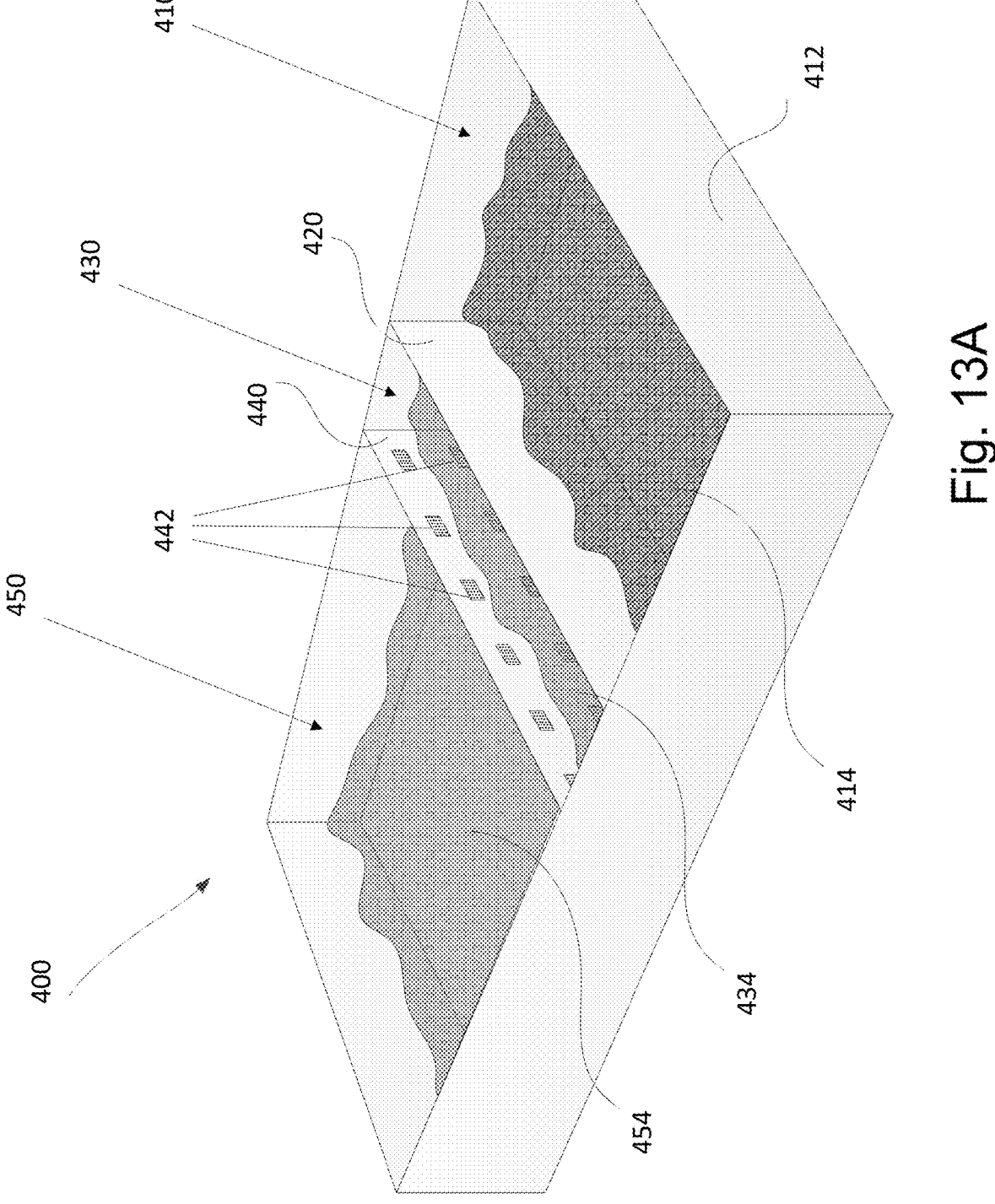
FIGS. 13A-E show example embodiments of a divided growth tray.
Figure 13B:
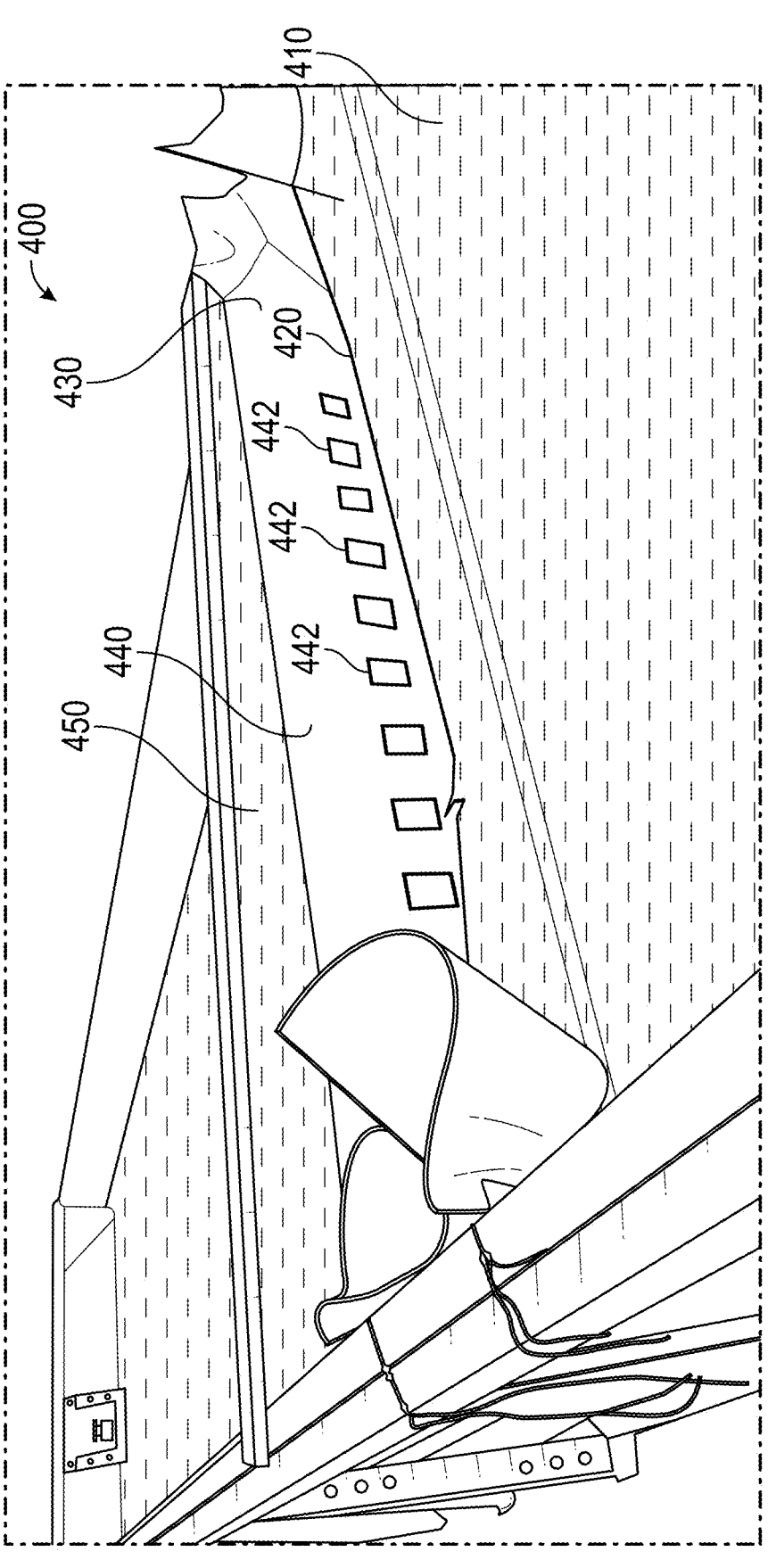
Figure 13C:
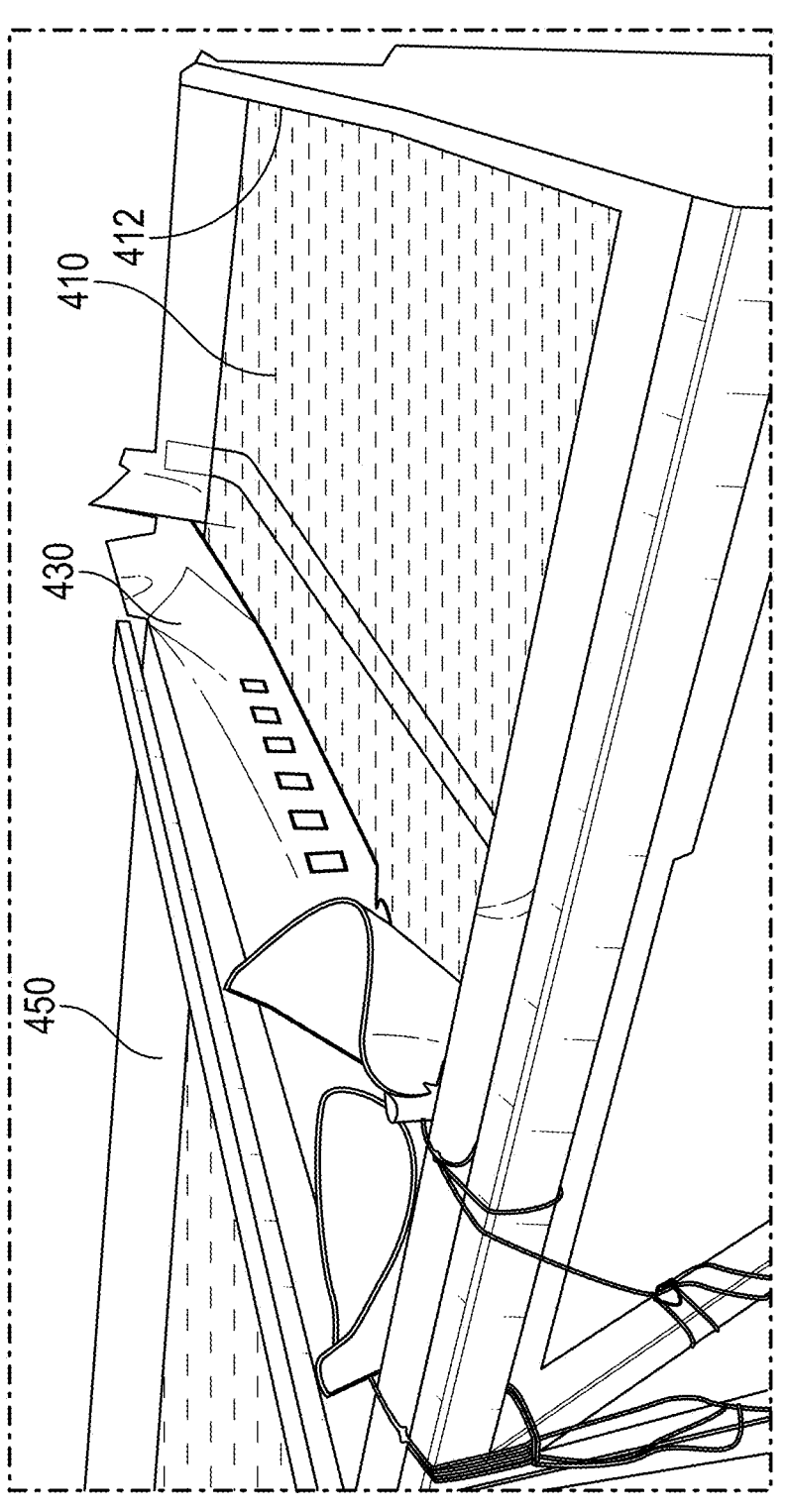
Figure 13D:
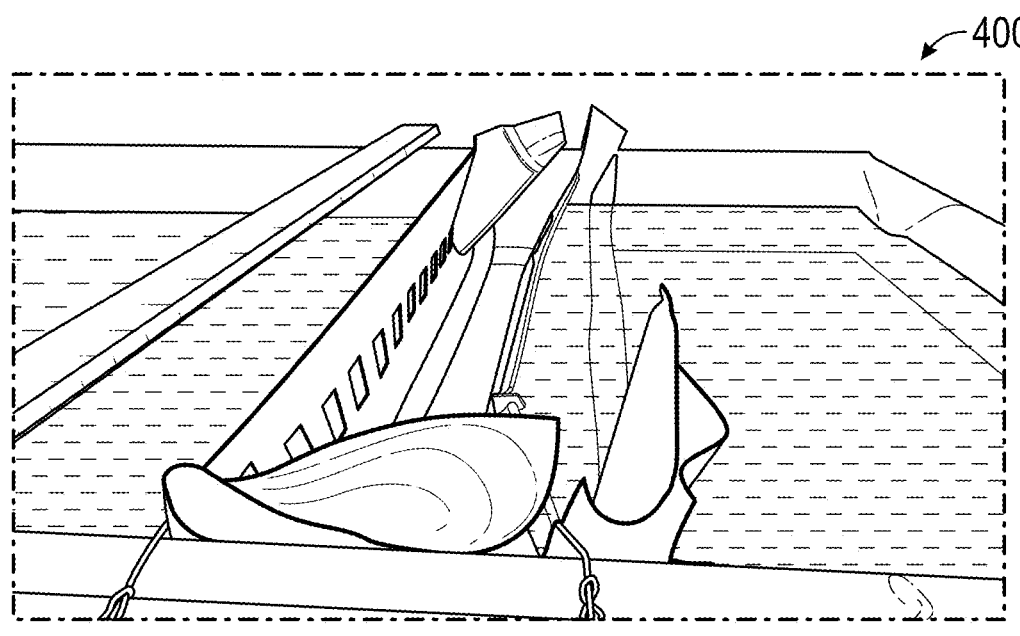
Figure 13E:
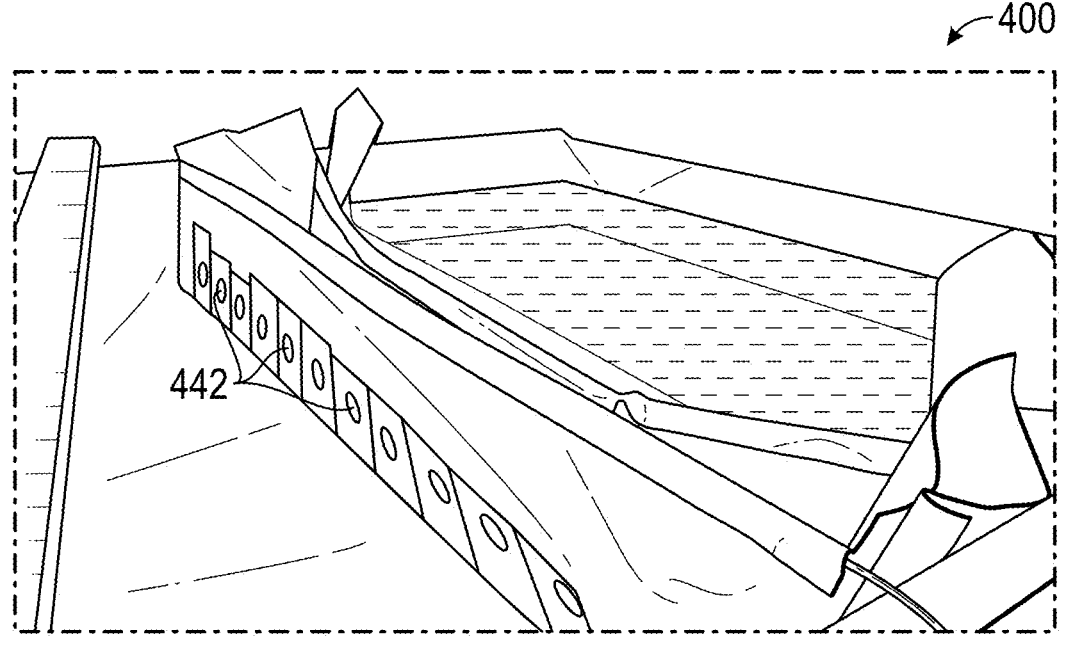

In some embodiments, one of the growth trays (e.g., a top growth tray) can be divided into a plurality of regions, such as using one or more dividers (e.g., walls or weir structures). FIGS. 13A-13E show various configurations of a divided growth tray 400. FIG. 13A schematically illustrates such a divided container using weir structures. It may be advantageous to provide a structure and/or method for transitioning new water and/or aquatic animals into one or more of the existing trays of the aquaculture growth system 100. For example, pH levels, salinity levels, temperatures, and/or other water parameters between the water in which young aquatic animals (e.g., shrimp) are growing or received and the water that is used in the existing tray(s) may be too great to safely and immediately transfer the young aquatic animals into the existing aquaculture growth system 100. A sudden change due to a direct transfer of water may shock the bodies of the young aquatic animals and may injure or kill the aquatic animals.

By way of example, young aquatic animals (e.g., post-larval shrimp) can be received or grown in a first body of water. A second body of water can be used in an aquaculture system, such as for older aquatic animals (e.g., juvenile or adult shrimp). The first body of water can have a first set of water parameters and the second body of water can have a second set of different water parameters. For example, one or more of the pH, salinity, and temperature can be different for the first and second bodies of water, although other water parameters can also differ, such as oxygen content, ammonia, etc. The pH of the first body of water can be lower (e.g., pH of 6.5 to 7) than the pH of the second body of water (e.g., pH of 8-8.3). The salinity of the first body of water can be higher (e.g., 35,000 ppm or 3.5%) than the water in the growth trays (e.g., 10,000 ppm to 12,000 ppm or 1% to 1.2%). In these examples, the pH can be raised and/or the salinity can be lowered gradually in the water that the animals (e.g., post-larval shrimp) are in.

A divided growth tray 400 can be implemented to transition the young aquatic animals into the aquaculture growth system 100 while reducing mechanical difficulty. As shown in FIG. 13A, such a divided growth tray may include a first area or water enclosure 410, a first retaining barrier 420, an intermediate area or water enclosure 430, a second retaining barrier, and a second area or water enclosure 450. The first water enclosure 410 may be configured to retain a first body of water 414 in which the young aquatic animals may be growing. The first body of water 414 may be contained between a retaining structure 412 (e.g., the walls of the growth tray) and a first divider or retaining barrier 420. The retaining structure 412 and/or the first retaining barrier 420 may include a pliable structure, such as a tray liner. Various materials for such a tray liner may be used, such as treated fabric, plastic (e.g., polyethylene, polypropylene), and/or rubber. If the first retaining barrier 420 includes a pliable material, the pliable nature of the material may allow the first retaining barrier 420 to be raised, lowered, or otherwise deformed as necessary.

A set of aquatic animals (e.g., post-larval shrimp) can be received or grown in a first body of water, and the first body of water 414 and the animals can be delivered (e.g., poured) into the first area or water enclosure 410. The first body of water 414 may be retained in the first water enclosure 410 for a period of time before at least some of the first body of water 414 is transferred and/or transitioned ultimately into the second area or water enclosure 450. It may be advantageous to first mix some of the destination water 454 in the third water enclosure 450 with the new water 414 to promote a smoother chemical (e.g., pH, salinity) transition of the new water 414 and/or of the young aquatic animals therein. In some designs, an intermediate area or water enclosure 430 may be formed in the retaining structure 412 (e.g., growth tray) using one or more dividers or barriers, such as a first retaining barrier 420 and a second retaining barrier 440.

In a retaining configuration, the first retaining barrier 420 and/or the second retaining barrier 440 may be at a height above the water levels to impede water and/or aquatic animals from transferring among the first area or water enclosure 410, the intermediate area or water enclosure 430, and/or the second area or water enclosure 450. The first retaining barrier 420 and/or second retaining barrier 440 may include a support structure and a pliable material. The support structure may be a cord (e.g., metal cable, rope) or a rigid structure (e.g., plastic rod or pipe, wood rod or plate, metal plate). Other configurations can be used. For example, one or both of the dividers 420 and 440 can comprise a removable wall. For example, the growth tray can have slots, which can receive a removable wall to form a divider (e.g., the dividers 420 and/or 440). The wall can slidably engage the slot to fit in place. The wall can be removed, such as by sliding the wall up and out of the slots. In some embodiments, the divider can be a pivoting door mechanism configured to open and close by pivoting about a hinge or pivot axis.

One or more perforated regions 442 may be included in the second retaining barrier 440 to allow for water to pass freely between the second area 450 and the intermediate area 430 while preventing the passage of aquatic animals therethrough. For example, more mature aquatic animals (e.g., young shrimp that are past the post-larval stage) than may be in the first area 410 may be growing in the second area 450 and it may be desirable to prevent their interaction with the younger aquatic animals in the first body of water 414 (e.g., in the first area 410). The perforated regions 442 may be formed directly into the second retaining barrier 440. Additionally or alternatively, the perforated regions 442 may be coupled to the second retaining barrier 440 using, for example, stitching, glue, epoxy, or any other means for coupling the perforated regions 442. The perforated regions 442 may be configured to allow a level of the water 454 in the second area 450 to match a level of the transition water 434 in the intermediate area 430, such as during a retaining configuration.

The first body of water 414 in the first area 410 can be modifies to bring the first set of one or more water parameters (e.g., pH, salinity, temperature, etc.) closer to the second set of one or more water parameters of the second body of water 450, which can be the water that is being circulated through the growth trays and the water treatment system. In some embodiments, parameters of the first body of water 414 can be measured and additives can be introduced to the first body of water 414 to adjust the parameters. For example, acid or base can be added to adjust the pH, salt can be added to increase the salinity, water without salt or with lower salinity than the existing first body of water can be added to reduce the salinity, heat can be added or removed, or water that is either cooler or warmer than the existing first body of water can be added to adjust the temperature. These additives can be introduced to the first area 410 gradually over a period of time so that the changes to the one or more water parameters do not shock, injure, or impair growth, of the aquatic animals (e.g., post-larval shrimp) in the first area 410. For example, the one or more water parameters of the first body of water 414 can be adjusted gradually over a time period of 1 day, 2 days, 3 days, 4 days, 5 days, 6 days, 7 days, 8 days, 9 days, 10 days, 12 days, 13 days, or 14 days, or any values therebetween or any ranges bounded by any combination of these values. For example, one or more water parameters (e.g., pH, salinity, temperature, etc.) of the first body of water 414 can be tested and/or additives can be introduced to the first body of water 414 every 5 minutes, 10 minutes, 15 minutes 30 minutes, 1 hour, 2 hours, 3 hours, 6 hours, 9 hours, 12 hours, 24 hours, or any values therebetween or any ranges bounded by any combination of these values, although other values can also be used.

In some embodiments, at least some of the additives added to the first body of water can be water from the second body of water 454, which can be the water that is circulated through the growth trays and the water treatment system. For example, the first area 410 can include at least one water outlet that receives treated water from the water treatment system. A valve can be opened from time to time so as to add the treated water to the first body of water 414. The valve can be closed at other times, even when other treated water is being delivered from the water treatment system to other areas (e.g., area 450) of the aquaculture system. By adding water having the second set of one or more water parameters to the first body of water 414, the water parameters of the first body of water 414 can gradually be changed to be closer to the second set of one or more water parameters. By adding water from the second body of water 454 to the first body of water 414, the first body of water 414 can be "diluted" to be more like the second body of water 454. Over the acclimation period of time, the volume of the first body of water 414 in the first area 410 can increase by 10%, 25%, 50%, 75%, 100%, 125%, 150%, 175%, 200%, 250%, 300%, 400%, 500%, or any values therebetween, or any ranges bounded by any combination of these values, although other values can also be used. In some embodiments, water from the second body of water 454 and other additives can both be added to the water in the first area 410.

In some embodiments, water can be transferred from the intermediate area 430 or the second area 450 into the first area 410 (e.g., directly, without going through the water treatment system). For example, some of the intermediate area water 434 may be allowed to mix with the first body of water 414. In some designs, this may be achieved by lowering a height of the first retaining barrier 420 to just below the level of the intermediate area water 434. The first retaining barrier 420 may be lowered in a number of ways. For example, a cable or rope may be provided slack to allow a pliable material (e.g., liner material) to be gravity lowered. Additionally or alternatively, a rigid structure of the retaining barrier 420 may be rotated to an angle such that the height of the retaining barrier 420 is reduced by such a rotation. Due to the lowering of the first retaining barrier 420, some of the intermediate area water 434 may be allowed to seep over the first retaining barrier 420. This process may allow the mixture of some of the intermediate area water 434 with the first body of water 414 and/or allow some of the intermediate area water 434 to enter the first water enclosure 410. The lowering of the first retaining barrier 420 may only last a few seconds or minutes before the first retaining barrier 420 is brought back into a retaining configuration (e.g., raised again to a height above the level of the intermediate area water 434). This lowering may be done one or more times over the course of a primary transition time (e.g., at the rates discussed herein over some or all of the course of the acclimation time period). The primary transition time (e.g., acclimation time period) may be a few hours, a few days, or even a week or more, depending on the volume of water in the first water enclosure 410, the difference in value(s) (e.g., pH, salinity, temperature) between the destination water 454 and the new water 414, and/or the sensitivity of the aquatic animals to the difference in said value(s). In some cases, the greater the difference and/or the greater the volume of water, the greater the length of the primary transition time. In some embodiments, water can be transferred into the first area 410 (e.g., from the second area 450) and/or from the intermediate area 430) using other manners, such as a siphon, pouring from a transition container (e.g., a bucket), etc.

In a first configuration, the divided growth tray 400 can isolate the first area 410 so that water and the aquatic animals therein do not flow out of the first area 410. As discussed herein, the first configuration can be used during an acclimation period of time, such as while the water parameters of the first body of water 414 in the first area 410 is brought closer to the water parameters of the water being circulated through the some or all of the remainder of the aquaculture system. In the first configuration, younger aquatic animals (e.g., post-larval shrimp) can be contained in the first area 410, and older aquatic animals (e.g., juvenile shrimp) can be contained in the second area 450. In some cases, no aquatic animals are in the intermediate area 430 in the first configuration. In the first configuration, both the first divider 420 and the second divider can be in place.

After the acclimation period of time, the growth tray 400 can be transitioned to a second configuration, where water is permitted to flow between the first area 410 and the second area 450, but the aquatic animals are impeded from passing between the first area 410 and the second area 450. In the second configuration, the first divider 420 can be removed. For example, the first divider 420 can be a collapsible weir, which can be collapsed to transition the growth tray 400 from the first configuration to the second configuration. For example, a cable can be slacked or released to let a flexible liner forming the divider 420 to lower to permit water and animals to flow over the collapsed divider 420. In the second configuration, the younger aquatic animals (e.g., the post-larval shrimp) from the first area 410 can expand into both the first area and the intermediate area 430.

The divided growth tray 400 can be in the second configuration during a second period of time, such as during the remainder of a growth period. The second period of time can last for 1 week, 2 weeks, 3 weeks, 4 weeks, 5 weeks, 6 weeks, or any time value therebetween, or any range bounded by any combination of these values, although other times could also be used. During the second period of time, the younger aquatic animals can be on a first side of the second divider 440 (e.g., in area 410 and/or area 430), and the older aquatic animals can be on the second side of the second divider 440 (e.g., in area 450). Treated water from the water treatment system can be delivered to one or both sides, and water can flow through the second divider 440, while the aquatic animals are impeded from passing through the second divider 440. The growth tray can have water that has the same set of water parameters in each of the areas (e.g., because the water is shared and can flow between each of the areas), while having animals of different ages isolated in the different areas.

After the second period of time (e.g., when the growth period ends), the one or more dividers can be transitioned to a third configuration for transferring the aquatic animals (e.g., from the first area 410 and/or the intermediate area 430 to the second area 450). The older aquatic animals in the second area 450 can be transferred out of the second area 450 (e.g., by transferring the older aquatic animals to one or more other growth trays). Then the younger aquatic animals in the first area 410 and/or the intermediate area 430 can be transferred to the second area 450. The second divider 440 can be removed to permit the aquatic animals to pass into the second area 450. The second divider 440 can be a collapsible weir, and it can be collapsed (e.g., by slacking a support cable) so that the aquatic animals can pass over the collapsed second divider 440. The second divider 440 can be a removable wall, which can be removed (e.g., slid up out of corresponding slots) to permit the animals to move into the second area 450. The second divider 440 can have moveable elements (e.g., one or more doors) that can open to permit the animals to pass through the second divider 440. In some embodiments, a screen can be removed from the perforated regions 442 so that the perforated regions 442 can become openings large enough for the aquatic animals to pass through.

After the aquatic animals have been transferred into the second area 450, the divided growth tray 400 can be transitions to the first configuration (e.g., where the first divider 420 and the second divider 440 divide the growth tray, as discussed herein). A new set of aquatic animals (e.g., post-larval shrimp) can then be introduced into the first area 410. In some embodiments, some or all of the water in the first area 410 can be removed before introducing the new set of animals, for example, using a siphon, pump, or fluid transfer device (e.g., a bucket). The new set of animals can be introduced into the first area 410 along with a new set of water (e.g., the water that the new set of animals was received or grown in).

FIGS. 13B-13E illustrates an example embodiment of a divided growth tray 400 having collapsible weir structures 420 and 440 using cables (e.g., ropes) as support structures with liner material suspended therefrom to form the first retaining barrier 420 and the second retaining barrier 440. The illustrated embodiment shows the use of coupled perforated regions 442 to allow the flow of water through the second divider 440 while restricting the flow of the aquatic animals (e.g., sufficiently mature shrimp) therethrough. In FIGS. 13B-13E, the second area 450 and the intermediate area 430 are shown empty, these areas can contain water and/or aquatic animals during use.

For either or both of the dividers 420 and 440, the cable (e.g., rope) can be secured to the frame structure that supports the growth tray. In some embodiments, a ratchet mechanism can be used to tighten the cable (e.g., rope). The liner material can be draped over the cable, and secured to itself (e.g., by adhesive or stitching, etc.) to create a sleeve through which the cable can extend. The weir can be collapsed by slacking the cable, and the weir can be raised by tightening the cable. Many other types of dividers can be used, as discussed herein.

In some embodiments, the growth tray 400 can have a single divider that has three configurations. For example, the divider can be similar to the first divider 410, but having the one or more perforated regions 442 similar to the divider 440, and also having covers for the perforated regions 442 so that water does not flow through the perforated regions when the covers are in place. The first configuration can isolate water and the aquatic animals in the first area 410, so that the water and the aquatic animals are impeded from flowing out of the first area 410. For example, the covers can be in place to impede water from flowing through the perforated regions in the first configuration. In the second configurations, the covers can be removed to expose the perforated regions to permit water to flow through the divider (e.g., from the first area 410 to the second area 450), while impeding the aquatic animals from flowing therethrough. In the third configuration, the divider can permit the aquatic animals and the water to flow therethrough. For example, the divider can be a collapsible weir that can be collapsed in the third configuration. The perforated regions can be removed in the third configuration so that the aquatic animals can pass through pass through the openings that had the perforated regions. Thus, in some embodiments, the second divider 440 and/or the intermediate area 430 can be omitted.

In some embodiments, the aquaculture system can have one or more sweeper systems. For example, one or some or all of the growth trays can have a sweeper system. The sweeper system can be used to mix water in the growth tray, to agitate particulate waste (e.g., to impede the waste from sticking to sides or bottom of the growth tray), to move particulate waste towards the outlet, to move the aquatic animals around in the growth tray, and/or to facilitate transfer of the aquatic animals out of the growth tray (e.g., by pushing the animals towards the outlet).

FIG. 7 shows an example embodiment of a sweeper system 500. A sweeper track 560 can be positioned above the growth tray 501*a*. For example, the sweeper track can be attached to an underside of the cross beams or supports 134 (e.g., horizontal supports) that are for supporting a growth tray 501*b* that is position above the growth tray 501*a*. The sweeper track 560 can extend along a longitudinal centerline that divides the growth tray 501*a* in two long halves, such as suspended generally above a centerline along the length of the growth tray. A sweeper frame 510 can engage the sweeper track so that the sweeper frame 510 can move along the sweeper track 560, for example to move a sweeper member 538 along the growth tray. The sweeper frame 510 can include rollers (e.g., wheels, bearings, etc.) to facilitate the movement of the sweeper frame 510 along the sweeper track 560. In some embodiments, an actuator can move the sweeper frame 510 along the sweeper track 560. The actuator can be a motor driving a chain or cable that is attached to the sweeper frame 510. In some cases an assembly similar to a garage door opener can be used. In some embodiments, the actuator can have different settings, such as a slow setting and a fast setting, where the fast setting moves the sweeper member 538 faster than the slow setting. The fast setting can be used for transferring the aquatic animals or for otherwise moving the animals in the growth tray 501*a* (e.g., towards an outlet). The slow setting can be used continuously, or periodically, during a growth period, such as for mixing water or agitating particulate matter in the water. A sweeper arm 530 can couple the sweeper member 538 to the sweeper frame 510. The sweeper element can include a generally horizontal support and one or more sweeping elements that extend downward from the horizontal support. The sweeping elements can be bristles, wipers, or the like. In some cases the generally horizontal support can be contoured or angled, such as to correspond with the shape of a bottom or sides of the growth tray 501*a*. For example, although not shown in FIG. 7, the sweeper member 538 can have upturned ends so that the sweeper member 538 can sweep the side walls of the growth tray 501*a*, in some cases in addition to the bottom surface of the growth tray 501*a*.

Figures 14A, 14B:
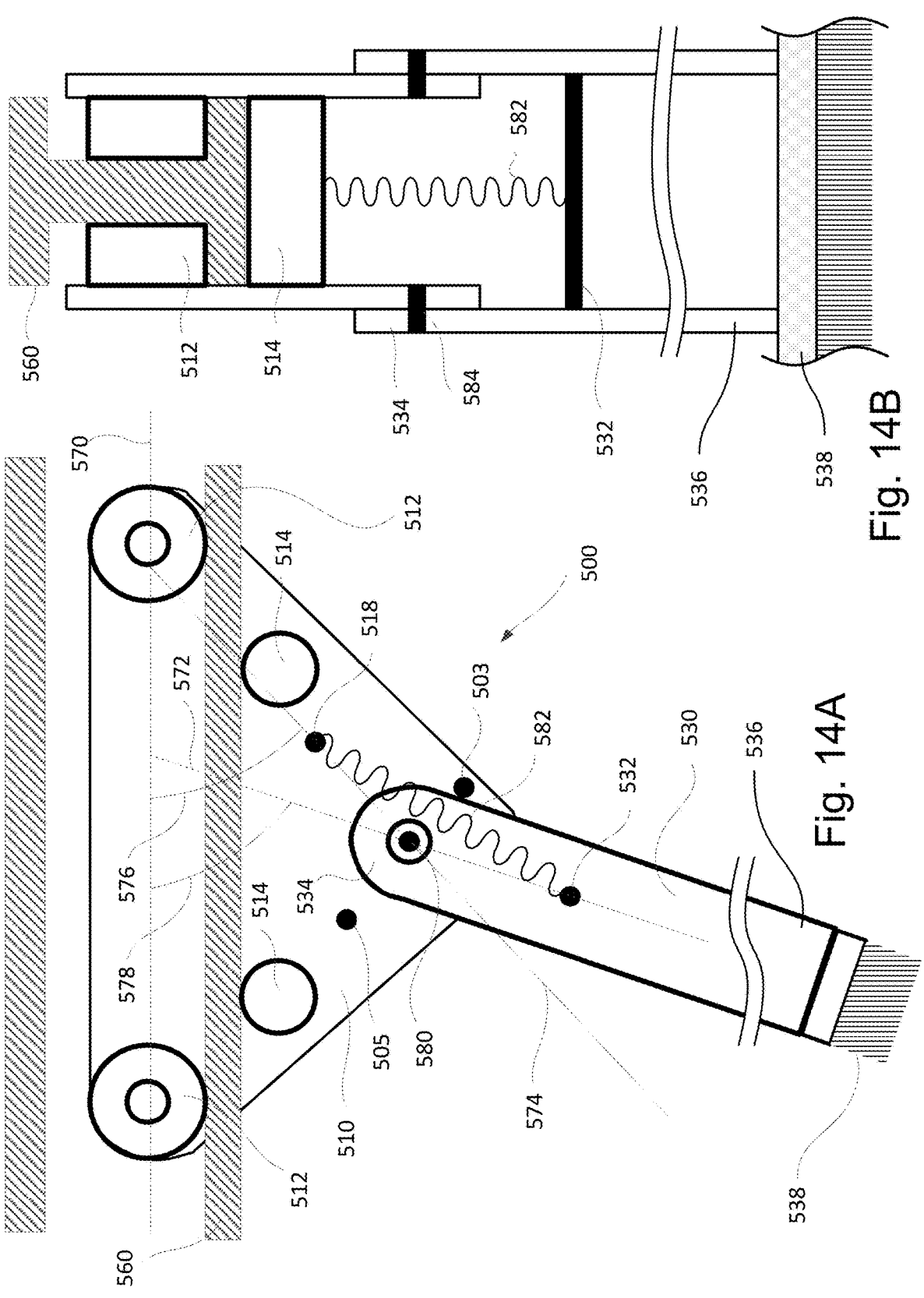
FIGS. 14A-D shows example embodiments of a sweeper system.
Figures 14C, 14D:
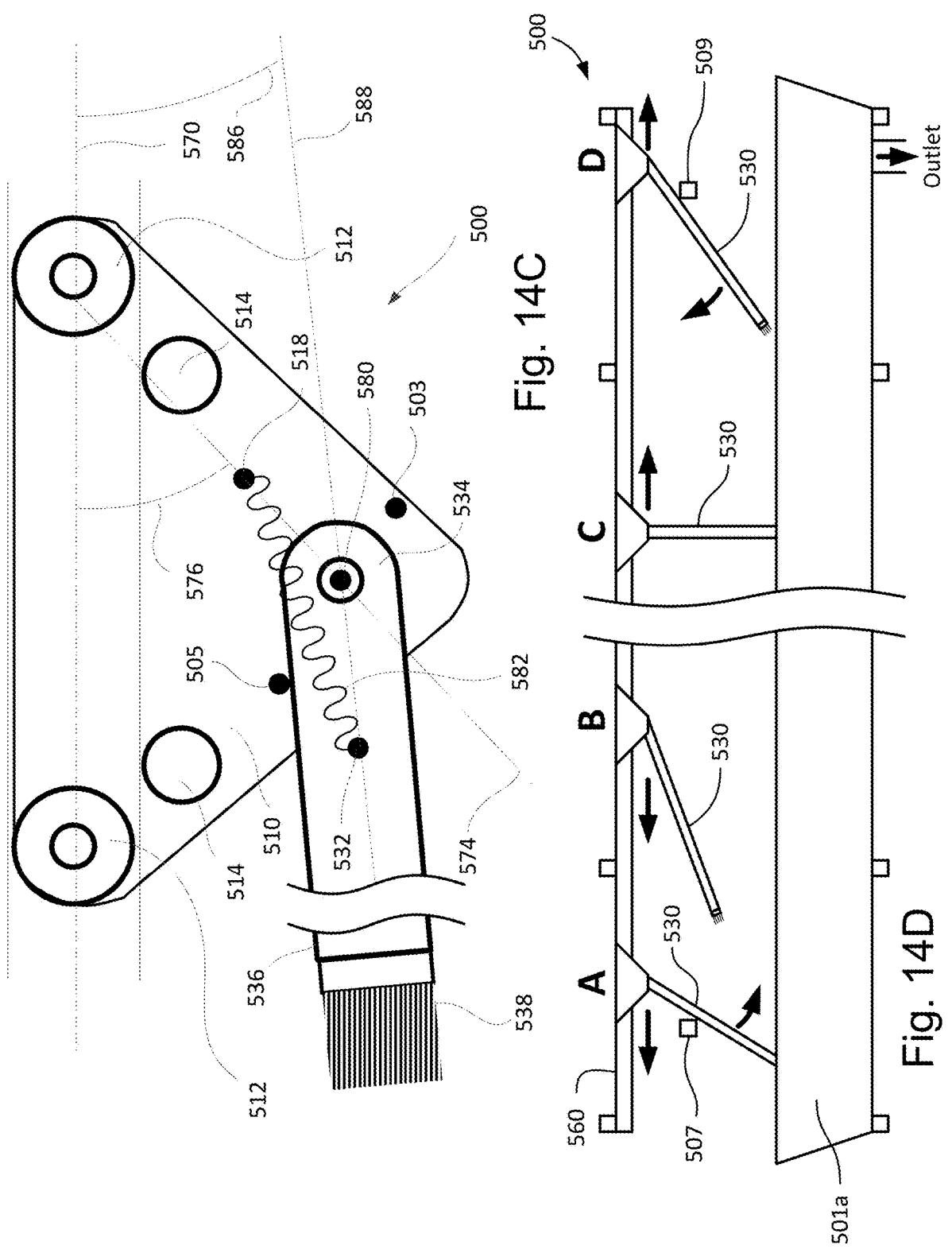

FIGS. 14A-14C show various views of an example embodiment of a sweeping system 500. Such a sweeping system 500 may be used, for example, in an aquaculture growth system 100, such as in growth trays. FIG. 14A schematically shows a side view of a sweeping system 500 in a sweeping configuration or sweep mode. FIG. 14B shows a front view of the same sweeping system 500 in the sweeping configuration. A sweeping system 500 may include a mechanical sweeper and a sweeping track 560. The mechanical sweeper may include a sweeper frame 510 and a sweeping arm 530. For ease of illustration, the sweeping arm 530 is shown truncated in FIGS. 14A to 14C. A sweeping member 538 can be positioned at a distal end of the sweeping arm 530. The sweeping member 538 can include a support member and one or more sweeping elements (e.g., bristles or wipers). The sweeper frame 510 may be configured to travel along a sweeping track 560 along a sweep axis 570. The sweeping arm 530 may be rotatably coupled to the sweeper frame 510 at a rotation point 580. The rotation point 580 may include a hinge, pivot, or bearing 584 or other means for rotatably coupling the sweeping arm 530 to the sweeper frame 510. The sweeping arm 530 can move between a deployed configuration (e.g., shown in FIG. 14A) where the sweeping member 538 can engage the growth tray, and a retracted configuration (e.g., shown in FIG. 14C) where the sweeping member 538 can be retracted to not engage the growth tray. The sweeping member 538 can be lifted out of the water in the retracted configuration.

The sweeper frame 510 may include one or more support rollers 512 configured to run along a first surface of the sweeping track 560. The one or more support rollers 512 may be configured to support a majority of the weight of the mechanical sweeper. Additionally or alternatively, the sweeper frame 510 may include one or more guide rollers 514 configured to increase the predictability and stability of movement of the mechanical sweeper. As shown in FIGS. 14A-14B, the sweeper frame 510 may include four support rollers 512 and two guide rollers 514, but other configurations are possible. The sweeper track 560 can have an I-shaped cross-sectional shape, for example, having a vertical member, an upper horizontal member, and a lower horizontal member. Two support rollers 512 can be positioned on either side of the sweeper track 560, such as on either side of a vertical member of the track 560 (e.g., at least four total support rollers 512), and two guide rollers 514 can be positioned below the sweeper track 560. The lower horizontal member can be between the one or more support rollers 512 and the one or more guide rollers 514. The rollers can be wheels, bearings, or the like.

The sweeping arm 530 may include a proximal end 534 and a distal end 536. The sweeping arm 530 may have a sweeping member 538 disposed near or at the distal end 536. The mechanical sweeper 538 be a brush or wiper, etc. The sweeping member 538 may include one or more materials configured to promote a movement of aquatic animals. For example, the sweeping member 538 may include hairs, bristles, flaps, a spongy (e.g., porous) volume, a perforated surface, netting, mesh, and/or other material to promote movement of aquatic animals through water. The sweeping member 538 may be configured to move the aquatic animals generally parallel to the sweep axis within an aquaculture receptacle (e.g., growth tray). The sweeping system 500 may be configured to move the aquatic animals to one of the aquaculture receptacle (e.g., to an outlet at one end of the receptacle).

A resilient member 582 can connect to the sweeper frame 510 and to the sweeping arm 530 at frame attachment point 518 and arm attachment point 532, respectively. The resilient member 582 may have a proximal end and a distal end. The resilient member 582 may define a deployment angle 578. The deployment angle 578 may be defined by the intersection of the axis of deployment 572 (defined by the sweeper arm 530) with the sweep axis 570 (defined by the sweeper track 560), as shown in FIG. 14A, though other arrangements are possible. The axis of deployment 572 may be determined by the line connecting the rotation point 580 with a midpoint of the width of the sweeping arm 530, as shown in FIG. 14A (as shown, the arm attachment point 532 is located approximately at the midpoint of the width of the sweeping arm 530). In some designs, the proximal end of the resilient member 582 is coupled to the sweeper frame 510 at the frame attachment point 518. The distal end of the resilient member 582 may be coupled to the sweeping arm 530 at the arm attachment point 532. The deployment angle 578 may be at one of a range of angles. For example, the angle may be acute (as shown in FIG. 14A), right, or obtuse. A first stopper 503 can impede the sweeper arm from rotating forward past the deployed position. The first stopper 503 can be a pin or protrusion or other structure, which can be coupled to the frame 510, and the sweeper arm 530 can abut against the first stopper 503 when in the deployed position. When in the deployed position, the biasing member 582 (also referred to herein as a resilient member 582) can pull the sweeper arm against the stopper 503. When the sweeper arm 530 is at the deployment angle 578 between the sweeper arm 530 and the sweeper track 560, the sweeper arm 530 can contact the stopper 503.

FIG. 14C schematically shows a side view of the sweeping system 500 in a retracted configuration or retraction mode. A retracted configuration may include a sweeping arm 530 at a retraction angle 586 relative to the sweeper track 560. The retraction angle 586 may be defined as the angle of the intersection of the axis of retraction 588 (defined by the retracted sweeper arm 530) with the sweep axis 570 (defined by the sweeper track 560). FIG. 14C does not show the location of the intersection of the axis of retraction 588 with the sweeper track axis 570, but the retraction angle 586 between them is indicated. A retraction mode may also include a sweeping arm 530 that is positioned parallel to the sweep axis 570. In such a retraction mode, the retraction angle 586 would be undefined or nonexistent. Nevertheless, the sweeping system 500 may include a retraction angle 586 that is undefined because the axis of retraction 588 and sweep axis 570 are parallel. Moreover, a retraction angle 586 may be obtuse. For example, if the distal end 536 of the sweeping arm 530 is closer to the sweep axis 570 than the proximal end 534 of the sweeping arm 530, then an obtuse retraction angle 586 may result. A second stopper 505 can impede the sweeper arm from rotating past the retracted position. The stopper 505 can be a pin or protrusion or other structure, which can be coupled to the frame 510, and the sweeper arm 530 can abut against the stopper 505 when in the retracted position. When in the retracted position, the biasing member 582 (also referred to herein as a resilient member 582) can pull the sweeper arm 530 against the stopper 505. When the sweeper arm 530 is at the retraction angle 586 between the sweeper arm 530 and the sweeper track 560, the sweeper arm 530 can contact the stopper 505.

The sweeper arm 530 can be biased towards being in either of the deployed position (e.g., shown in FIG. 14A) and the retracted position (e.g., shown in FIG. 14C). When the sweeper arm 530 is at an intermediate position between the deployed position and the retracted position, the biasing element (e.g., spring or other resilient member) can urge the sweeper are towards one of the deployed position and the retracted position. If the sweeper are 530 is forward of a transition axis 574, the sweeper arm 530 can be urged towards the deployed position. If the sweeper arm 530 is reward of the transition axis 574, the sweeper arm 530 can be urged towards the retracted position. The resilient member 582 may have a relative maximum of potential energy when the sweeper arm 530 is at an angle of maximum potential energy 576. The angle of maximum potential energy 576 may be defined as the angle of the sweeper arm 530 that results in the most potential energy being stored in the biasing element 582. The transition axis 574 (e.g., the position where the sweeper arm 530 imparts the maximum potential energy to the biasing element 582) can extend through the frame attachment point 518 and the rotation axis 580 for the sweeper arm 530. The axis of maximum potential energy 574 may be determined based on where the resilient member 582 is at a maximum potential energy. For example, the resilient member 582 may be stretched to a relative maximum distance when the frame attachment point 518, the rotation point (or axis) 580, and the arm attachment point 532 are collinear. The angle of maximum potential energy 576 may be between the retraction angle 586 and the deployment angle 578.

The frame 510 can include two side pieces that are joined by one or more supports between the two side pieces. The sweeper arm 530 can be attached to the outside of the two side pieces (e.g., as seen in FIG. 14B) or on the inside between the two side pieces. The sweeper arm 530 can include two side pieces, which can be joined by one or more supports between the two side pieces. The arm attachment point 532 for the biasing member 582 can be a support extending between the two side pieces of the sweeper arm 530.

In some configurations, the amount of force needed to move the sweeper arm from the retracted position to the deployed position can be less than the amount of force needed to move the sweeper arm from the deployed position to the retracted position. The sweeping arm 530 may have a higher moment of inertia in a sweep or deployed configuration than in a retracted configuration. This may reduce the amount of initial force that is required to move the mechanical sweeper during the retracted configuration relative to the sweep or deployed configuration. In other embodiments, the amount of force needed to move the sweeper arm from the retracted position to the deployed position can be more or the same as the amount of force needed to move the sweeper arm from the deployed position to the retracted position.

FIG. 14D shows an example embodiment of a sweeper system 500. FIG. 14D shows a side view. The sweeper is shown at four different positions (labeled A, B, C, and D) in FIG. 14D to facilitate description of the operation of the sweeper system. In some embodiments, a single sweeper can be used and can be moved between the positions of A, B, C, and D, although in some embodiments multiple sweepers can be used for a single growth tray 501*a*. At position B, the sweeper can be moved towards a rear of the growth tray 501*a* in the retracted position. The sweeper arm 530 can contact a deploying feature 507, which can push the sweeper arm 530 to the deployed position as the sweeper moves rearward, as shown at position A. The sweeper can then be moved forward along the growth tray 501*a* in the deployed position, as shown at position C, to perform the sweeping function (e.g., to move the aquatic animals, mix water, agitate particulate matter, etc.). The sweeper arm 530 can contact a retracting feature 509, which can push the sweeper arm 530 to the retracted position as the sweeper move forward, as shown at position D. The deploying feature 507 and/or the retracting feature 509 can be a generally horizontal cross bar extending from one side of the frame structure to the other.

The sweeping system 500 may be operated manually or automatically. In some designs, the mechanical sweeper includes a remote signal receiver configured to receive a signal initiating a retraction mode and/or a sweep mode. In some embodiments, the sweeper can include an actuator (e.g., a hydraulic or pneumatic piston) that can move the sweeper arm 530 between the deployed and retracted positions. The sweeping system 500 may further include a computer programmed to control movement of the mechanical sweeper along the sweeping track 560. The mechanical sweeper may be configured to automatically traverse the sweeping track 560 in a first direction in a sweep mode and/or traverse the sweeping track 560 in a second direction (different from the first direction) in a retraction mode. The sweeping system 500 may be configured to move the mechanical sweeper multiple times in the first and second directions. This may help ensure that the sweeper has successfully moved all (or at least a sufficient number) of the aquatic animals to one end of the aquaculture receptacle. For example, the sweeping system 500 may be configured to move the mechanical sweeper once per hour in the first direction. In some designs, the computer may be programmed to move the mechanical sweeper in the first direction at a slower speed than in the second direction. Additionally or alternately, the mechanical sweeper may be configured to travel along the sweeping track 560 faster while in a retraction mode than in a sweep mode, or vice versa. In some designs, the mechanical sweeper is configured to pause before transitioning between a sweep mode and a retraction mode or to pause when switching directions. In some embodiments, a motor can drive a cable or chain in a first direction to move the sweeper forward, and can drive a cable or chain in a second direction to move the sweeper rearward. In some embodiments, the sweeper system can be configured so that a motor can be driven in a single direction to move the sweeper back and forth along the track 560. For example, a chain or cable can be looped so that one side is moving forward while the other side is moving rearward. The sweeper can be coupled to the cable or chain so that it can be move forward and rearward with the cable or chain while the motor operates in a single direction.

Figure 15A:
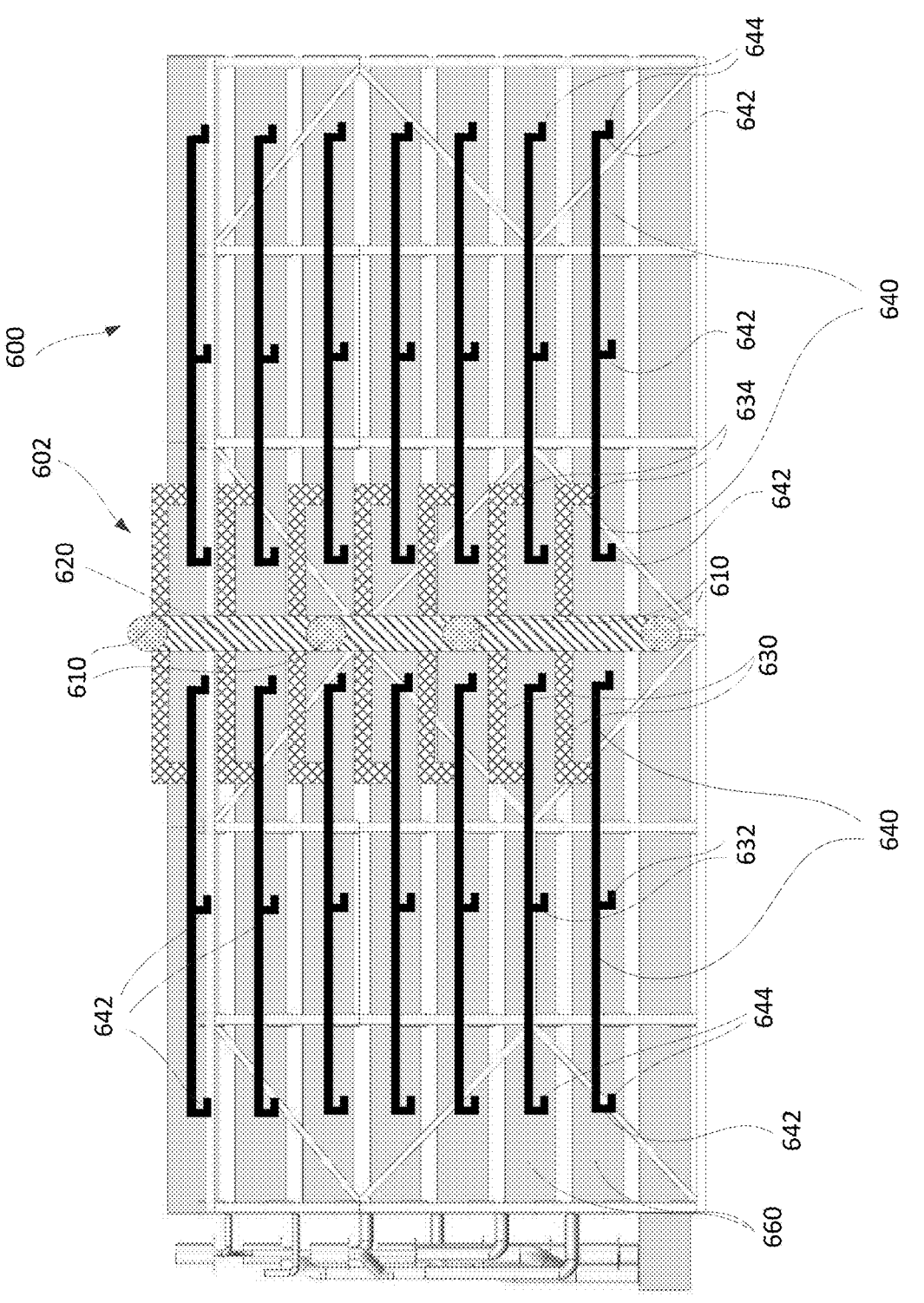
FIGS. 15A-C show example embodiments of a water delivery system.

FIG. 15A schematically shows a side view of an example aquaculture water delivery system 600. The aquaculture water delivery system 600 can deliver treated water output from a water treatment system 200 to one or more growth trays 660 of an aquaculture system. In FIG. 15A, the water delivery system 600 is shown schematically overlaid onto a diagram of an example embodiment of a system having seven growth trays 660. Some components of the water delivery system 600 can be positioned inside the growth trays 660, such that they would be hidden from view from the side. However, for ease of illustration, the water delivery system 600 is visible through the growth trays and frame structure in FIG. 15A. The aquaculture water delivery system 600 may be configured for installation on an aquaculture growth system 100 and/or in conjunction with an aquaculture feed delivery system 700 or any other of the various aquaculture system components discussed herein.

Water can be received by the water delivery system 600 at one or more water inlets. In some embodiments, the water delivery system 600 can receive water from a single source, such as the water treatment system. The water treatment system can output water that is received by one or more inlets of the water delivery system 600. The water delivery system 600 can include a series of branches or forks that can divide the flow of water between a number of water outlets 644. In some embodiments, the water can be divided among each of the growth trays 660. Each growth tray can include 1, 2, 3, 4, 5, 6, 8, 10, 12, 16, 20 water outlets or any values therebetween or any ranges bounded by any combination of these values, although other values can also be used, such as for larger growth trays. The pipes and/or branch locations can be configured so that the flow rates of water at the water outlets in the water delivery system 600 can vary by no more than 5%, 10%, 15%, 20%, 25%, or any values therebetween or any ranges bounded by any combination of these values, although other values can also be used. In some embodiments, the water delivery system 600 can be configured to provide different flow rates to different growth trays (e.g., higher flow rate for growth trays having older aquatic animals). The water outlets 644 can each output water at a flow rate of 1 gallon per minute (gpm), 2 gpm, 3 gpm, 5 gpm, 7 gpm, 10 gpm, 15 gpm, 20 gpm, 25 gpm, 30 gpm, or any value therebetween, or any ranges bounded by any combination of these values, although other flow rates can be used in some instances.

The aquaculture water delivery system 600 may include one or more water delivery subsystems 602. For example, as can be seen in FIG. 15C, in some embodiments, two water delivery subsystems 602 can be used, such as with one positioned on each side of the stack of growth trays 660. In some embodiments, only one water delivery subsystem 602 is used on only one side of the stack of growth trays 660. A water delivery subsystem 602 may include one or more primary water pipes 620, one or more secondary water pipes 630, one or more tertiary water pipes 640, quaternary water pipes 642, and water outlets 644.

In some embodiments, the primary water pipe 620 can receive water (e.g., from the water treatment system) from a single primary water inlet 610. In some embodiments, two or more primary water inlets 610 may be located at various points on an aquaculture growth system 100. As shown in FIG. 15A, a water delivery subsystem 602 may include four primary water inlets 610 spaced vertically along the primary water pipe 620. In some embodiments, a single inlet 610 can be positioned at the top, bottom, or middle, or any other suitable location along the primary water pipe 620. The primary water pipe 620 can be positioned vertically at or near a midline of an aquaculture growth system 100. However, other variations are possible. The one or more primary water inlets 610 may include valves for controlling the flow of water therethrough. For example, the valves may reduce or eliminate the flow of water through a given primary water inlet 610. Additionally or alternatively, the valves of the primary water inlets 610 may be configured to direct the flow of water to one or more primary water pipes 620. The one or more primary water pipes 620 may receive the water from the primary water inlets 610. In some designs, and as shown in FIG. 15A, the one or more primary water pipes 620 may run generally vertically.

One or more secondary water pipes 630 may receive water from the one or more primary water pipes 620. At or near the junction of the primary water pipes 620 and the secondary water pipes 630, valves may be configured to control flow of water therethrough. For example, the valves may be used to reduce or eliminate the flow of water through a set of one or more secondary water pipes 630, while permitting flow of water through another set of one or more secondary water pipes 630. Additionally or alternatively, the valves at or near these junctions may be configured to direct the flow of water to one or more secondary water pipes 630. A water delivery subsystem 602 may include one or more secondary water pipes 630 for each aquaculture tray 660 in an aquaculture growth system 100. For example, as shown in FIG. 15A, a water delivery subsystem 602 may include two secondary water pipes 630 extending perpendicularly from the primary water pipes 620. The one or more secondary water pipes 630 may run generally horizontally, generally parallel to the ground and/or to one or more corresponding aquaculture trays 660. A water delivery subsystem 602 may include seven sets of secondary water pipes 630 (e.g., one set for each growth tray). Each set of secondary water pipes 630 can include two secondary water pipes 630, for example, having a fist secondary water pipe extending towards a front of the growth tray 660 (e.g., the side having the outlet) and a second secondary water pipe extending towards a back of the growth tray 660. Water from the primary water pipe 620 can be branched into two or more secondary water pipes 630 (e.g., into 14 secondary water pipes).

Each of the one or more water delivery subsystems 602 may include tertiary water pipes 640 that receive water from the secondary water pipes 630. Two or more tertiary water pipes 640 can receive water from each of one or more secondary water pipe 630. For example, a first tertiary water pipe 640 can extend towards a front of the growth tray 660 and a second tertiary water pipe 640 can extend towards a rear of the growth tray 660. Water valves may control the flow of water between the secondary water pipes 630 and the tertiary water pipes 640. For example, the water valves may reduce or eliminate the flow of water to a given tertiary water pipe 640 (e.g., towards a rear of the growth tray) while permitting water to flow into a different tertiary water pipe 640 (e.g., towards a front of the growth tray). Additionally or alternatively, the water valves of the secondary water pipes 630 may be configured to determine which of the one or more tertiary water pipes 640 receive water. The tertiary water pipes 640 may receive water through the secondary water outlets 634 of the secondary water pipes 630.

The tertiary water pipes 640 may be disposed generally horizontally, generally parallel to the ground, generally parallel to the secondary water pipes 630, and/or generally parallel to one or more aquaculture growth trays 660. The tertiary water pipes 640 may include one or more water valves 632 that can be configured to control the flow of water into the one or more aquaculture trays 660. For example, the water valves 632 may reduce or eliminate the flow of water to a given aquaculture tray 660 or section of aquaculture tray. For example, as shown in FIG. 15A, each aquaculture tray 660 may include at least six water valves 632 per water delivery subsystem 602 (e.g., per long side of an aquaculture tray 660). Each water outlet 644 can have an associated water valve 632, so that the various water outlets 644 can be selectively opened and closed in any desired combination. This may allow for broad flexibility in where the water is received in the aquaculture tray 660. The water valves 632 of may be configured to determine which section(s) of an aquaculture tray 660 or which aquaculture trays 660 altogether receive water. Water from the tertiary water pipes 640 may be transferred to the growth trays 660 through one or more water outlets 644. The one or more secondary water outlets 634 within a water delivery subsystem 602 may be oriented in the same or similar direction. This may promote a uniform flow of water along a side of a given aquaculture tray 660. As shown in FIG. 15A, each of the water outlets 644 can be oriented in the same direction. However, other configurations are possible. For example, alternating aquaculture trays 660 may include tertiary water pipes 640 with water outlets 644 alternating for each aquaculture tray 660. This is further described below for FIG. 15C. In some embodiments, multiple quaternary water pipes 642 can branch of each of the tertiary water pipes 640. In some embodiments, the water outlet 644 can be movable so that a user can select a direction of flow for the water output into the growth tray 660.

As the water pipes branch, the size of the pipes can decrease. For example, the size (e.g., diameter) of the secondary water pipes 630 can be smaller than the size (e.g., diameter) of the primary water pipe(s) 620. The size (e.g., diameter) of the tertiary water pipes 640 can be smaller than the size (e.g., diameter) of the secondary water pipes 630. The size (e.g., diameter) of the quaternary water pipes 642 can be smaller than the size (e.g., diameter) of the tertiary water pipes 640. By way of one non-limiting example, the primary water pipe 620 can have a diameter of 2.5 inches, the secondary water pipe 630 can have a diameter of 1.5 inches, the tertiary water pipe 640 can have a diameter of 1.25 inches, and the quaternary water pipe 642 can have a diameter of 0.75 inches.

Figure 15B:
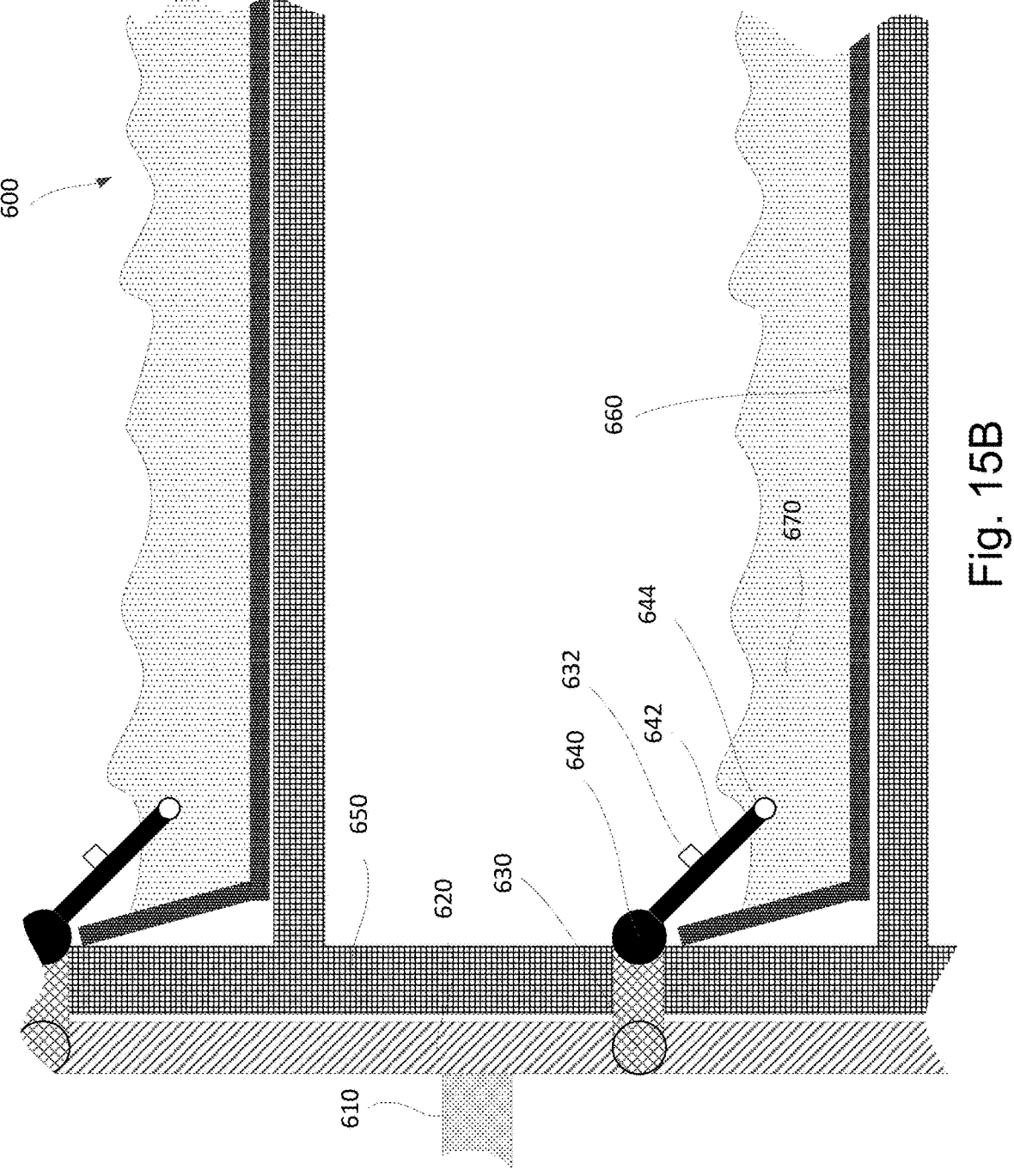
Figure 15C:
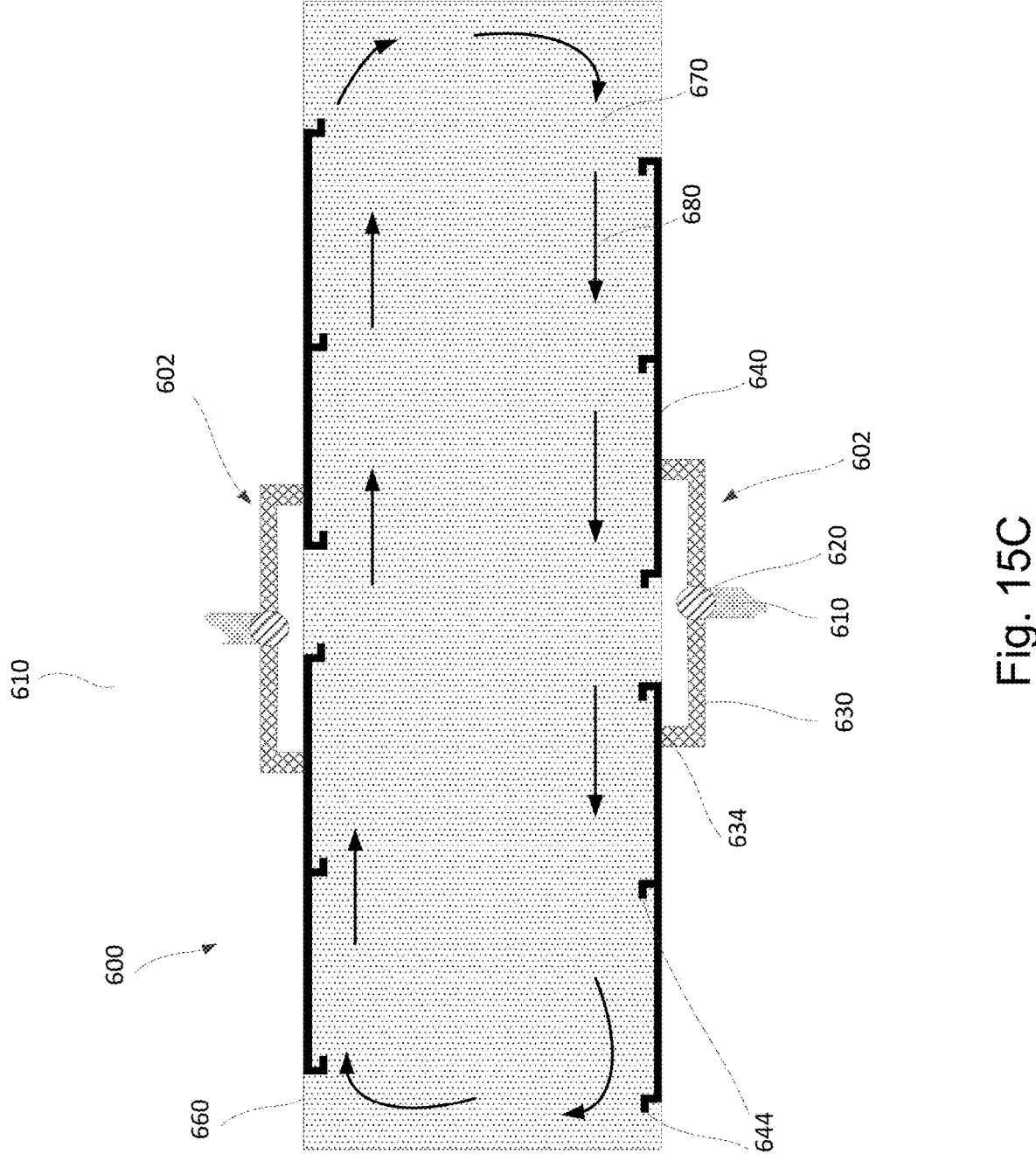

FIG. 15B schematically shows part of one embodiment of an aquaculture water delivery system 600 from a perspective perpendicular to that of FIG. 15A. As shown, the one or more primary water inlet(s) 610 may pass water to the one or more primary water pipes 620. The one or more primary water pipes 620 may pass water to the secondary water pipes 630. Water can pass from the one or more secondary water pipes 630 to one or more tertiary water pipes 640. Corresponding tertiary water valves 632 may allow water to pass through corresponding quaternary water pipes 642 and/or water outlets 644 into one or more aquaculture growth trays 660, which may collect the aquaculture tray water 670 for use in growing and/or harvesting aquatic animals. The one or more aquaculture trays 660 may be supported by an aquaculture tray support structure 650.

The water outlets 644 may be disposed within the aquaculture tray water 670 (as shown in FIG. 15B) or the secondary water outlets 634 may be above the level of the aquaculture tray water 670. In some designs, the water outlets 644 may be configured to produce a flow of water around the aquaculture tray 660 (e.g., circular flow). Such a flow may support the mixing of water throughout various parts of the tray. This may allow for more uniform values (e.g., temperature, salinity, pH) of the tray throughout the tray. Moreover, the mixing may promote movement of the aquatic animals, which may further promote improved growth of the animals. As shown in FIG. 15C, the water outlets on one side of the aquaculture tray 660 can point in the same general direction (e.g., towards a front of the aquaculture tray 660), while water outlets on the other side of the aquaculture tray 660 can point in a generally opposite direction (e.g., towards a rear of the aquaculture tray 660).

This can produce a circular flow of water in the aquaculture tray 660 (e.g., clockwise flow in FIG. 15C, although counter-clockwise flow can also be produced). In some embodiments, only one water distribution subsystem 602 is used on only one side of the aquaculture tray 660. For example, the pipes and outlets, etc. on the top of FIG. 15C can be omitted. The water flow from the water outlets 644 on one side of the aquaculture tray 660 can produce the circular flow of water (e.g., similar to the flow show in FIG. 15C).

FIG. 15C schematically shows a top view of an example aquaculture water delivery system 600. An aquaculture water delivery system 600 may include a plurality of delivery subsystems 602, as shown in FIG. 15C. The one or more water outlets 644 may be oriented to produce a desired flow of the aquaculture tray water 670. For example, as shown in FIG. 15C by the water flow arrows 680, the water outlets 644 may be configured to produce a clockwise flow within the aquaculture tray 660 (as viewed from the top). Other configurations are also possible (e.g., producing a clockwise flow, producing multiple circular flows, producing turbulent flow).

In some embodiments, the shrimp at different stages of growth can use water having different parameters. For example, shrimp in stage 1 (e.g., in tray 1) can use first water parameters, while shrimp in stage 2 (e.g., in trays 2-3) can use second water parameters, while shrimp in stage 3 (e.g., in trays 4-7) can use third water parameters. Different water subsystems 602 can be used to deliver water to the different groups of trays for the different stages. In some embodiments, different water treatment subsystems can be used to produce water having the different parameters (e.g., different temperature, oxygen content, chlorine levels, salinity, pH, ammonia content, etc.). In some embodiments, a single water treatment system can be used, and the water can be delivered to the different groups of trays in series. For example, valves can be actuated so that water is delivered to only stage 1 (e.g., tray 1) for a first time, and the water treatment system can be configured to output water having the first water parameters during the first time. Then the valves can be actuated so that water is delivered to only stage 2 (e.g., trays 2-3) during a second time, and the water treatment system can be configured to output water having the second water parameters during the second time. Then the valves can be actuated so that water is delivered to only stage 3 (e.g., trays 4-7) during a third time, and the water treatment system can be configured to output water having the third water parameters during the third time. The cycle can then repeat.

Figure 16A:
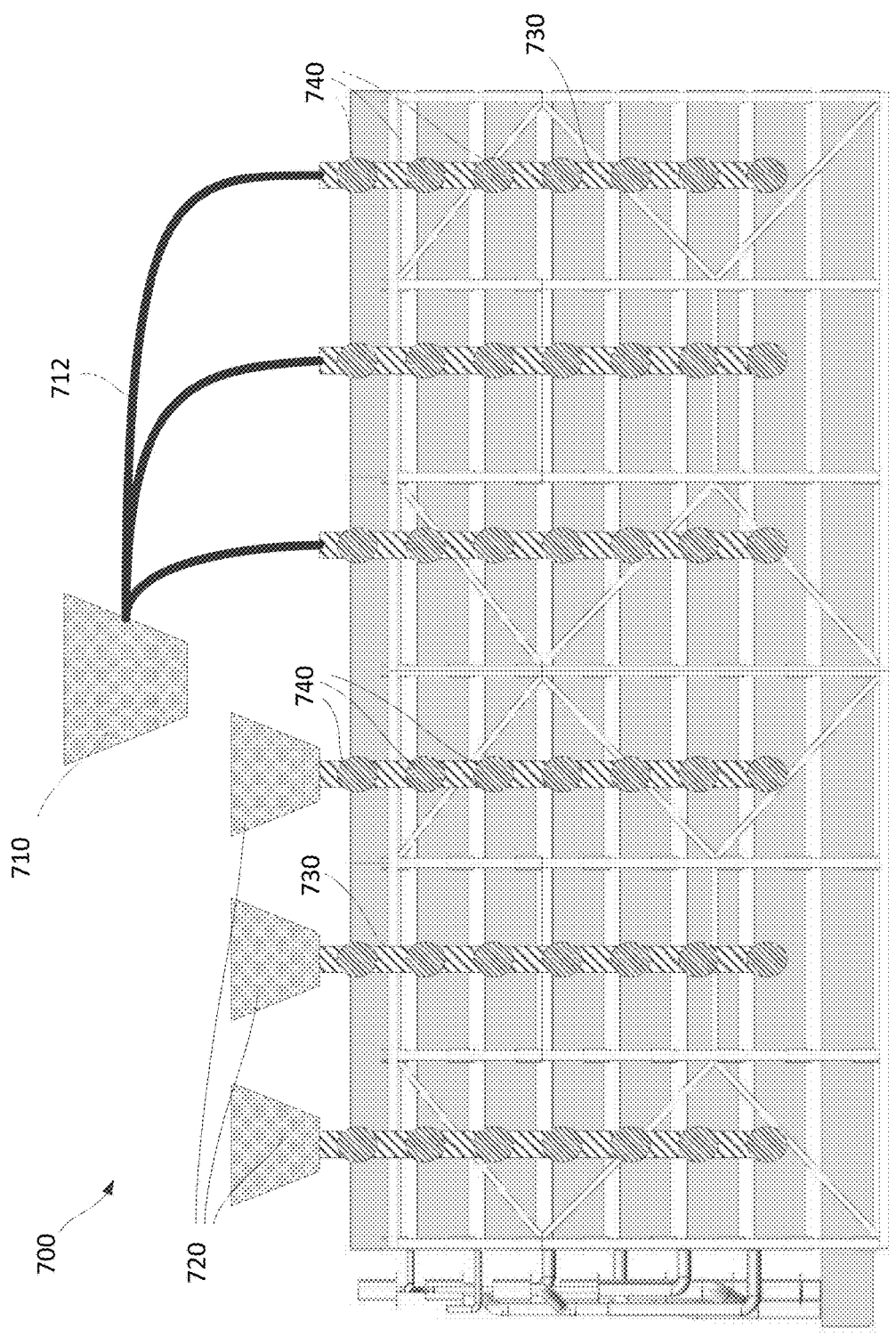
FIGS. 16A-B show example embodiments of a feed system.
Figure 16B:
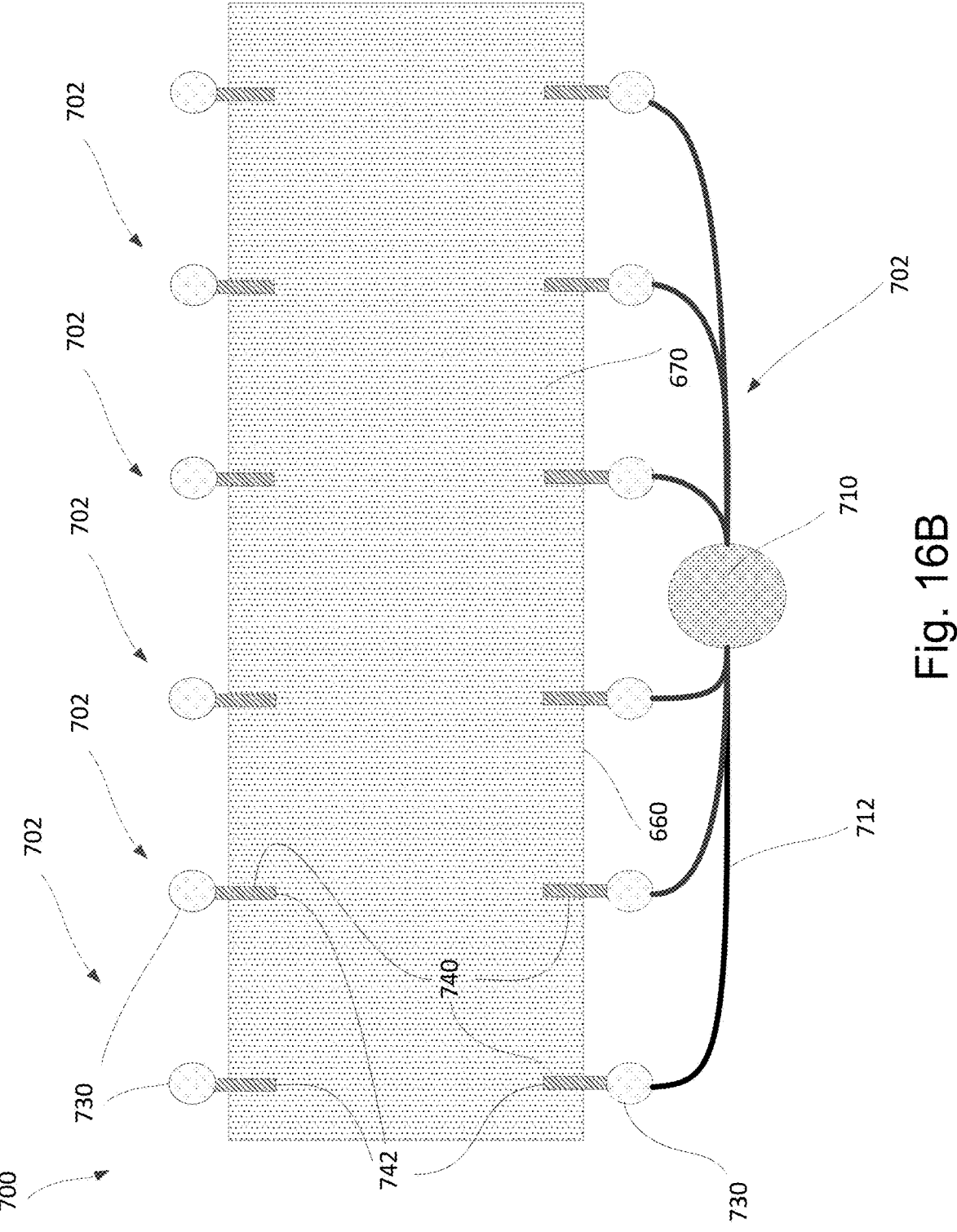

FIGS. 16A-16B show various views of an example aquaculture feed delivery system 700 that may be used, for example, in conjunction with an aquaculture growth system 100. FIG. 16A schematically shows a side view of an aquaculture feed delivery system 700. FIG. 16B schematically shows a top view of a feed delivery system 700, where the view shows a single growth tray in the system. An aquaculture feed delivery system 700 may include one or more feed delivery subsystems 702. Each feed delivery subsystem 702 may include one or more feed supply containers 710 or 720 and one or more feed supply delivery channels 730. In some embodiments, a single feed supply container 720 can supply a single feed supply channel 730 (e.g., as shown for the left side of FIG. 16A). In some embodiments, a single feed supply container 710 can supply multiple feed supply channels 730 (e.g., as shown on the right side of FIG. 16A). The one or more primary feed supply containers 710 or 720 may contain one or more different feeds suitable for aquatic animals (e.g., shrimp) of different stages or they can contain the same type of feed in multiple different feed supply containers. In some designs, the one or more primary feed supply containers 710 may contain a plurality of feed types. For example, a plurality of feed types may be used for animals at different stages of growth and/or for different animals within the aquaculture growth system 100. The one or more feeds may be solid (e.g., particulate) feed. Liquid feed may also be used.

The one or more feed supply containers 710 may pass feed to one or more feed supply channels 730 via feed distribution channels 712. The distribution channels 712 may be configured to pass the feed using gravity. In some designs, the feed distribution channels 712 include one or more valves configured to control the flow of feed that enters the feed supply channels 730. A valve may slow the flow or completely eliminate the flow of feed between a feed supply container 710 and one or more feed supply channels 730. The feed distributors 712 may include a conveyor. The conveyor may include an auger or other mechanical delivery means. In some cases, one auger or other conveyor can push the feed through multiple or all of the feed channels. Additionally or alternatively, the feed may be delivered using air pressure.

The different feed supply containers 720 may contain a single feed type or multiple different feed types, depending on the configuration of the aquaculture growth system 100. The feed supply containers 720 may contain an outlet to pass feed to corresponding feed supply delivery channels 730. In some designs, the feed supply delivery channels 730 receive the feed from the feed supply containers 710 or 720 by a gravity feed, but other designs are also possible. The feed supply delivery channels 730 may be spaced from one another along a length of one or more aquaculture trays 660. This may promote more uniform dispersion of the feed(s) into the aquaculture trays 660. In some designs, the aquaculture feed delivery system 700 can be configured to deliver different types of feed to different portions of an aquaculture tray 660 and/or to different aquaculture trays 660. The feed supply delivery channels 730 may be metal or plastic pipes. The aquaculture trays 660 may be the aquaculture growth trays 270 described herein. In some cases, only one feed supply delivery channel 730 is used (as opposed to the 6 shown in FIG. 16A). The one or more feed supply delivery channels 730 can be positioned generally vertically and each can distribute food to one or more growth trays in the system. In some embodiments, each feed supply delivery channels 730 can supply feed to each of the growth trays (e.g., as shown in FIG. 16A). In some embodiments, feed supply delivery channels 730 can supply feed to some growth trays, but not others. And those other growth trays can be supplied with food of a different type via one or more different feed supply delivery channels 730.

The feed supply delivery channels 730 may be configured to deliver feed to one or more feed dispensers 740. The feed dispensers 740 can be configured to deliver feed to one or more aquaculture trays 660. The feed may be adapted for consumption by one or more species and/or age of aquatic animal. Each feed dispenser 740 may be spaced from one another vertically along a given feed supply delivery channels 730. A feed delivery subsystem 702 may include one feed dispenser 740 per aquaculture growth tray 660 per feed supply delivery channel 730, as shown in FIG. 16A. In some designs, a feed dispenser 740 does not deliver feed to a lowest tray (e.g., a waste receptacle), which is not used as a growth tray in some embodiments. In some embodiments, one or more of the feed supply deliver channels can have a feed dispenser 740 for one or more growth trays but not for one or more other growth trays, such as to delivery specific feed types to specific stages of animals.

FIG. 16B schematically shows a top view of an example aquaculture feed delivery system 700. As shown, the aquaculture feed delivery system 700 may include two or more feed delivery subsystems 702. The feed dispensers 740 may deliver feed horizontally (e.g., parallel to the ground) into an aquaculture growth tray 660. The feed distributer 740 may include an auger or other mechanism for driving feed therethrough. The mechanism may be configured to alter a speed at which the feed is delivered into the aquaculture tray 660. The feed distributer 740 may include pores through which feed may be gravity fed into the corresponding aquaculture tray 660. The pores may be configured to produce an approximately equal feed delivery along a longitudinal portion of the feed distributer 740. In some embodiments, the feed distributer(s) 740 can be positioned to deposit food near the water flow outlets 644, which can result in the water flow facilitating distribution of the feed in the growth tray.

An example method of operating an aquaculture system is described herein. During operation, the aquaculture system can have animals of different stages (e.g., different ages or sizes) in different groups of growth trays. For example, a first stage of animals can be in a first area of a first growth tray, and a second stage of animals can be in a second area of the first growth tray. A third stage of animals can be in the second and third growth trays, and a fourth stage of animals can be in the fourth to seventh growth trays. Other tray configurations are possible, as described herein. The aquaculture system can operate for a growth period of time (e.g., 1 week, 2 weeks, 3 weeks, 4 weeks, 6 weeks, 7 weeks, 8 weeks, or any values or ranges therebetween).

During operation, water can circulate from a water treatment system to the growth trays, to a waste tray, and back to the water treatment system. Water can be distributed to the growth trays, as described herein. Water outlets can produce a circulating flow of water in the growth trays. In the first tray, water can be input into one or both of the first area and the second area, and water can transfer between the first area and the second area (e.g., through a divider that is configured to impede transfer of the animals between the first area and the second area). The water input into the growth trays can have oxygen or air content that is higher than the solubility of oxygen or air in water at ambient pressure. The water can be pressurized before it is input into the growth trays. When introduced to the growth trays and ambient pressure, the oxygen or air can be released from the water (e.g., to produce bubbles, such as micro-bubbles or a fog) in the water.

As treated water is added to the growth tray, the water level can rise so that water can also exit the growth tray via the outlet. An outlet valve can be configured to permit water to exit the growth tray while impeding the animals from exiting the growth tray. The drain valve can have an opening at a height that defines the water height in the tray. The drain valve can regulate the water level and rate of water output. As the rate that water is input into the growth tray increases, more water will rise above the opening in the drain valve and will exit via the outlet. Each of the growth trays can have an outlet (e.g., having a drain valve). The water output from the growth trays can be directed (e.g., via one or more pipes) to a waste container, such as a tray positioned below the growth trays. Water can be pumped from the waste container to the water treatment system, which can filter, oxygenate, nitrify, sanitize, temperature regulate, and/or pH regulate the water, as discussed herein. In some cases, one or more filters may need to be backflushed during operation, depending on the status of the filters. The treated water can then be delivered back to the growth trays, as discussed herein.

Water from various locations can be tested periodically during the growth period, as described herein. For example, the system can rotate between testing water from each of the growth trays, water from the water container, and/or water from one or more locations in the water treatment system (e.g., before or after filtering, before or after oxygenation, before or after nitrification, before or after chlorination, before or after dechlorination, before or after temperature regulation, and/or before or after pH regulation). In some cases can be pulled (e.g., by gravity or a pump) from a location to flush the old water out of the measurement system (e.g., to the water container) for a time (e.g., five minutes) and then one or more measurements can taken from the water taken from the location. This can then be repeated for the next location, and the next. The system can rotate through measuring water from the designated locations, and can then start again so that each location is periodically tested. The system can log the measurements and can trigger an alert if a problem is identified.

Food can be dispensed to the growth trays during the growth period, as discussed herein. One or more augers can run continuously or periodically to distribute food into the growth trays. The water flow (e.g., from water outlets pumping water into the growth trays) can facilitate distribution of the feed. A sweeper can operate during the growth period (e.g., periodically or continuously). For example, the sweeper can move back and forth along the growth tray. In some cases it can move at a first relatively slow speed during the growth period. The sweeper can help mix the water, can help distribute feed, can help prevent particulate matter (e.g., waste) from sticking to the sides or bottom of the growth tray, and can encourage the animals to move about the growth tray. The sweeping member can be submerged in water, or can otherwise permit the animals to swim or maneuver around the sweeping member as it moves along the growth tray during the growth period.

After the growth period, the animals from the fourth stage (e.g., trays 4-7) can be harvested. The trays can be harvested at the same time, or in series. One or more harvesting containers can be positioned below the pipes leading from the outlets of the trays. In some cases the one or more harvesting containers can be positioned in the waste container. To remove the animals from a growth tray, the drain valve can be transitioned from a closed position to an open position. In the closed position water can exit, but the animals are retained in the growth tray. In the open position water and the animals can exit the growth tray through the outlet. The drain valve can be slid upward so that water and animals can flow under the drain valve and through the outlet, through the one or more pipes and into the one or more harvesting containers. The harvesting containers have openings that let water pass through (e.g., into the waste container), while retaining the animals in the harvesting containers. For example, the harvesting container can be sieve. When one harvesting container is full, it can be slid out of the way and removed from the waste container. A new harvesting container can be positioned below the one or more pipes. In some cases, the drain valve(s) can be closed when changing the harvesting container. The sweeper can be used to facilitate moving the animals out of the tray. The sweeper can move towards the outlet at a second, relatively faster speed. As the water level drops, it can be harder for the animals to merely swim over or around the sweeper as it moves along the tray. The sweeper can push the animals along the growth tray towards the outlet.

In some embodiments, water can continue flowing into the growth tray while the animals are being transferred out the tray. In other embodiments, the flow of water for this tray, or for the whole system, can be stopped during the transferring of the animals. In some embodiments, the feed distribution system can be stopped during transferring of the animals. In other implementations, the feed distribution system can continue to distribute feed while the animals are being transferred.

After the trays of the fourth stage (e.g., trays 4-7) are harvested. The animals from the third stage (e.g., trays 2-3) can be moved into the trays of the fourth stage (e.g., trays 4-7). The animals from tray 2 can be subdivided between trays 4 and 5, and the animals from tray 3 can be subdivided between trays 6-7, although other tray configurations and orders can be used. To transfer the animals from a first tray to a second tray, the outlet can be decoupled from the pipe leading to the waste container and can be coupled to an inlet to the second tray. Water from the first tray that is draining out of the drain valve to the outlet can now be directed into the second tray. The drain valve can be opened, as discussed herein, and the water and animals can flow out of the first tray and into the second tray. A sweeper can facilitate transfer of the animals. When about half the animals have exited the first tray, the drain valve can be closed so that the remaining animals are contained in the first tray temporarily. The outlet of the first tray can then be decoupled from the inlet to the second tray and can be coupled to the inlet to a third tray. The drain valve can then be reopened and the water and remaining animals can be transferred into the third tray. After the transfer, the drain valve can be moved to the closed position. In some cases, the drain valve can remain open while changing the destination tray from the second tray to the third tray. This process can be used for each transfer between trays.

The animals in stage two (e.g., in the second area in the first tray) can be divided between the trays of stage three (e.g., trays 2-3), such as by using a transfer process similar to the transfer from stage three to stage four. Once the animals are removed from the second area of the first tray, the animals of stage one (e.g., in the first area of the first tray) can be moved into stage two (e.g., in the second area of the first tray). For example, a divider can be removed from between the first area and the second area. A collapsible weir can be collapsed to permit the animals to move over the collapsed weir.

The divider can be reinstated to separate the first area and the second area in the first tray. The first tray can be configured to prevent water or animals from passing between the first and second areas. For example, both first and second dividers can be used, as discussed herein. In some cases an intermediate area is between the first and second dividers. Water and new animals can be introduced into stage one (e.g., into the first area of the first tray). The water can be the water that the animals were grown in or received in.

During an acclimation period, the water and the animals of stage one can be isolated (e.g., in the first area of the first stage). The water of stage one can be gradually adjusted to be more like the water that is being circulated in one or all of the other stages. For example, water that is being circulated in one or all of the other stages can be added gradually to stage one. By way of a non-limiting example, small amounts of the circulating water can be added to stage one every one to six hours so that the volume of water in stage one can double over the course of three days. In some cases, the water can be added more often or continuously (e.g., at a slow rate set using a valve). During the acclimation period, the other stages can operate the same as the growth stage.

After the acclimation stage, the animals of stage one can be introduced into the water being circulated through some or all of the other stages. Tray one can be reconfigured so that water is permitted to flow between the first area and the second area. For example, a first divider can be removed (e.g., by collapsing a collapsible weir) so that the water and animals can expand into an intermediate area. However, a second divider can prevent the animals from passing between the first area and the second area. The second divider can allow water to pass between the first area and the second area. The water flow rate can be increased or turned on for area one, so that the circulating water can mix with and eventually flush out the old water that had been isolated in the first area. Eventually, the water in the first area is circulating through the system along with the rest of the water.

The process can then proceed with the rest of the growth period, as discussed herein, and the process can repeat. It will be understood that the process can be different when animals are first introduced into the system. For example, the process can start with stage 1, and progress through states 2, 3, and 4 similar to the discussion herein, except that there would not be any older or larger animals ahead of the animals that are first introduced into the system.

Figure 17A:
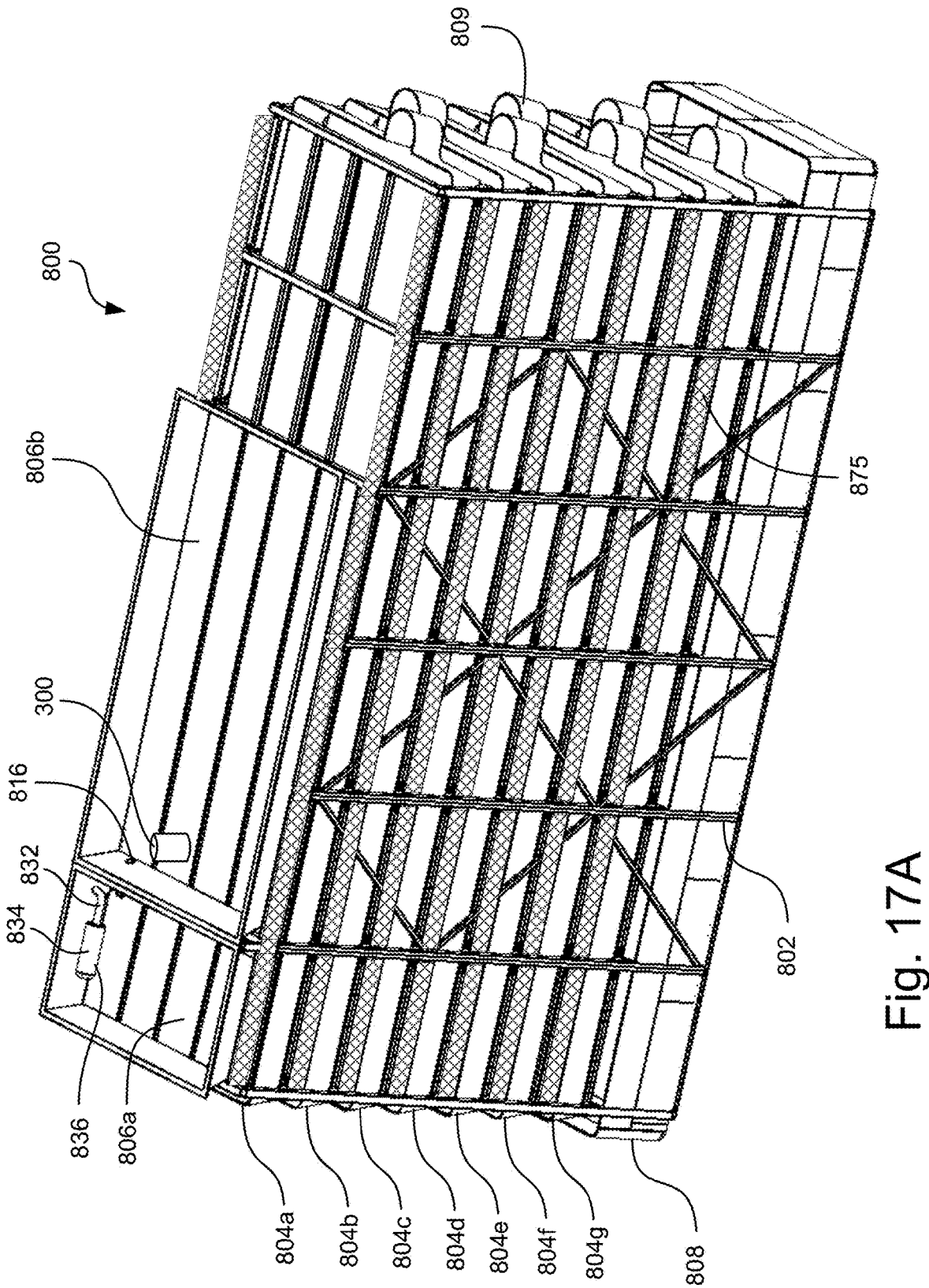
FIG. 17A is a perspective view of an example embodiment of an aquaculture system.
Figure 17B:
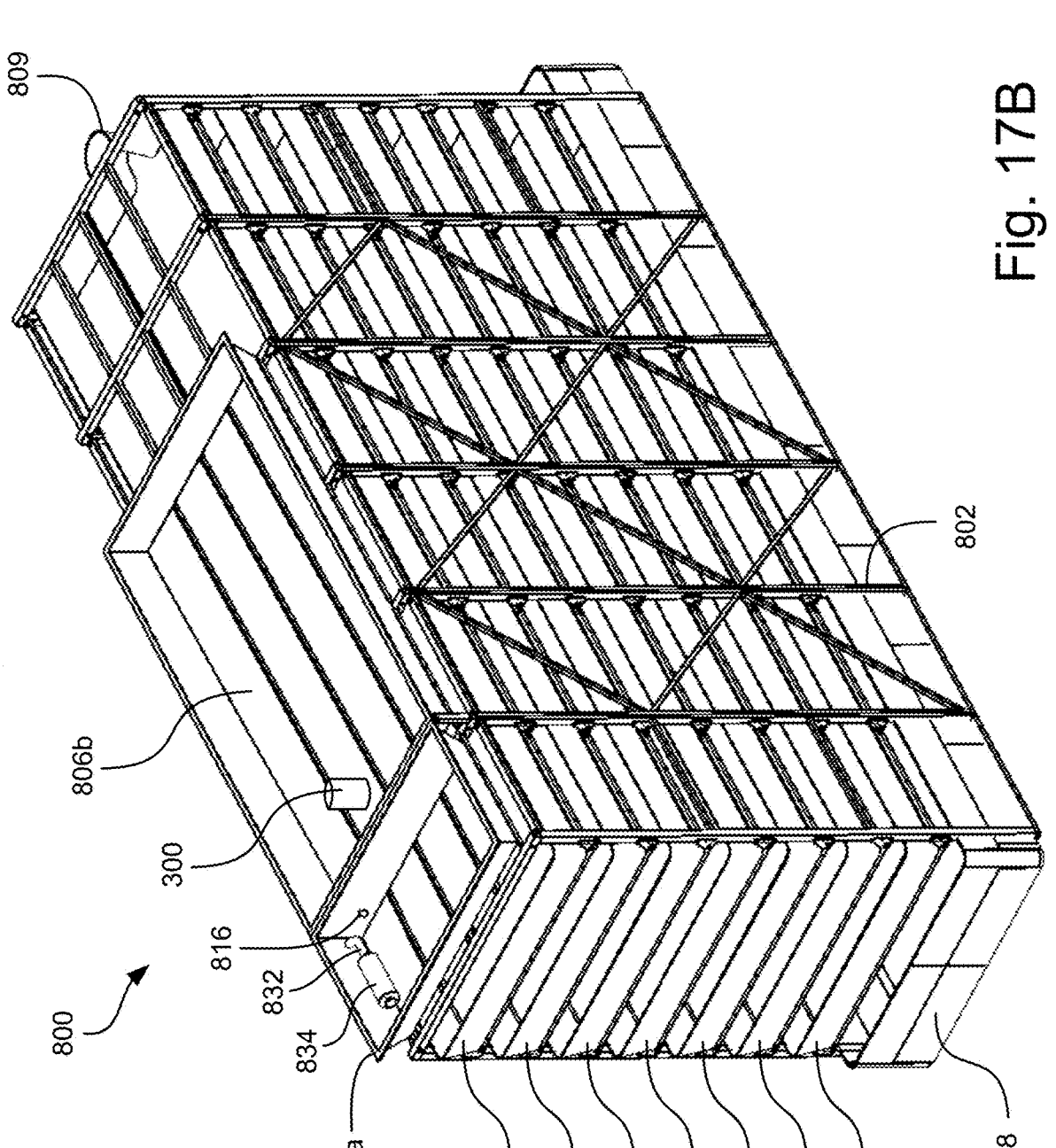
FIG. 17B is another perspective view of an example embodiment of an aquaculture system.

In some embodiments, one or more preliminary growth trays can be used before the animals (e.g., shrimp) are introduced into the main growth trays. The preliminary growth trays can add additional aquaculture growth stages to the process, and can increase the frequency of harvesting events. FIG. 17A is a perspective view of an example embodiment of an aquaculture system 800 that include two preliminary growth trays. FIG. 17B is another perspective view of the aquaculture system 800. The system 800 can include various features and details disclosed in connection with the other embodiments herein, and various details of the system 800 are omitted from view in FIGS. 17A and 17B.

The system 800 can include a support structure 802 and a plurality of main growth trays 804a-g. The system 800 can have seven main growth trays 804a-g, as illustrated, although any suitable number of main growth trays 804a-g can be used (e.g., 3 trays, 5 trays, 7 trays, 9 trays, 11 trays, or more, or any values therebetween). The system 800 can include a plurality of preliminary growth trays 806a-b. Two preliminary growth trays 806a-b are shown, although any suitable number of preliminary growth trays can be used (e.g., 1 tray, 2 trays, 3 trays, 4 trays, 5 trays, or more). The support structure 802 can support and position the main growth tray 804a-g in a stacked configuration, as discussed herein. The main growth trays 804a-g can have substantially the same size, such as substantially the same footprint, area, volume, depth, etc. The main growth trays 804a-g can vary in size by about 25% or less, about 20% or less, about 15% or less, about 10% or less, about 5% or less, about 3% or less, about 2% or less, about 1% or less, about 0%, or any values therebetween, or any ranged bounded by any of these values, although other values are also possible. In some cases, the main growth trays 804a-g can be identical to each other, except for the location of the outlets 809. By way of example, the outlets 809 for trays 804a, 804c, 804e, and 804g can substantially align vertically (e.g., along a first vertical path), and outlets 809 for trays 804b, 804d, and 804f can substantially align vertically (e.g., along a second vertical path). As discussed herein, the animals (e.g., shrimp) can be subdivided between the main growth trays 804a-g as the animals progress through the growth stages.

The support structure 802 can support and position the one or more preliminary growth trays 806a-b above the main growth trays 804a-g. The preliminary growth trays 806a-b can be positioned side-by-side, and/or on substantially the same level, as illustrated, although the preliminary growth trays 806a-b could be stacked (e.g., similar to the main growth trays 804a-g). The preliminary growth trays 806a-b can be smaller in size (e.g., footprint, area, volume, and/or depth) than the main growth trays 804a-g. A first preliminary growth tray 806a can have a first size, which can be smaller than a second size of the second preliminary growth tray 806b. The second preliminary growth tray 806b can have a size that is about 30%, about 35%, about 40%, about 45%, about 50%, about 55%, about 60%, about 65%, or about 70% of the size of a main growth tray 804a-g. The first preliminary growth tray 806a can have a size that is about 20%, about 25%, about 30%, about 35%, about 40%, about 45%, about 50%, about 55%, about 60%, about 65%, or about 70% of the size of the second preliminary growth tray 806b. In some cases, the preliminary growth trays 806a-b can have substantially the same height and/or width as a main growth tray 804a-g, and can have shorter lengths than the main growth tray 804a-g. The combined length of the preliminary growth trays 806a-b can be the same as or shorter than the length of a main growth tray 804a-g (e.g., about 90%, about 80%, about 70%, about 60%, about 50% thereof, or any values or ranges therebetween). The system 800 can have a waste water tray 808 (sometimes referred to as a drainage tray or container, soiled water receptacle, etc.), as discussed herein, which can be positioned below the main growth trays 804a-g.

Figure 18:
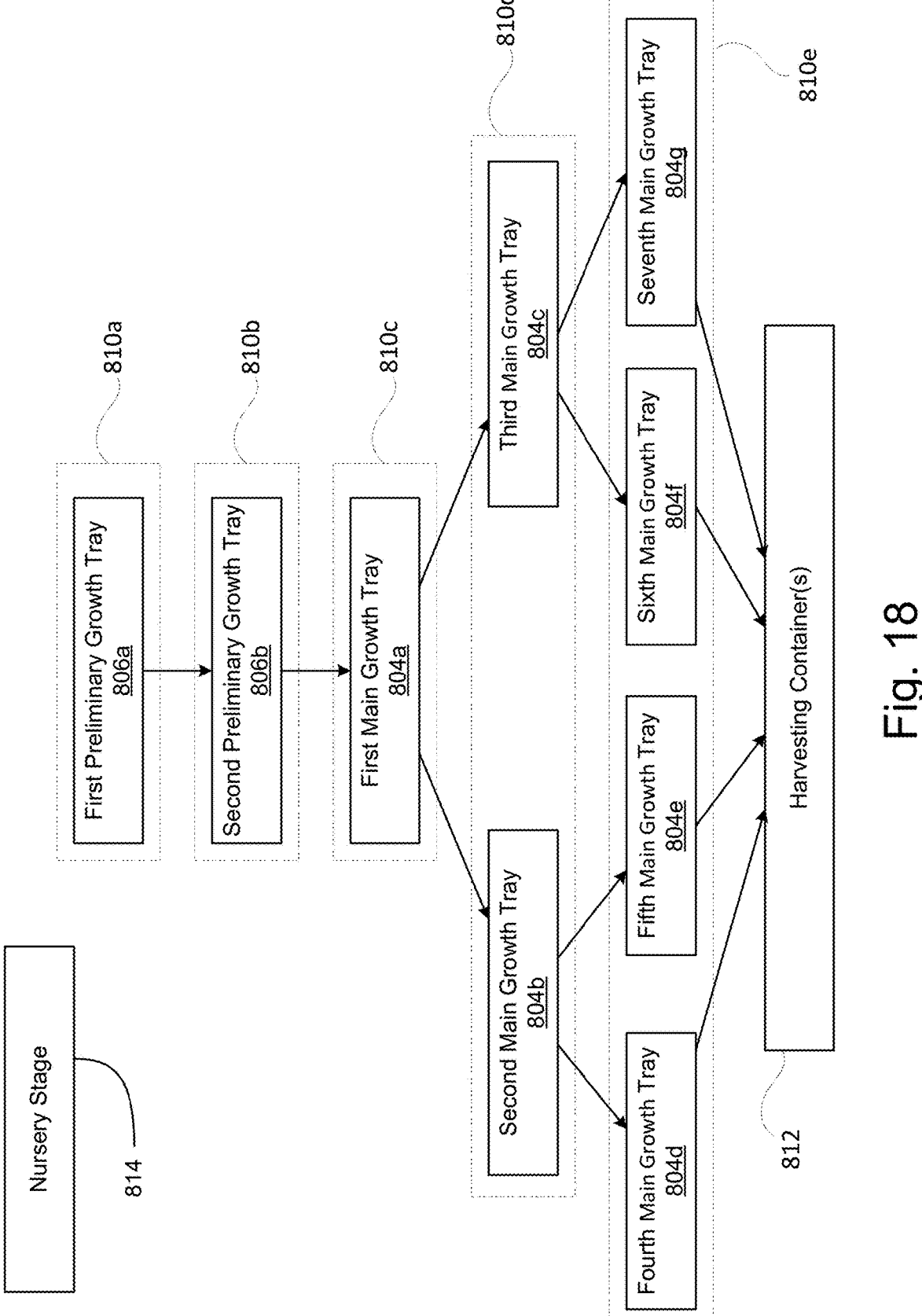
FIG. 18 is a flowchart of an example embodiment showing growth stages using an aquaculture system.

FIG. 18 is a flowchart of an example embodiment showing growth stages using an aquaculture system 800. As the animals grow, they can progress through different growth stages (e.g., at different locations, such as in different growth trays) in the system. The animals (e.g., shrimp) can be introduced into the first preliminary growth tray 806a, and can remain in the first preliminary growth 806a tray for first growth stage 810a. The animals can then be moved to the second preliminary growth tray 806b, and can remain there for a second growth stage 810b. The animals can then be moved to the first main growth tray 804a, and can remain there for a third growth stage 810c. The animals can then be divided between the second main growth tray 804b and the third main growth tray 804c, and can remain there for a fourth growth stage 810d. The animals can then be divided between the fourth to seventh growth trays 804d-g, and can remain there for a fifth growth stage 810e. The animals can then be harvested from the fourth to seventh growth trays 804d-g. For example, the animals can be moved to one or more harvesting containers 812. FIG. 18 is one example, and many different iterations of the main growth trays 804a-g can be used for the associated growth stages, for example as shown and discussed in connection with FIGS. 2A and 4.

Animals can progress through the growth stages 810a-e in parallel. For example, while one group of animals is growing in the third stage 810c (e.g., in the first main growth tray), another group of older animals can be growing in the fourth stage (e.g., in the second and third main growth trays 804b-c), etc. The groups of animals can be transitioned through the system as follows. At the end of the fifth growth stage 810e, the animals can be harvested (e.g., from trays 804d-g). The animals completing the fourth growth stage 810d (e.g., in trays 804b-c) can then be moved (e.g., to trays

804d-g). The animals completing the third growth stage 810c (e.g., in tray 804a) can then be moved (e.g., to trays 804b-c). The animals completing the second growth stage (e.g., in tray 806b) can then be moved (e.g., into tray 804a). The animals completing the first growth stage (e.g., in tray 806a) can then be moved (e.g., into tray 806b). New animals can then be introduced (e.g., into tray 806a). The next growth stages can then proceed, and the process can repeat after the next growth stages have completed.

The aquaculture system 800 may optionally include a nursery stage 814, which can occur before the first growth stage 810a. For example, the aquatic animals can progress through one or more stages of life before being introduced into the aquaculture system 800 (e.g., into the growth trays). During the nursery stage 814, shrimp can progress through one or more larval stages, and in some embodiments can become post-larval shrimp. Shrimp can be introduced to system (e.g., to tray 806a) as post-larval shrimp. The nursery stage 804 can occur in a separate container, e.g., not supported by the support structure 802. The animals can be acclimated to the system (e.g., to the water) during the nursery stage 814. In some embodiments, the animals can be acclimated to the system (e.g., to the water) during the first growth stage 810a (e.g., in tray 806a). The acclimation can be performed similar to the discussion herein, such as relating to FIGS. 13A-13E, except it can be performed in the tray 806a, and/or in the nursery stage 814.

In some embodiments, one or more additional preliminary grow trays can be used. For example, the embodiment illustrated in FIGS. 17A-B can be modified to include an additional preliminary growth tray, which can be smaller than the first preliminary growth tray 806a (e.g., and which could be used as the nursery stage). The additional growth tray could be positioned between the trays 806a and 806b, and can have a size that is between the sizes of the trays 806a and 806b. Accordingly, additional growth stages can be added by adding additional preliminary growth trays, and each consecutive preliminary growth tray can be larger than the prior tray. In some embodiments, two or more of the preliminary growth trays 806a-b can be portions of a single container that is subdivided to provide the plurality of growth trays. For example, a container can have one or more barriers similar to the disclosure relating to FIGS. 13A-13E, which can divide the container to provide a plurality of growth trays. When the animals are moved out of a preliminary growth tray, they can be moved into a larger tray. When the animals are moved out of a main growth tray, they can be divided between multiple trays.

Additional growth stages can provide more frequent harvesting events. For example, for a total growth time of 120 days, three growth stages (e.g., as shown in FIG. 2B) can provide for a harvesting event every 40 days. With five growth stages (e.g., as shown in FIG. 18), the same 120 days total growth time can result in harvesting events every 24 days.

Figures 19, 20:
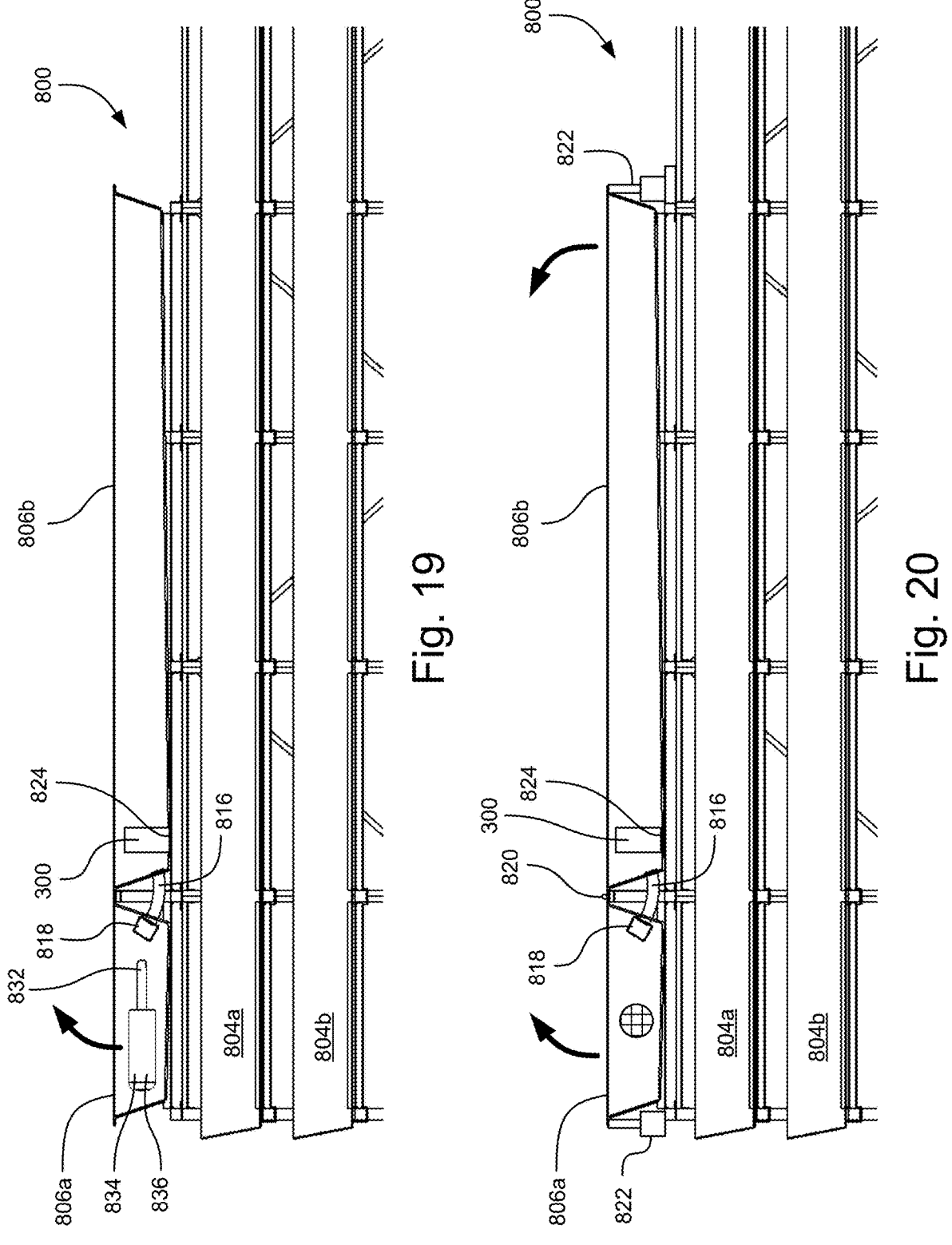
FIG. 19 is a partial cross-sectional view of an example embodiment of an aquaculture system.
FIG. 20 is a partial cross-sectional view of another example embodiment of an aquaculture system.

With reference to FIG. 19, a fluid pathway 816 can connect the first preliminary growth tray 806a and the second preliminary growth tray 806b, so that fluid and/or animals (e.g., shrimp) can be transferred from the first preliminary growth tray 806a to the second preliminary growth tray 806b. The fluid pathway 816 can include a tube, pipe, or channel, etc., and can be rigid or flexible, or have any other suitable configuration. The fluid pathway 816 can be selectively closed (e.g., to impede fluid and/or animals from passing therethrough) or opened (e.g., to permit fluid and/or animals from passing therethrough), such as using a valve 818. The valve can be position in the first preliminary growth tray 806*a* (as illustrated in FIG. 19), in the second preliminary growth tray 806*b*, or therebetween. The valve 818 can be manually transitioned between the open state and the closed state. Or an actuator can be used, to transition the valve 818 without manual input (e.g., automatically). During the growth stage, the valve 818 can be closed so that the animals can be retained in the first preliminary growth tray 806*a*, and a separate group of animals can be retained in the second preliminary growth tray 806*b*. When transitioning the animals between growth stages, the animals (e.g., an water) can be removed from the second preliminary growth tray 806*b* (e.g., moved to another tray). Then the valve 818 can be opened so that water and animals can travel from the first preliminary growth tray 806*a*, through the fluid pathway 818, to the second preliminary growth tray 806*b*.

The first preliminary growth tray 806*a* can be angled to facilitate transfer of fluid and/or animals out of the first preliminary growth tray 806*a*. For example, the bottom of the tray 806*a* can be lower at an end or area near the fluid pathway 816 than at an opposing end or different area that is not near the fluid pathway 816. Accordingly, the fluid and/or animals can be encouraged to flow through the fluid pathway 816 (e.g., when open) by the slope. In some embodiments, the tray 806*a* can have a height at one end (e.g., near the fluid pathway 818) that is taller than an opposing end, which can result in a slope (e.g., as shown in FIG. 19). In some embodiments, the tray 806*a* can be angled to produce the slope. For example the tray 806*a* can have a uniform height, and can be angled (e.g., one end raised) to produce the slope. The slope can be about 1 degree, about 2 degrees, about 3 degrees, about 4 degrees, about 5 degrees, about 7 degrees, about 10 degrees, or more, or any values or ranges therebetween, although other embodiments are possible. The outlet that leads from the first preliminary growth tray 806*a* to the fluid pathway 818 can be located on a side wall of the tray 806*a*, such as at or near the bottom of the tray 806*a*. The inlet that leads to the second preliminary growth tray 806*b* can be located on a side wall of the tray 806*b*, such as at or near the bottom thereof.

With reference to FIG. 20, in some embodiments, the first preliminary growth tray 806*a* can be movable between a neutral position and a tilted or raised position. The tray 806*a* can pivot, such as about a hinge 820. The system 800 can include an actuator 822, such as a stepper motor, hydraulic actuator, pneumatic actuator, etc., which can be configured to move the tray 806*a*. For example, the actuator 822 can lift one end of the tray 806*a* (e.g., the end opposite the hinge 820) to tilt the tray 806*a*. The actuator 822 can be responsive to user input received via a user interface (e.g., a button, switch, touchscreen, keyboard, etc.) to move the tray 806*a*. The tray 806*a* can be tilted by about 1 degree, about 2 degrees, about 3 degrees, about 4 degrees, about 5 degrees, about 7 degrees, about 10 degrees, 15 degrees, or more, or any values or ranges therebetween, although other values are possible. In some embodiments, the tray 806*a* can be tilted manually. The actuator 822 can be omitted. The end of the tray 806*a* can be lifted, such as after some of the contents of the tray 806*a* have already been removed. The user can tilt the tray 806*a* to facilitate the removal of the last of the animals and/or water.

The second preliminary growth tray 806*b* can have an outlet 824. The outlet 824 can include a valve 300 that can have features of any of the embodiments discussed in connection with FIGS. 12A to 121. The valve 300 can have a first state (e.g., FIG. 12A) that can permit fluid to circulate through the tray 806*b*, while impeding the animals from exiting through the outlet 824. The valve can have a second state (e.g., FIG. 12C) that can permit fluid and animals to exit through the outlet 824. The outlet 824 can lead to another growth tray 804*a*, which can be positioned below the second preliminary growth tray 806*b*. When the valve 300 is opened, the animals and water can be directed through the outlet 824 to the tray 804*a*, which can be substantially emptied of an older group of the animals as discussed herein. When the valve 300 is closed, the circulating water can exit the tray 806*b* through the valve 300 and outlet 324 and can be directed into the tray 804*a*. The water can mix with the other water in the tray 804*a*, and eventually that water can exit the tray 804*a* (e.g., via an outlet 809) and can be delivered to a water treatment system, as discussed herein. In some embodiments, circulating water can be transferred directly from one tray (e.g., 806*b*) to another tray (e.g., 804*a*) without being treated. At least some of the waste produced by the younger animals in (e.g., in tray 806*b*) can be consumed as food by the older animals (e.g., in tray 804*a*). In some embodiments, a valve (not shown) can be used to selectively direct water from the outlet 824 to the waste water tray 808, when the valve is in a first state, or to the other tray (e.g., 804*a*), when the valve is in a second state. When circulating water, the valve can be in the first state, and when transferring animals the valve can be in the second state. Water can be input into the tray 806*b* using water outlets similar to those discussed herein.

The second preliminary growth tray 806*b* can have a slope (e.g., as shown in FIG. 19). The discussion regarding slope for tray 806*a* can be applied to the tray 806*b*. The tray 806*b* can have a slope downward generally towards the outlet 824 and/or valve 300. With reference to FIG. 20, the second preliminary growth tray 806*b* can be movable (e.g. pivot) between a neutral position and a tilted or raised position, similar to the discussion relating to tray 806*a*. In some embodiments, a hinge 820 can be shared by the first preliminary growth tray 806*a* and the second preliminary growth tray 806*b*, although separate hinges could also be used. The trays 806*a* and 806*b* can be configured to tilt towards each other (e.g., as shown in FIG. 20). Other tilting directions can be used, such as depending on the locations of the outlet 824 and the fluid pathway 816.

Figure 21:
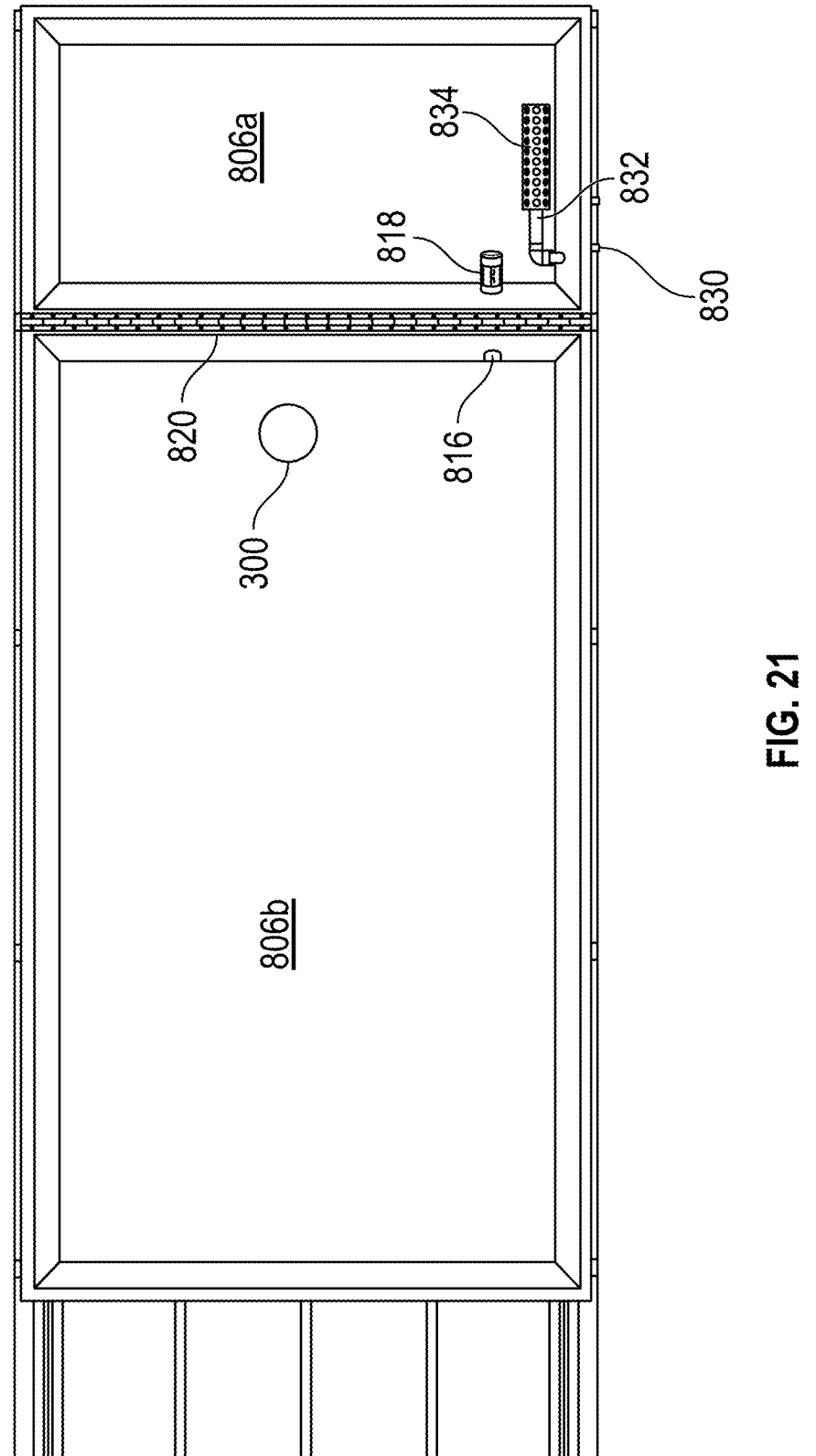
FIG. 21 is a partial top view of an example embodiment of an aquaculture system.

In some embodiments, water can be circulated through the first preliminary growth tray 806*a*. Water can be input into the tray 806*a*, such as using water outlets similar to those discussed herein. Water can be output from the tray 806*a*, such as using a water outlet system 830. The outlet system 830 can include a pipe 832 that extends through a hole in the tray 806*a* (e.g., through a sidewall). An intake portion 834 can permit water to flow into the pipe 832. The intake portion 834 can include holes in the pipe, an end of the pipe, etc. In some cases, the intake portion 834 can be wider than the pipe 832. The intake portion 834 can permit water to enter the pipe 832 or otherwise exit through the outlet system 830, while impeding the animals (e.g., shrimp) from entering the pipe 832 or otherwise exiting through the outlet system 830. In some embodiments, the intake portion 834 can include a lining 836, such as a metal mesh, a plastic mesh, a cloth screen, a screen of fibers, a netting, a grating, or any other suitable structure for impeding the animals from passing therethrough, while permitting water to pass therethrough. The lining 836 can include a filter sleeve, which can fit over a rigid portion of the intake portion 834 (e.g., a pipe with holes, or a support structure configured to support the filter sleeve). The lining 836 can be secured using a clamp or other fastener. In some embodiments, the holes in the intake portion 834 can be small enough to impede the animals from passing therethrough, and the lining 836 can be omitted. FIG. 21 shows the intake portion 834 without the liner 836. FIGS. 17A, 17B, and 19 show the intake portion 834 with the liner 836. The intake portion 834 can be movable between an engaged position, where the intake portion 834 can be in the water, and a disengaged position, where the intake portion 834 can be out of the water. The intake portion 834 can be lifted to the disengaged portion. For example, pipe 832 can include a rotating joint that enables the intake portion 834 to pivot upward to the disengaged position, as indicated by an arrow in FIG. 19. The pipe 832 can be generally L-shaped. The pipe 832 can have a bend to facilitate raising of the intake portion 834. Moving the intake portion 834 to the disengaged position can impede water from flowing out of the tray 806a. Moving the intake portion 834 to the disengaged position can enable a user to change the filter or lining 836 (e.g., without letting the animals exit the tray 806a).

Alternatively, with reference to FIG. 20, the tray 806a can include a filter or lining 836 that covers an outlet opening in the tray 806a (e.g., in a sidewall). The filter or lining 836 can permit water to flow through the outlet, and can impede the animals from passing through the outlet opening.

Figure 22:
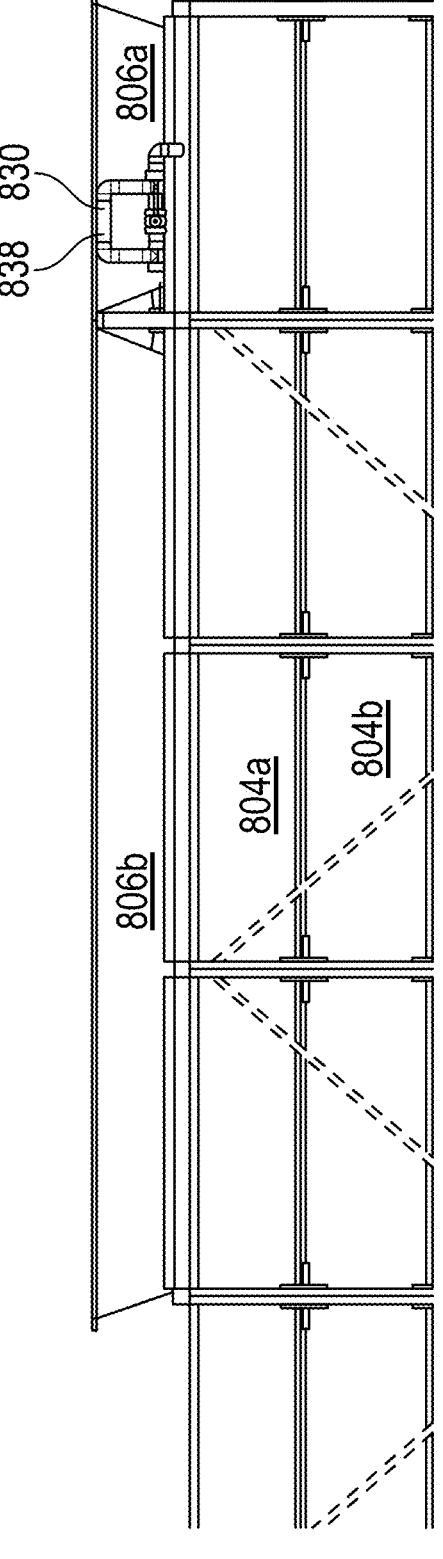
FIG. 22 is a partial side view of an example embodiment of an aquaculture system.
Figure 23:
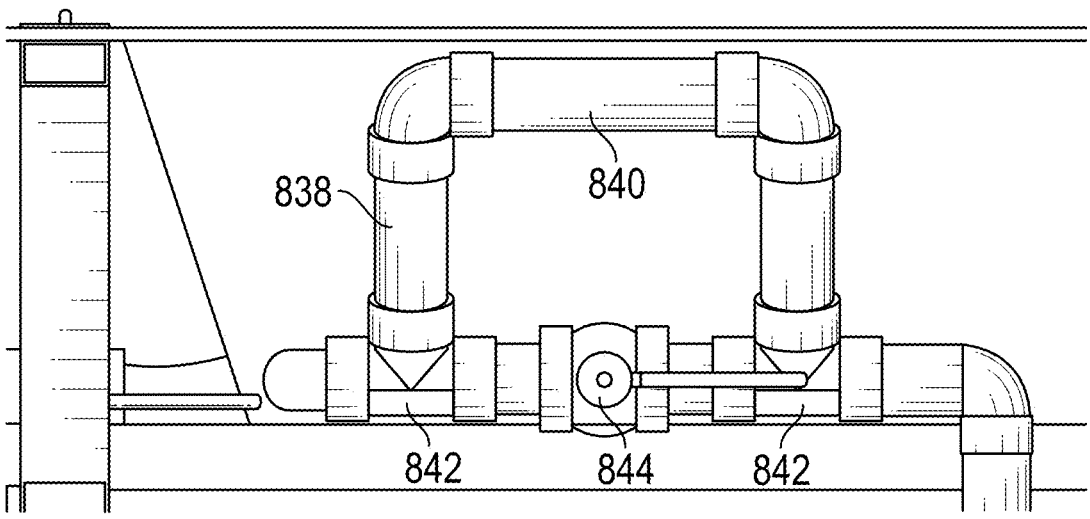
FIG. 23 shows an example embodiment of an outlet system having a water level controller.
Figure 24:
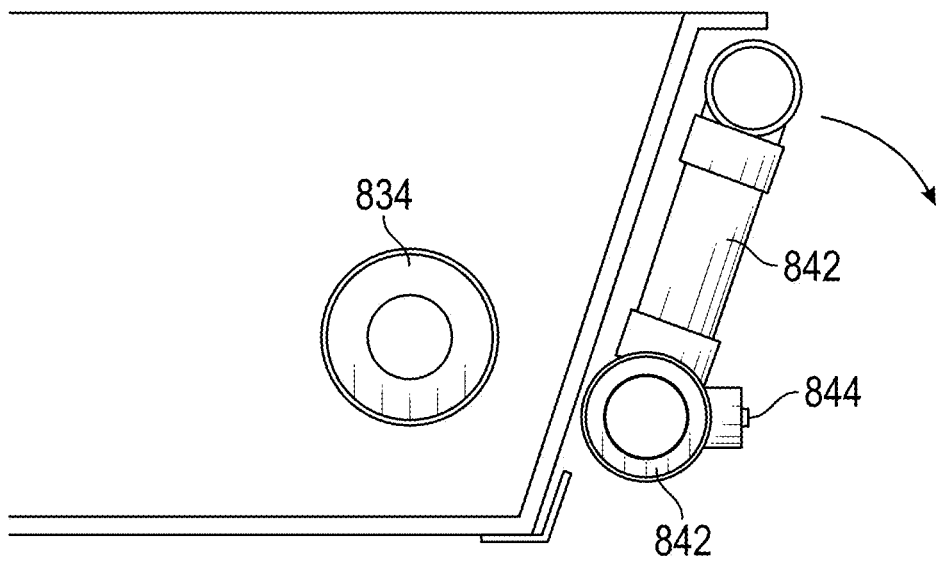
FIG. 24 is a cross-sectional view of an example embodiment of an outlet system having a water level controller.

The outlet system 830 can include a water level controller or adjuster 838. The water level controller 838. The water level controller 838 can be positioned outside (e.g., alongside) the tray 806a, as shown in FIG. 22. FIG. 23 is a detailed view of the water level controller 838. FIG. 24 is a cross-sectional view taken through the water outlet system 830, including the water level controller 838. The water level controller 838 can include a water exit pathway 840 that is movable to adjust the water level in the tray 806a. One or more pipes can provide a generally U-shaped water exit pathway 840. A horizontal portion or upper portion of the water exit pathway 840 can be positioned to set the water level. The water level controller 838 can include one or more rotating joints 842 that enable the water exit pathway 840 to pivot, as shown by the arrow in FIG. 24. When the movable water exit pathway 840 is raised (e.g., as shown in FIGS. 23 and 24), water can be impeded from draining through the exit pathway 840 until the water level rises to the raised position of the water exit pathway 840. When the movable water exit pathway 840 is lowered to a position that is below the water level in the corresponding tray 806a, the flow rate of water through the water exit pathway 840 can increase so that the water level in the tray 806a is lowered to the position of the movable water exit pathway 840. Water exiting the water height controller 830 and/or exiting the water outlet system 830 can be directed to the waste water tray 808, or can be directed to one of the other growth trays (e.g., to tray 804a). A valve 844 can open and close a bypass fluid pathway that can enable water to bypass the movable water exit pathway 840. The various other growth trays discussed herein can include a water outlet system 830 and/or water level controller 838, although not shown in the figures.

Figures 25, 26:
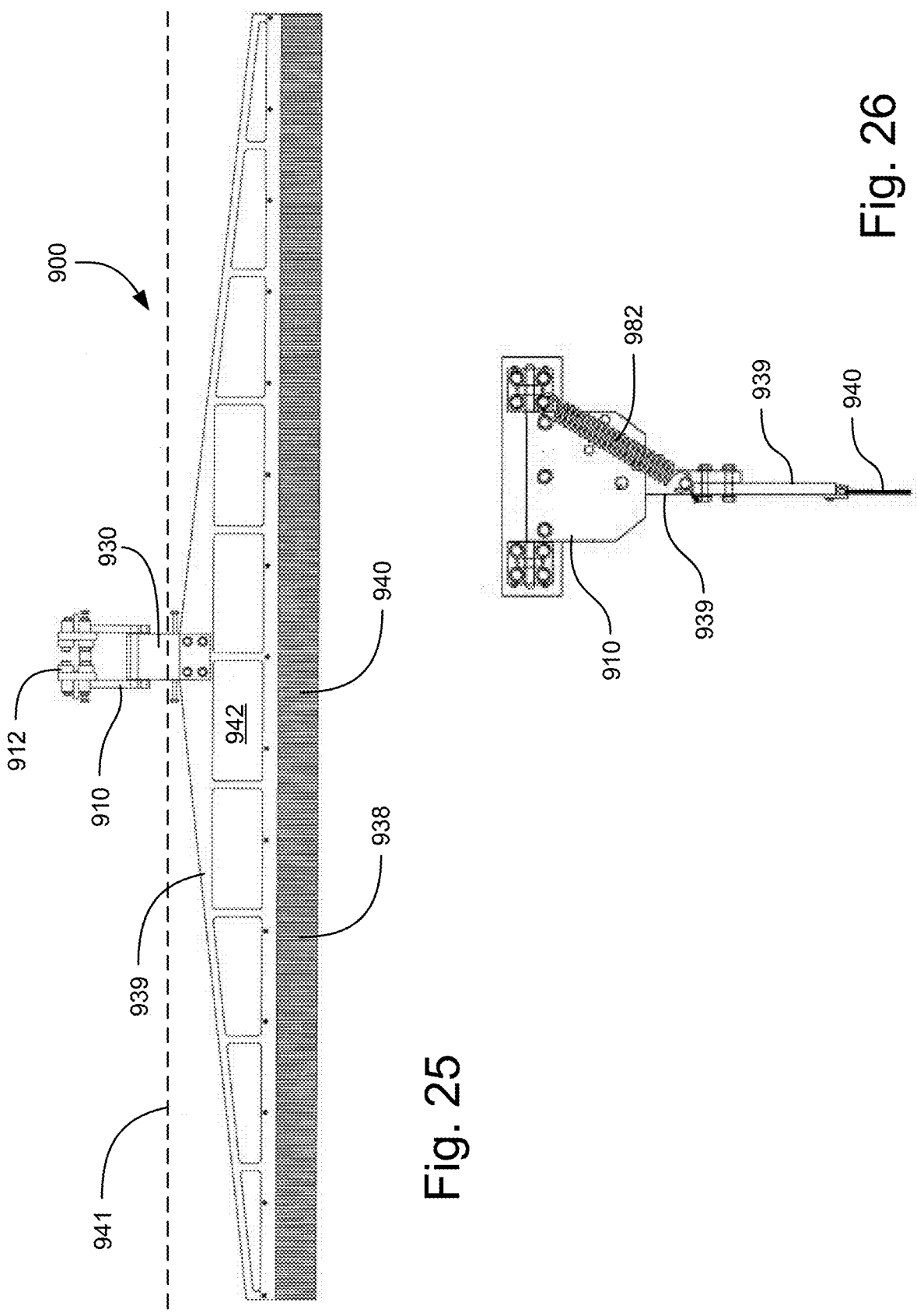
FIGS. 25-26 show an example embodiment of a sweeper system.

FIG. 25 is a front view of an example embodiment of a sweeper system 900. FIG. 26 is a side view of the example embodiments of a sweeper system 900. The sweeper system 900 can include features that are the same as, or similar to, the sweeper system 500 or other sweeper embodiments disclosed herein. For example, the sweeper system 900 can include a sweeper frame 910, one or more rollers 912, a sweeper arm 930, and a sweeping member 938, a resilient or biasing member 982, which can be similar to the corresponding components of the sweeper system 500. Other details and features described in connection with the sweeper system 500 can also apply to the sweeper system 900, even where not specifically described or labeled. The sweeping member 938 can include a support member 939 and one or more sweeping elements 940 (e.g., bristles or wipers). The support member 939 can include one or more openings 942, which can enable the animals (e.g., shrimp) to move from one side of the sweeping member 938 to the other. In FIG. 25 line 941 can indicate a water level in the growth tray. The sweeping member 938 can be sized, shaped, or otherwise configured to permit the animals to move around or through the sweeping member 938. For example, while the sweeping member 938 is moving along a growth tray (e.g., to clean the tray or mix water of food therein), the animals can swim around or through the sweeper member 938. The support member 939 can have a generally triangular shape, which can be configured to be submerged sufficiently so that the animals can swim or otherwise move over the side portions of the generally triangular shape. The openings 942 can be sufficiently large than an animal (e.g., shrimp) can pass therethrough. In some embodiments, the sweeper member 938 (e.g., the support member 939 and sweeping elements 940) can be submerged, below the water level (which can be defined by a valve 300, as discussed herein). The sweeper member 938 can be about 100%, about 90%, about 80%, about 709% submerged, or any values or ranges therebetween, although other configurations are possible.

Figures 27, 28:
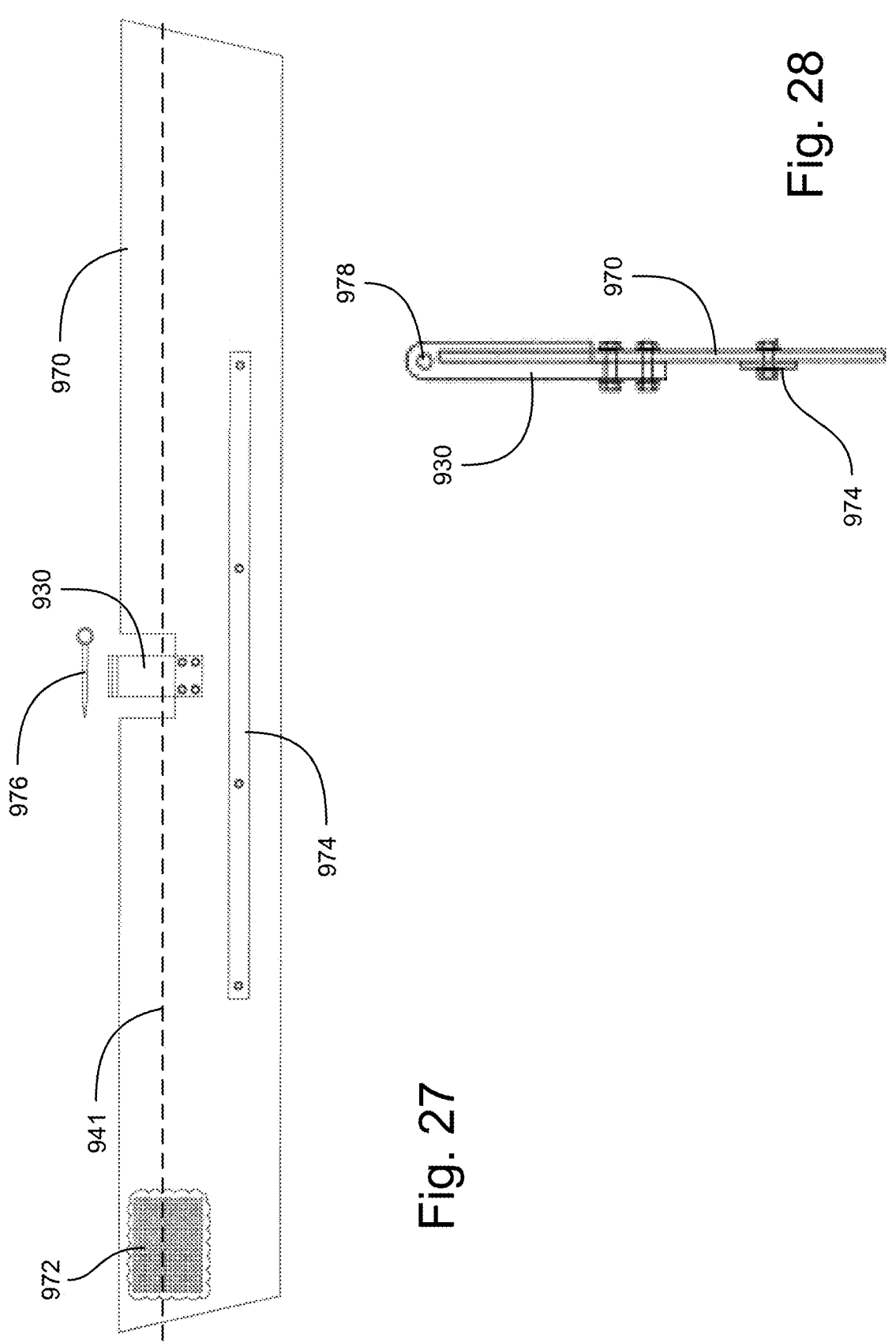
FIGS. 27-28 show an example embodiment of a crowder, which can be used with a sweeper system.

FIG. 27 is a front view of an example embodiment of a crowder 970. The crowder 970 can be used with the sweeper system 900 in the transfer mode, such as for pushing the animals towards an outlet of the growth tray. The crowder 970 can have a shape that generally corresponds to a cross-sectional shape of the growth tray. The crowder 970 can be taller than a height of the growth tray, and/or taller than a height of the water level 941. The crowder 970 can fill about 100%, about 95%, about 90%, about 85%, about 80%, or about 75% of the cross-sectional area of the growth tray below the water level 941, or any values or ranges therebetween, although other configurations are possible. The crowder 970 can have openings 972, which can be sized or otherwise configured to enable fluid to pass through the crowder 970 while impeding the animals from passing through the crowder 970. In FIG. 27, an example section is shown having the openings 972, and it will be understood that the openings 972 can extend across a larger area of the crowder 970 than depicted in FIG. 27. The openings 972 can extend across about 25%, about 50%, about 70%, about 80%, about 85%, about 90%, about 95%, about 98%, about 99% of the crowder 970, or any values or ranges therebetween, although other designs can be used. In some embodiments, the openings 972 can be omitted. Some or all of the crowder 970 can be configured to impede both the animals and the fluid from passing through the crowder 970. The crowder 970 can include a stiffener 974, which can be made of a material that is stiffer than the base material of the crowder 970. In some cases, the stiffener does not include openings, while other portions of the crowder 970 can contain openings 972. The stiffener 974 can be a generally horizontal bar, and can extend across about 20%, about 30%, about 40%, about 50%, about 60%, about 70%, about 80% of the width of the crowder 970, or any values or ranges therebetween, although other embodiments can be used. The stiffener 974 can encourage the crowder 970 to maintain its shape when moving through a growth tray.

The crowder 970 can attach to the sweeper frame 910. The crowder 970 and the sweeping member 938 can be interchangeable. The crowder 970 can be attached to a sweeper arm 930, which can be coupled to the sweeper frame 910 using a coupler, such as a pin 976. For example, a pin 976 can be used to selectively attached and detach the sweeping member 938 and the crowder 970. For example, for transfer mode, the pin can be disengaged and the sweeping member 938 can be removed, and the crowder 970 can then be attached by inserting the pin 976. The pin 976 can extend through a hole 978 in the coupler 970 or the sweeper arm 930 attached thereto, and the pin 976 can engage one or more holes on the sweeper frame 910 to couple the sweeper arm 930 to the sweeper frame 910. Various other types of couplers can be used, such as a clamp, snap-fit engagement, friction fit element, etc. In some embodiments, the crowder 970 can be configured to attach to the sweeping member 938 (e.g., for transfer operation), and the crowder 970 can be removed from the sweeping member 938 (e.g., for non-transfer operation).

Figure 29:
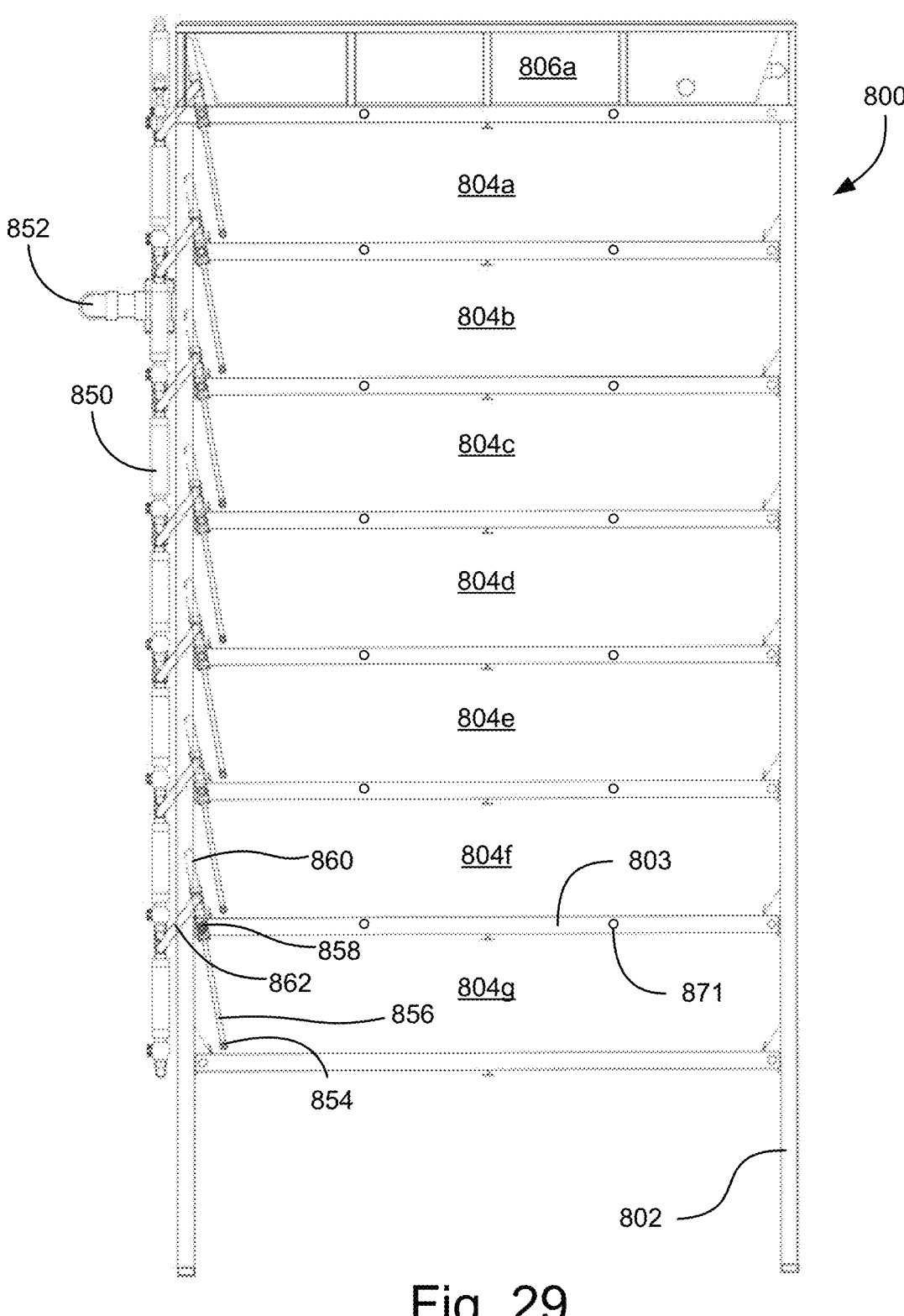
FIG. 29 is a cross-sectional view of an example embodiment of an aquaculture system.
Figure 31:
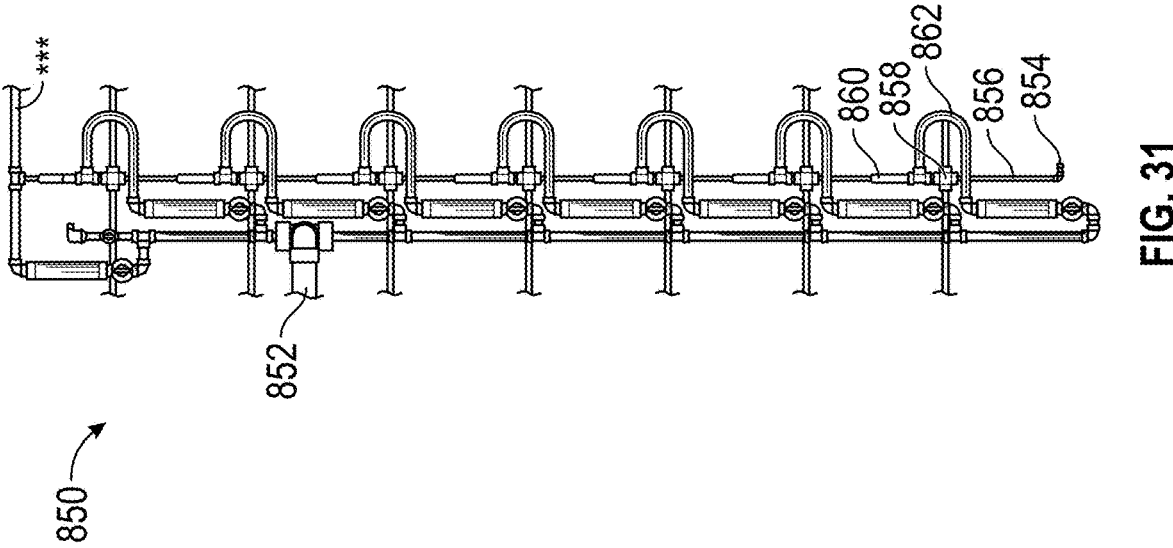
FIGS. 30-31 show an example embodiment of a water delivery system.
Figure 30:
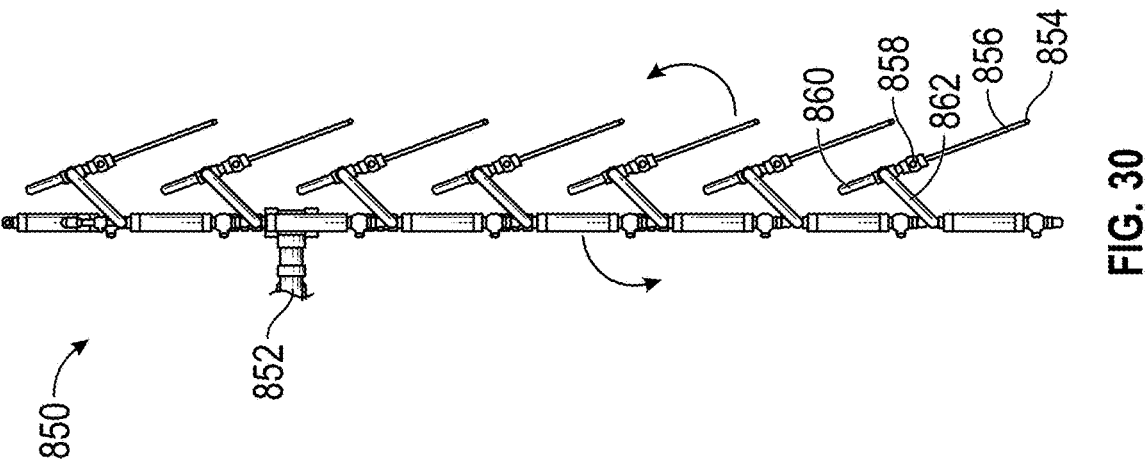

In some embodiments, the water outlets can be configured to move, such as to provide room for the crowder 970 during a transfer operation. FIG. 29 is a cross-sectional view of an example embodiment of an aquaculture system 800. The system 800 can include a water delivery system 850, which can include a primary water inlet 852, which can receive water from a water treatment system or other water source. FIG. 30 shows the water delivery system 850 without the growth trays. FIG. 31 shows another view of the water delivery system 850 from an angle orthogonal to the view of FIG. 30. The water delivery system 850 can have valves, conduits, branches, and/or junctions that deliver water to a plurality of water outlets 854 for outputting water into the growth trays. A pipe 856 can extend into the growth tray to position the water outlet 854 (e.g., under the water level in the growth tray). Water output from the water outlet 854 can encourage a current in the growth tray, as discussed herein. The pipe 856 can position the water outlet 854 at or near the bottom of the growth tray. The pipe 856 can be a rigid pipe. The pipe 856 and water outlet 854 can be configured to move (e.g., pivot) to raise the water outlet 854 and pipe 856. A handle 860 can be coupled to the pipe 856 so that pulling the handle 860 downward can cause the water outlet 854 and the pipe 856 to rise, as shown for example in FIG. 30. The water outlet 854, the pipe 856, and/or the handle 860 can pivot about a pivot axis 858, which can be implemented using a hinge, swivel fluid joint, or any other suitable pivoting mechanism. A flexible conduit 862 (e.g., tubing) can provide water to the pipe 856. The flexible conduit 862 can accommodate movement of the pipe 856. The pipe 856 and/or fluid outlet 854 can stay in place because of friction at the pivot axis, or because of a locking mechanism, etc. The pipes 856 and the water outlets 854 can be raised sufficiently to permit the crowder 970 to move along the growth tray without hitting the pipes 856 or water outlets 854.

A user can raise the water outlets 854, attach the crowder 970 to the sweeper system 900, can open the valve 300, and can operate the sweeper system 900 to move the crowder 970 from a first portion of the growth tray towards a second portion of the growth tray with the outlet. The crowder 970 can help push the animals out of the growth tray. In some cases, the user can turn off the water, such as using individual valves for the water outlets, or a single valve for multiple outlets or for the whole water delivery system. In some cases the user can remove the sweeper member 938 before attaching the crowder. After the transfer operation, the user can close the valve 300, remove the crowder 970 from the sweeper system 900, and lower the water outlets 854. In some cases, the user can attach the sweeper member 938. In some cases, the user can turn the water back on after the water outlets 854 have been lowered.

The aquaculture system 800 can include a lighting system, such as having one or more lights. FIG. 7 shows two lights 571 positioned above a growth tray 501a, although any suitable number of lights 571 can be used. The one or more lights 571 can direct light downward onto the growth tray 501a. The one or more lights 571 can be supported by one or more of the cross supports or beams 134 that support the growth tray 501b that is positioned above the growth tray 501a being illuminated. The one or more lights 571 can on an underside of the one or more cross beams 134. The one or more lights 571 can be suspended from one or more the cross beams 134. In some embodiments, a line with a plurality of lights 571 (e.g., a light rope) can extend along at least a portion of the length of the growth tray 501a (e.g., parallel to the sweeper track 560). The line of lights 571 can be supported by a plurality of the cross supports 134. The lights 571 can be coupled to the cross supports 134 using couplers, such as zip-ties, rope, clips, adhesive, or any other suitable mechanism.

With reference to FIG. 29, in some embodiments lights 871 can extend through the cross supports 803. The cross supports 803 can include holes, and a line of lights 871 (e.g., a light rope) can extend through the holes to suspend the lights 871 above the corresponding growth tray. In some embodiments, a clear support pipe can extend through the holes in the supports 803, and in some cases the holes in the supports 803 can be aligned along a linear path. The line of lights 871 can extend through the clear support pipe.

The lighting systems disclosed herein can be used to mimic day to night cycles. For example, the lights can be off or substantially dimmed to mimic night. The lights can be on or substantially bright to mimic day. The lights can gradually transition from off to on, or from dim to bright, to mimic dawn. The lights can gradually transition from on to off, or from bright to dim, to mimic dusk. The lights can be used to mimic the actually 24-hour day to night cycle, or the cycle can be accelerated. For example, the lights can be used to mimic one day to night cycle in about 0.5 hours, about 1 hour, about 1.5 hours, about 2 hours, about 3 hours, about 4 hours, about 5 hours, about 7 hours, about 10 hours, about 12 hours, about 15 hours, about 20 hours, about 24 hours, or more, or any values therebetween, or any ranged bounded by any of these values, although other embodiments are also possible. In some cases, the lighting system can be dark most of the time, such as for about 13 hours, about 14 hours, about 15 hours, about 16 hours, about 17 hours, about 18 hours, about 19 hours, about 20 hours, about 21 hours, or about 22 hours out of each day, or any values or ranges therebetween, although other lighting cycles could also be used. The lighting system can be dark for about 50%, about 55%, about 60%, about 65%, about 70%, about 75%, about 80%, about 85%, about 90% of the time, or any values therebetween, or any ranges bounded therein, although other lighting approaches can be used. The feeding system can be coordinated with the lighting system, such as synchronized with the day to night cycle implemented using the lights. For example, the amount or type of feed delivered to the growth tray can vary depending on whether the cycle is at the day stage, the night, stage, the dusk stage, the dawn state, or transitions therebetween. For example, additional feed can be delivered at simulated dusk and/or at simulated dawn, or at simulated night. This can increase feed consumption by the animals (e.g., shrimp) and can increase growth rates. In some cases, the feed system can be used to introduce feed at least 8, 10, 12, 14, 16, 18, to 20 times each day, or any values or ranges therein. The feed system can provide feed on a continuous or semi-continuous basis. The lighting system can be responsive to user input, such as via a user interface such as a button or switch, etc. The user can turn on or off the lights, such as to check on the shrimp during the night.

In some embodiments, the system 800 can include a barrier 875 that can impede the animals (e.g., shrimp) from exiting the system 800 unintentionally. For example, shrimp can jump out of the water. The barrier 875 can cover at least a portion of the space between growth trays 804*a-g*, as shown in FIG. 17A, for example. In some embodiments, the barrier 875 can extend at least from the top of the tray side walls to the bottom of the tray positioned above. In some embodiments, the barrier 875 can be coupled to the support structure 802, such as to horizontal supports. In some embodiments, separate barriers 875 can be used for the different gaps between the growth trays 804*a-g*. In some embodiments, one barrier 875 can extend across multiple gaps. For example, a single barrier 875 could extends up the side of the system 800 to cover gaps above some or all of the growth trays 804*a-g*. The barrier 875 can extend along the sides, the back, and/or the front of the corresponding growth tray. The barrier can extend around about 50%, about 60%, about 70%, about 80%, about 90%, about 95%, or about 100% of the perimeter, or any values therebetween, or any ranges bounded by any of these values, although other embodiments are possible. The barrier 875 can include netting. The barrier 875 can permit viewing through the barrier 875, such as to see into the growth tray. The barrier 875 can be removable, in whole or in part, to permit access to the growth tray, such as for repairs or to access the shrimp or water. The barrier 875 can include one or more clear sheets, such as plastic or glass. This approach can help keep moisture in the aquaculture system. In some embodiments, the barrier 875 can be transparent in one direction (e.g., viewing into the growth trays), and can be opaque in another direction (e.g., viewing out from the growth trays). Accordingly, a user can view through the barrier to see the animals (e.g., shrimp), but the animals would be impeded from viewing out of the growth trays to the outside environment. A one-way vision element can be applied to the barrier 875, such as a perforated film. In some cases a see-through graphic can be used. A graphic of sky or of plants or other natural habitat can be for the graphic that is visible from inside the growth tray.

Figure 32:
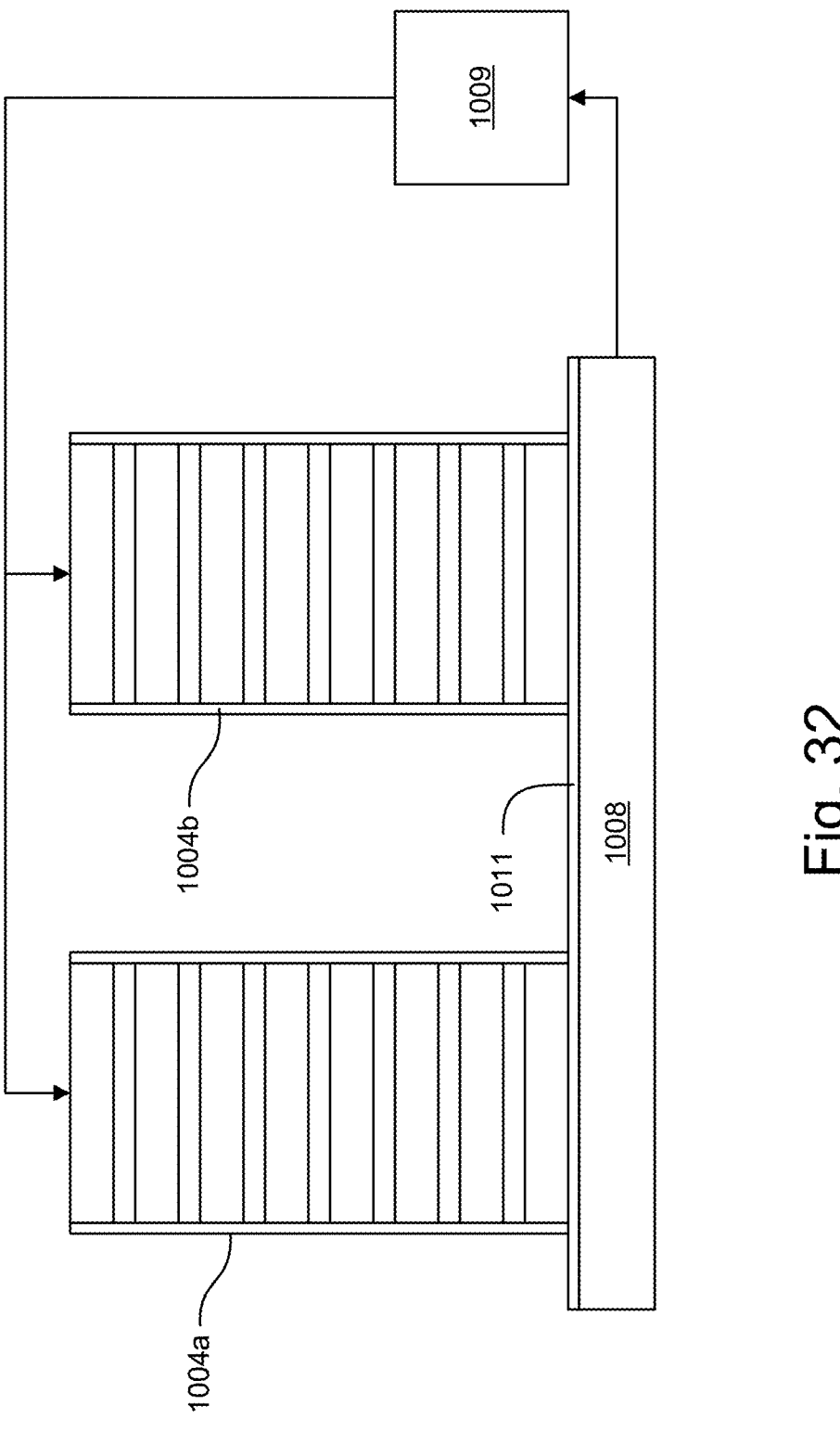
FIG. 32 shows an example embodiment of an aquaculture system.

With reference to FIG. 32, in some embodiments, multiple stacks of growth trays 1004*a* and 1004*b* can share a common waste water tray 1008 and/or a common water treatment system 1009. The stacks of growth trays 1004*a-b* can be similar to, or the same as, any of the embodiments disclosed herein, and can include main growth trays and/or preliminary growth trays. Some or all of the growth trays can drain waste water to the common waste water tray or container 1008. Water from the waste water container 1008 can be delivered to the water treatment system 1009, which can have features similar to or the same as the other water treatment system embodiments disclosed herein. The water treatment system 1009 can treat the water, as discussed herein. The treated water can then be delivered back to the growth trays 1004*a-b*, such as using a water delivery system, as discussed herein. In some embodiments, the waste water container 1008 can be below a floor 1011. The floor 1011 can support the growth trays 1004*a-b*. A user can walk on the floor 1011. In some embodiments, the waste water container 1008 can be recessed into the ground. In some embodiments, the waste water container 1008 can be above the ground, and a subfloor can be built over the waste water container 1008 to provide the floor 1011. In some cases, the floor 1011 can have one or more access panels to provide access to the waste water container 1008. The water from the multiple stacks of growth trays 1004*a-b* can mix in the waste water container 1008 and/or in the water treatment system 1009. Although FIG. 32 shows two stacks of growth trays 1004*a-b*, any suitable number can be used, such as 1 stack, 2 stacks, 3 stacks, 5 stacks, 7 stacks, 10 stacks, or more depending on the available space. In some cases, multiple water treatment systems 1009 can be used (e.g., in parallel).

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Unless the context clearly requires otherwise, throughout the description and any claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The word "or" in reference to a list of two or more items, is intended to cover all of the following interpretations of the word: any of the items in the list, all of the items in the list, and any combination of the items in the list. All numerical values provided herein are intended to include similar values within a range of measurement error.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately"

include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

What is claimed is:

1. An aquaculture system comprising:
a plurality of growth trays in a stacked configuration, the plurality of growth trays comprising:
a first growth tray;
a second growth tray;
a third growth tray;
a fourth growth tray;
a fifth growth tray;
a sixth growth tray; and
a seventh growth tray;
a drainage tray positioned below the plurality of growth trays, wherein water drains out of the plurality of growth trays and into the drainage tray; and
a water treatment system configured to treat water received from the drainage tray and to deliver treated water to the plurality of growth trays;
wherein the first growth tray has:
a first configuration to drain water out of the first growth tray and into the drainage tray while impeding animals from exiting the first growth tray;
a second configuration to transfer water and animals from the first growth tray to the second growth tray; and
a third configuration to transfer water and animals from the first growth tray to the third growth tray;
wherein the second growth tray has:
a first configuration to drain water out of the second growth tray and into the drainage tray while impeding animals from exiting the second growth tray;
a second configuration to transfer water and animals from the second growth tray to the fourth growth tray; and
a third configuration to transfer water and animals from the second growth tray to the fifth growth tray;
wherein the third growth tray has:
a first configuration to drain water out of the third growth tray and into the drainage tray while impeding animals from exiting the third growth tray;
a second configuration to transfer water and animals from the third growth tray to the sixth growth tray; and
a third configuration to transfer water and animals from the second growth tray to the seventh growth tray.

2. The aquaculture system of claim 1, wherein the water treatment system comprises:
one or more pumps to move water through the water treatment system;
a particulate filter configured to filter particulate matter from the water;
an oxygenator configured to increase a level of dissolved oxygen in the water;
a nitrification stage configured to oxidize ammonia and/or ammonium to reduce the concentration of total ammonia nitrogen (TAN) in the water; and a sanitizing stage configured to reduce an amount of bacteria in the water.

3. The aquaculture system of claim 2, wherein the nitrification stage comprises at least one nitrification filter that is backwashable, and wherein the at least one nitrification filter is fluidically coupled to the particulate filter such that water used to backwash the at least one nitrification filter is recirculated back to the particulate filter, to avoid discharging the water used to backwash the at least one nitrification filter.

4. The aquaculture system of claim 2, wherein the nitrification stage comprises three nitrification filters having:
an operating configuration in which water is directed through the three nitrification filters in parallel; and
a backwash configuration in which the three nitrification filters are interconnected such that water output from two of the nitrification filters is used to backwash a third of the nitrification filters, wherein the water treatment system comprises piping to send water used to backwash the third of the nitrification filters to the particulate filter, to avoid discharging water from the water treatment system.

5. The aquaculture system of claim 1, wherein the aquaculture system is a closed system configured to operate without discharging water.

6. The aquaculture system of claim 1, wherein the water comprises salt water, wherein the sanitization stage comprises an electrochlorinator configured to use electrolysis to convert salt to chlorine, and wherein the water treatment system comprises a dechlorination stage that converts chlorine in the water to salt.

7. The aquaculture system of claim 1, wherein:
the first growth tray is positioned above the second growth tray;
the second growth tray is positioned above the third growth tray;
the third growth tray is positioned above the fourth growth tray;
the fourth growth tray is positioned above the fifth growth tray;
the fifth growth tray is positioned above the sixth growth tray; and
the sixth growth tray is positioned above the seventh growth tray.

8. The aquaculture system of claim 1, further comprising one or more preliminary growth trays positioned above the first growth tray.

9. The aquaculture system of claim 8, comprising a first preliminary growth tray and a second preliminary growth tray, wherein the second preliminary growth tray is smaller than the first growth tray, wherein the first preliminary growth tray is smaller than the second preliminary growth tray, and wherein the first preliminary growth tray is positioned alongside the second preliminary growth tray.

10. The aquaculture system of claim 8, further comprising a fluid pathway connecting a first preliminary growth tray to a second preliminary growth tray, wherein the fluid pathway has a closed configuration to isolate the first preliminary growth tray from the second preliminary growth tray, and an open configuration to permit water and animals to move from the first preliminary growth tray, through the fluid pathway, to the second preliminary growth tray.

11. The aquaculture system of claim 8, wherein at least one preliminary growth tray can have:
a first configuration to drain water into the first growth tray while impeding animals from exiting the at least one preliminary growth tray; and a second configuration to transfer water and animals from the at least one preliminary growth tray to the first growth tray.

12. The aquaculture system of claim 1, comprising a valve system for a growth tray configured to hold water and animals, wherein the valve system comprises:

an outlet configured to drain the water and animals out of the growth tray when exposed;

a valve guide extending upward from the outlet; and a drain valve movable between a closed position and an open position, the drain valve comprising:

an inner valve sheath having an open top side, an open bottom side, and closed side walls, wherein the inner valve sheath slidably fits over the valve guide, wherein a height of the inner valve sheath at least partially defines a water level in the growth tray when the drain valve is in the closed position; and an outer valve sheath having side walls surrounding the side walls of the inner valve sheath, wherein the side walls of the outer valve sheath have openings configured to allow water to pass through and to impede the animals from passing through, and wherein the inner valve sheath and the outer valve sheath are coupled to move together between the closed position and the open position;

wherein, when the drain valve is in the closed position, the drain valve is configured to permit water that is above the open top side of the inner valve sheath to pass through the open top side, through the inner valve sheath, through the open bottom side, and out the outlet, while water that is below the open top side of the inner valve sheath is impeded from flowing to the outlet by the closed side walls;

wherein the drain valve is configured to slide upward away from the outlet to transition from the closed position to the open position;

wherein, when the drain valve is in the open position, the drain valve is configured to permit the water and the animals to flow under the drain valve and out the outlet.

* * * * *